US009838415B2

(12) United States Patent
Powers et al.

(10) Patent No.: US 9,838,415 B2
(45) Date of Patent: *Dec. 5, 2017

(54) FIGHT-THROUGH NODES FOR SURVIVABLE COMPUTER NETWORK

(71) Applicant: Architecture Technology Corporation, Minneapolis, MN (US)

(72) Inventors: Judson Powers, Ithaca, NY (US); Stephen K. Brueckner, Ithaca, NY (US); Kenneth J. Thurber, Hopkins, MN (US)

(73) Assignee: Architecture Technology Corporation, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/295,778

(22) Filed: Oct. 17, 2016

(65) Prior Publication Data

US 2017/0034198 A1  Feb. 2, 2017

Related U.S. Application Data

(63) Continuation-in-part of application No. 14/809,926, filed on Jul. 27, 2015, now Pat. No. 9,473,526, which
(Continued)

(51) Int. Cl.
*G06F 21/00* (2013.01)
*H04L 29/06* (2006.01)
(Continued)

(52) U.S. Cl.
CPC ...... *H04L 63/1441* (2013.01); *G06F 9/45558* (2013.01); *G06F 21/552* (2013.01);
(Continued)

(58) Field of Classification Search
CPC ..... H04L 63/02; H04L 63/20; H04L 63/1441; H04L 63/1416; G06F 21/552
See application file for complete search history.

(56) References Cited

U.S. PATENT DOCUMENTS 7,076,801 B2  7/2006  Gong et al.
7,134,123 B1  11/2006  Berry et al.
(Continued)

FOREIGN PATENT DOCUMENTS

EP  2884392  6/2015

OTHER PUBLICATIONS

"Install SharePoint 2013 across multiple servers for a three-tier farm," SharePoint 2013, Jul. 16, 2012, 13 pp.
(Continued)

*Primary Examiner* — Beemnet Dada
(74) *Attorney, Agent, or Firm* — Shumaker & Sieffert, P.A.

(57) ABSTRACT

A network node includes enhanced functionality to fight through cyber-attacks. A plurality of virtual machines run at the network node. The network node receives a plurality of transaction requests and distributes a copy of each of the transaction requests to the plurality of virtual machines over a plurality of time steps. Based on the first virtual machine having executed (n) transaction requests in the plurality of transaction requests, the node detects whether any of the virtual machines has been compromised. In response to detecting the plurality of virtual machines includes a compromised virtual machine, the network node isolates the compromised virtual machine. Furthermore, after isolating the compromised virtual machine, the network node may receive a subsequent transaction request and dispatch the subsequent transaction request to the compromised virtual machine. The compromised virtual machine may execute the subsequent transaction request.

15 Claims, 26 Drawing Sheets

Related U.S. Application Data is a continuation of application No. 14/165,368, filed on Jan. 27, 2014, now Pat. No. 9,094,449, which is a continuation-in-part of application No. 13/352,148, filed on Jan. 17, 2012, now Pat. No. 8,640,238, said application No. 15/295,778 is a continuation-in-part of application No. 14/791,089, filed on Jul. 2, 2015, and a continuation-in-part of application No. 14/011,642, filed on Aug. 27, 2013.

(60) Provisional application No. 61/534,817, filed on Sep. 14, 2011, provisional application No. 62/050,665, filed on Sep. 15, 2014, provisional application No. 61/863,801, filed on Aug. 8, 2013.

(51) Int. Cl.
*G06F 21/55* (2013.01)
*G06F 9/455* (2006.01)

(52) U.S. Cl.
CPC .......... *H04L 63/02* (2013.01); *H04L 63/1416* (2013.01); *H04L 63/20* (2013.01); *G06F 2009/45587* (2013.01)

(56) References Cited

U.S. PATENT DOCUMENTS

| | | | |
|---|---|---|---|
| 7,350,234 | B2 | 3/2008 | Goseva-Popstojanova et al. |
| 7,607,129 | B2 | 10/2009 | Rosu et al. |
| 8,510,747 | B2 | 8/2013 | Tian et al. |
| 8,640,238 | B2 | 1/2014 | Brueckner et al. |
| 8,839,426 | B1 | 9/2014 | Brueckner et al. |
| 9,094,449 | B2 * | 7/2015 | Brueckner .......... H04L 63/1441 |
| 9,473,526 | B2 * | 10/2016 | Brueckner .......... H04L 63/1441 |
| 2005/0198303 | A1 | 9/2005 | Knauerhase et al. |
| 2008/0263658 | A1 | 10/2008 | Michael et al. |
| 2009/0007100 | A1 | 1/2009 | Field et al. |
| 2009/0313620 | A1 | 12/2009 | Sedukhin et al. |
| 2010/0043073 | A1 | 2/2010 | Kuwamura et al. |
| 2010/0185596 | A1 | 7/2010 | Dee |
| 2010/0269167 | A1 | 10/2010 | Kashima |
| 2012/0042365 | A1 | 2/2012 | Shoval et al. |
| 2012/0110570 | A1 | 5/2012 | Jacobson et al. |
| 2012/0259816 | A1 | 10/2012 | Cargille et al. |
| 2013/0055256 | A1 | 2/2013 | Banga et al. |
| 2013/0097603 | A1 | 4/2013 | Amano et al. |
| 2013/0166703 | A1 | 6/2013 | Hammer et al. |
| 2013/0227710 | A1 | 8/2013 | Barak et al. |
| 2014/0096134 | A1 | 4/2014 | Barak et al. |
| 2014/0310810 | A1 | 10/2014 | Brueckner et al. |
| 2015/0033221 | A1 | 1/2015 | Chari et al. |
| 2015/0046405 | A1 | 2/2015 | Brueckner et al. |
| 2015/0309831 | A1 | 10/2015 | Powers et al. |

OTHER PUBLICATIONS

"Organically Assured and Survivable Information Systems (OASIS) Technology Transition Assessment (OTIA)," AFRL-IF-RS-TR-2004-67, Final Technical Report, Mar. 2004, 56 pp.
"SHelp: Automatic Self-healing for Multiple Application Instances in a Virtual Machine Environment", Gang Chen, Hai Jin, Dequing Zou, Bing Bing Zhou, Weizhong Qiang and Gang Hu, Huazhong University of Science and Technology, Wuhan, 430074, China, 2010 IEEE International Conference on Cluster Computing, pp. 97-106.
"VMware High Availability," Easily Deliver High Availability for All of Your Virtual Machines, VMware, Inc., 2009, 2 pp.
"VMware vSphereTM 4 Fault Tolerance: Architecture and Performance," White paper, VMware, Inc., 2009, 19 pp.
Alberts et al., "Mission Assurance Analysis Protocol (MAAP): Assessing Risk in Complex Environments," retrieved from http://www.sei.cmu.edu/reports/05tn032.pdf, Sep. 2005, 59 pp.
Bargar, "DOD Global Information Grid Mission Assurance," CrossTalk, The Journal of Defense Software Engineering, retrieved at http://www.crosstalkonline.org/storage/issue-archives/2008/200807/200807-Bargar.pdf, Jul. 2008, 3 pp.
Borman et al., "A Serially Reusable Java(tm) Virtual Machine Implementation for High Volume, Highly Reliable, Transaction Processing," Accessed Apr. 29, 2013, 21 pp.
Department of Defense Instruction, "Information Assurance (IA) Implementation," retrieved from http://www.dtic.mil/whs/directives/corres/pdf/850002.pdf, Feb. 6, 2003, 102 pp.
Duren, "Organically Assured and Survivable Information Systems (OASIS) Technology Transition Assessment (OTTA)," Defense Advanced Research Projects Agency, DARPA Order No. K128, N684m P004, Mar. 2004, 56 pp.
Hachman, "Facebook's Web Server Strategy: 'Chinese Foot Soldiers'," PCMag.com, Mar. 15, 2011, 4pp.
Leech et al., "Socks Protocol Version 5," Network Working Group, RFC 1928, Mar. 1996, 9 pp.
Maftia, "Malicious-and Accidental-Fault Tolerance for Internet Applications," IST Research Project IST-1999-11583, retrieved at http://spiderman-2.laas.fr/TSF/cabernet/maftia/index.html, Jan. 1, 2000-Feb. 28, 2003, 2 pp.
Matthews et al.. "Data Protection and Rapid Recovery From Attack With a Virtual Private File Server and Virtual Machine Appliances," Clarkson University, 2005, 12 pp.
Notice of Allowance from U.S. Appl. No. 13/352,148 dated Sep. 30, 2013, 14 pp.
Prosecution History from U.S. Appl. No. 14/791,089, dated Nov. 21, 2016 through Feb. 21, 2017, 33 pp.
Prosecution History from U.S. Appl. No. 14/011,642, dated Sep. 24, 2015 through Feb. 3, 2017, 94 pp.
Prosecution History from U.S. Appl. No. 14/165,368, dated Jun. 10, 2014 through Jun. 29, 2015, 31 pp.
Prosecution History from U.S. Appl. No. 14/809,926, dated Mar. 24, 2016 through Jun. 17, 2016, 19 pp.
Reiser et al., "VM-FIT: Supporting Intrusion Tolerance with Virtualisation Technology," Proceedings of the 1st Workshop on Recent Advances in Intrusion-Tolerant Systems, pp. 18-22, 2007.
Reynolds et al., "The Design and Implementation of an Intrusion Tolerant System," IEEE Proceedings of the International Conference on Dependable Systems and Networks (DSN'02), 2002, 6 pp.
Rutkowska, "Disposable VMs," The Invisible Things Lab's blog, Kernel, Hypervisor, Virtualization, Trusted Computing and other system-level security stuff, Jun. 1, 2010, 7pp.
Shi et al., "An Intrusion-Tolerant and Self-Recoverable Network Service System Using a Security Enhanced Chip Multiprocessor," IEEE Proceedings of the Second International Conference on Autonomic Computing (ICAC'05), 2005, 11pp.
Verissimo, "MAFTIA—Malicious and Accidental Fault Tolerance for Internet Applications," TF-CSIRT Workshop, Sep. 2005, 14 pp.
Wang et al., "SafeFox: a Safe Lightweight Virtual Browsing Environment," Proceedings of the 43rd Hawaii International Conference on System Sciences—2010, 10 pp.
Prosecution History from U.S. Appl. No. 14/014,242, dated from Nov. 27, 2013 through Aug. 14, 2014, 72 pp.
Notice of Allowance from U.S. Appl. No. 14/011,642, dated May 4, 2017, 7 pp.
Notice of Allowance from U.S. Appl. No. 14/791,089, dated May 23, 2017, 7 pp.

* cited by examiner

Transaction and Worker Details — 540

| Transaction (ID) | Client IP | Duration (seconds) | Traffic in/out (bytes) | Worker (ID) | Mem (%) | CPU (%) |
|---|---|---|---|---|---|---|
| 90341231 | 172.24.5.33 | 2.016 | 1024/56 | 4 | 93 | 15 |
| 83472983 | 223.169.4.12 | 1.110 | 664/1550 | 12 | 35 | 7 |
| 23123412 | 56.104.5.140 | 2.532 | | 23 | 87 | 77 |
| ... | ... | ... | ... | ... | ... | ... |

Select Columns...
Reorder Columns...
Sort by...

542 — Drop connection / Pause worker / Kill worker / Repair worker / Save worker state

Select Columns...
Reorder Columns...
Sort by...

Global Statistics (560)

| Time Period ▽ | Transactions (quantity) ▽ | Traffic In (mb) ▽ | Traffic Out (mb) ▽ | Worker Usage (%) ▽ | Worker Startup time (avg secs) ▽ | Worker Refresh time (avg secs) ▽ |
|---|---|---|---|---|---|---|
| Startup | 899433 | 123444 | 9883431 | 25 | 2.3 | 2.5 |
| Month | 34435 | 9389 | 23234 | 34 | 1.7 | 2.1 |
| Week | ... | ... | ... | ... | ... | ... |
| Day | | | | | | |
| Hour | | | | | | |
| Minute | | | | | | |

580

```
Alerts
Error:    Worker 2340923 not
          responding
Warning:  Connection 2342343
          stagnant
Warning:  Connection 8909890 timed
          out
Warning:  Worker 4230244 timed out
Warning:  Worker pool at 100%
          utilization
Error:    Persistent state rolled back
```

FIG. 24

FIGHT-THROUGH NODES FOR SURVIVABLE COMPUTER NETWORK

This application is a continuation-in-part of U.S. application Ser. No. 14/809,926, filed Jul. 27, 2015, which is a continuation of U.S. application Ser. No. 14/165,368, filed Jan. 27, 2014, which is a continuation-in part of U.S. application Ser. No. 13/352,148, filed Jan. 17, 2012, which claims the benefit of U.S. Provisional Application No. 61/534,817, filed Sep. 14, 2011; this application is also a continuation-in-part of U.S. application Ser. No. 14/791,089, filed Jul. 2, 2015, which claims the benefit of U.S. Provisional Application No. 62/050,665, filed Sep. 15, 2014, and which is a continuation-in-part of U.S. application Ser. No. 14/011,642, filed Aug. 27, 2013, which claims the benefit of U.S. Provisional Application No. 61/863,801, filed Aug. 8, 2013, the content of each of which is hereby incorporated by reference.

TECHNICAL FIELD

The invention relates to computer networks and, more specifically, detection and recovery from network attacks.

BACKGROUND

Despite existing security efforts, computer networks are susceptible to attack and compromise. Complete isolation of a network or system provide by the network may not always be an acceptable response to a detected cyber-attack.

SUMMARY

The techniques allow for a "survivable network" in which one or more network device may be able to "fight through" cyber-attacks. This may be of particular critical network operations. The techniques provide for a "survivable" network that may be capable of carrying on, in a perhaps degraded state, during an attack so as to continue to provide critical services. Because human reaction times can be very slow in comparison to the speed of cyber-attacks, the survivable system may be utilized to provide an automated response capability so the network can dynamically respond to threats.

Various examples of a Fight-Through Node (FTN) is described herein, which may be a combined hardware/software system that enhances existing networks with survivability properties. The Fight-Through Nodes may replace existing nodes within the network, such as nodes hosting critical services in a network. Example nodes include database servers, information systems, application servers, email servers, FTP servers, web servers or even network infrastructure such as layer three routers or layer two switches, firewalls, intrusion detection system, gateways or the like. Additional example nodes include client devices, laptops, mobile devices, end-user workstations and the like. Networks equipped with FTNs as described here may be resilient, enabling critical processes to operate despite attacks on the node or impacts on other parts of the network.

As enterprises rely ever more heavily on their information systems, the frequency and sophistication of cyber-attacks continues to rise. The techniques described herein improve the survivability of a network's critical client and server nodes, infrastructure nodes, and the like, making it possible to fight through cyber-attacks. Rather than being disabled by such attacks, servers providing critical services will continue to operate in spite of the attack. Entities may use the FTNs described herein to replace critical nodes their network or information systems. The assurance provided by the FTNs may be applicable to a variety of industries having critical systems (e.g., utilities, health care, financial services, transportation, military, telecom, retail, information technology).

In one example, a network node comprises a hardware-based processing system having a set of one or more processing units, and a hypervisor executing on each one of the processing units; and a plurality of virtual machines executing on each of the hypervisor. The network node includes an application-level dispatcher to receive a plurality of transaction requests from a plurality of network communication sessions with a plurality of clients and distribute a copy of each of the transaction requests to the plurality of virtual machines executing on the network node over a plurality of time steps to form a processing pipeline of the virtual machines.

A method comprises receiving, with a network node, a plurality of transaction requests from a plurality of network communication sessions with a plurality of clients, and distributing a copy of each of the transaction requests to a plurality of virtual machines executing on the network node over a plurality of time steps to form a processing pipeline of the virtual machines. The method further comprises, upon distributing a threshold number (n) of the transaction requests to the plurality of virtual machines, detecting whether any of the virtual machines in the processing pipeline has been compromised. When none of the virtual machines in the processing pipeline has been compromised, the processing pipeline of virtual machines are checkpointed by recording a state for each of the plurality of virtual machines. When at least one of the virtual machines in the processing pipeline has been compromised, the compromised virtual machines may be removed from the processing pipeline.

The techniques provide improved survivability in networks via technologies enhancing likelihood of continuity and transaction completion, allowing network operation to persist under conditions of extreme attack and/or degraded performance.

Architectural and operational strategies are described that may ensure survivability, resiliency, and adaptability to "fight through" severe cyber degradation and compromise, and to make the adversary's job harder and more costly. The techniques described herein may strengthen cyber readiness in a contested and degraded cyber operational environment, providing a set of automated capabilities to respond dynamically to escalating threats. The techniques may include but are not limited to: employment of application execution/database transaction sandboxes to check results before actual execution, business-unit failover to change entire suites of critical processes when compromise/failure occurs.

BRIEF DESCRIPTION OF DRAWINGS

FIG. 22 is a conceptual diagram illustrating an example transaction and worker details table, in accordance with one or more techniques of this disclosure.

FIG. 23 is a conceptual diagram illustrating an example global statistics table, in accordance with one or more techniques of this disclosure.

FIG. 24 is a conceptual diagram illustrating an example alerts interface, in accordance with one or more techniques of this disclosure.

DETAILED DESCRIPTION

Various example implementations of a Fight-Through Node (FTN) are described, which are hardware/software systems configured to enhance networks with survivability properties. In some example, not all nodes in a network are equally important. In many large-scale networks, some nodes are immediately critical to success whereas other nodes play a secondary role. Network nodes that host one or more essential services may be viewed as critical nodes that may be good candidates for to utilize the techniques described herein to achieve increased resiliency to network attacks.

Figure 1:
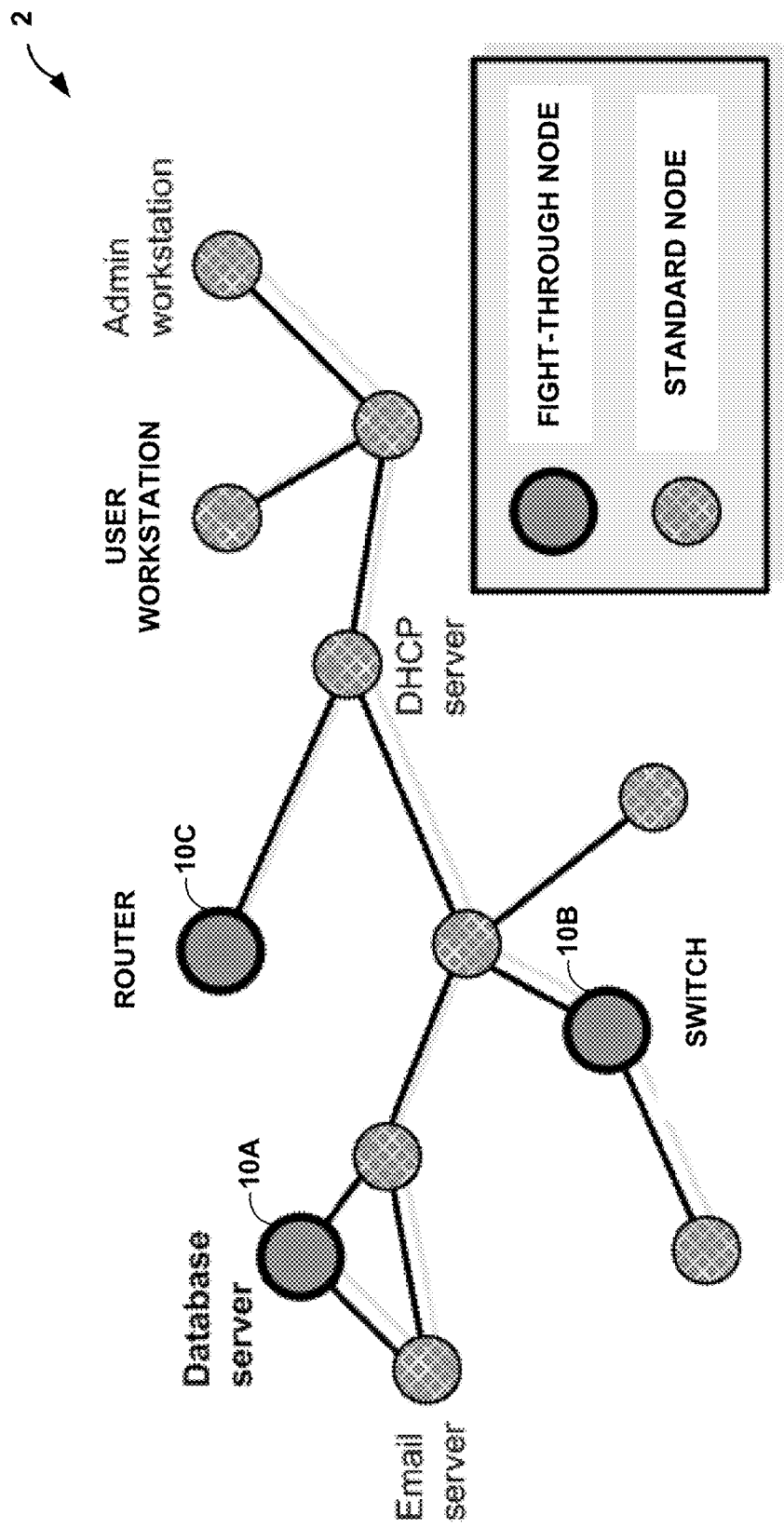
FIG. 1 is a network diagram showing an example network having fight-through nodes with survivability properties for resiliency to network attacks.

FIG. 1, for example, illustrates an example network 2 in which three nodes 10A, 10B and 10C ("nodes 10") have been identified as critical for the operation of data analysis and dissemination. Without operation of nodes 10, for example, network 2 may not be able to provide any level of service; conversely, a network with only these nodes may be able to provide at least a minimal amount of service. FIG. 1 is an example and the techniques herein may be applied to fewer or more nodes, such as all nodes within a network A Fight-Through Node (FTN) is described that may be used to replace nodes in a network. Networks equipped with FTNs may have increased resiliency, enabling critical processes to operate despite attacks on the node or impacts on other parts of the network. In some embodiments, an FTN is a hardware-based solution with customized software, e.g., a small rack of servers executing the software, used to replace an existing operation-critical server or workstation. In other example implementations, an FTN may be an end-user device (e.g., a client computing device) that applies the techniques described herein to provide client-side resiliency to network attacks. For example, the techniques described herein may be applied on end-user devices (e.g., laptops, workstations, mobile computing devices) to process outgoing client requests and/or service inbound requests from peer client devices, servers or other computing devices.

FTNs are resilient to attacks, operate reliably despite compromise (to a threshold level), and can be easily re-deployed after being irretrievably compromised. The methods used to achieve these capabilities may include redundancy, sandboxing, synchronization, checkpointing, and restoration. While survivable against network attacks such as denial-of-service, the FTN's design is particularly effective against more insidious host-based attacks; i.e. attacks that compromise a server or workstation.

FTN's operation captures the running state of a program (and its storage) between discrete Input/Output (I/O) transactions. The FTNs extends this transaction concept to other programs including services and types of network accesses such as sessions.

In one example, each FTN 10 contains a set of one or more processing units (e.g., blades) executing hypervisors that provide an operating environment for an ordered group of n (where n is an arbitrary number) cloned Virtual Machines (VMs). These VMs host the node's service(s) and act as transaction sandboxes. Incoming or outgoing transaction requests are dispatched to the first worker VM in this group. After each transaction completes, the next VM in the chain is synchronized with the previous one, resulting eventually in an active record of the previous n transactions. That is, only the oldest transaction in the series will have been executed on the last VM, and all n transactions of the series will have been executed on the first VM. After n transactions are complete, incoming transactions are temporarily suspended while the integrity of the VMs is checked with an Intrusion Detection System (IDS). If the VMs remain uncompromised, all VMs within the processing pipeline are backed up, or checkpointed, a control unit connected via a privileged LAN and then the next n transactions are processed by the dispatcher. If after the set of n transaction any VMs are compromised, the control unit instructs the hypervisors to automatically isolate the compromised VMs and saves their state for later forensic analysis. The control unit directs the hypervisors to immediately start replacement VMs from a warm backup, i.e., the most recent checkpoint, and insert into the processing pipeline of VMs in place of the compromised VMs. The source of the transaction that caused the compromise is (optionally) blocked at the FTN's firewall to prevent re-infection. In this way, upon detecting one or more compromised VMs, the compromised VM are isolated from the pipeline.

EXAMPLE

Suppose that, in a network without FTNs, an attacker uses a database transaction to trigger a zero-day exploit that compromises a database server and its hot standby server, which was susceptible to the same exploit because it had been mirroring transactions. The attacker, for example, may install a rootkit onto both machines, allowing the attacker to launch a variety of denial-of-service (DoS) or stealthy data-centric attacks against the data. In the conventional network, the presence of the rootkit is immediately detected, but the servers must either be taken offline for repair or allowed to run while under control of the attacker. Neither choice is acceptable.

By converting the database server to an FTN, the attack is neutralized and operations can safely continue. The compromise and rootkit are isolated within one or more of the FTN's sandbox VMs. The compromised VMs are rolled back to clean images from warm checkpoints and the FTN continues to service incoming transaction requests. The compromised VMs' disks and memory states are provided to a response team for forensic analysis, so the exploit can be characterized and the vulnerability patched. The source address of the malformed transaction is blocked at the FTN's firewall, preventing re-infection from that vector.

FTNs may provide a variety of features. As one example, the FTN may use sandbox VMs to isolate cyber-attacks and prevent them from affecting other systems on the network. Meanwhile, the service offered by the FTN continues to run on unaffected VMs. The FTNs may be easy to install and deploy in existing environment. For example, one embodiment of an FTS may utilize a rack of commodity servers that can run the same software as existing servers. FTNs can therefore either replace or shadow existing transaction-based servers on networks. As another example, the FTNs may automatically respond in real-time to cyber-attacks. When attacked, FTN automatically shuts down affected VMs and restores them from recent backups. It also reconfigures its internal firewall to block source of attack.

Figure 2:
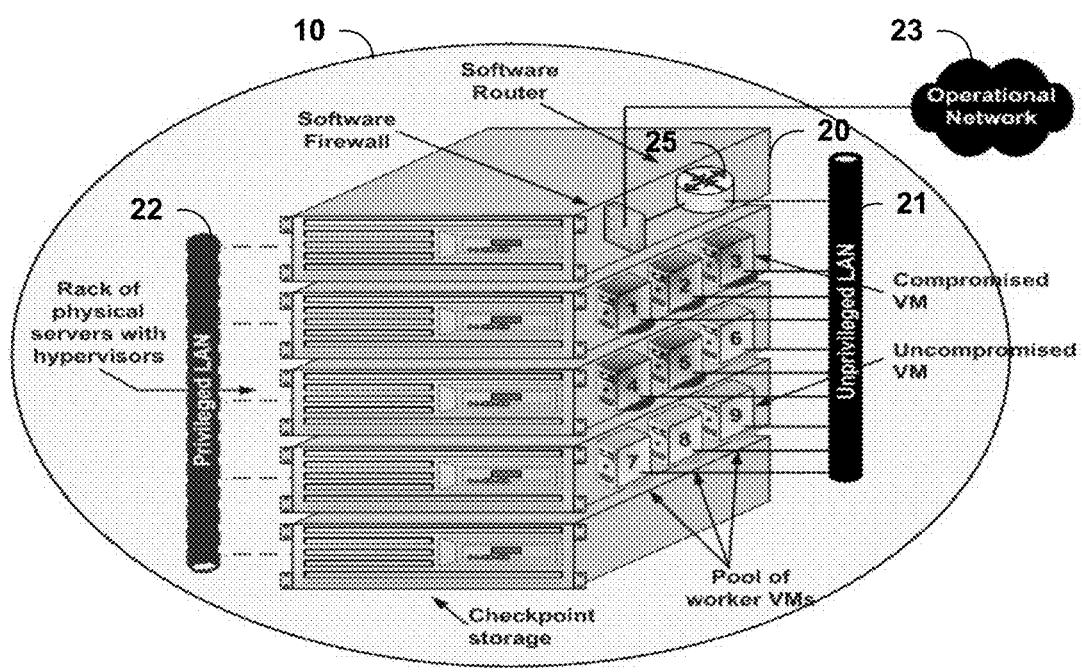
FIG. 2 is a schematic diagram illustrated in example in which, physically, a FTN is a small rack of servers connected by two networks.

FIG. 2 is a schematic diagram illustrated in example in which, physically, a FTN 10 is a small rack of servers 20 connected by two networks 21, 22. FIG. 2 illustrates the VMs hosted by a server. As shown, the FTN includes an ordered group of "worker" VMs (1-9) that execute transaction requests from the operational network. Although there are nine worker VMs shown in FIG. 2, the system can scale to provide fewer or more VMs to improve performance. The worker VMs are regularly monitored for compromise with an IDS. When they are "clean" they are backed up and when they are "dirty" (i.e., compromised) they are restored from a recent (warm) clean backup, effectively isolating and removing the compromised version of the VM from the pipeline. The FTN maintains service when attacked by verifying post-transaction integrity using VMs as sandboxes, and by eliminating compromised worker VMs and replacing them with fresh ones.

In one example, the FTN has a single address on the operational network 23. A firewall and a software router, referred to herein as a dispatcher, mediates between the worker VMs and the operational network 23. The firewall provides an adaptable first line of defense for the FTN; when an attack is detected the firewall can be automatically reconfigured to block future attacks from the same source after the worker VMs are restored. The dispatcher 25 stores and forwards transaction requests and responses. That is, dispatcher 25 forwards transaction requests from clients to the worker VMs. The dispatcher may mirror transactions across the worker VMs, but not to all workers VM simultaneously (as discussed below). Dispatcher 25 instead sequentially deploys copies of the transaction in a delayed fashion to the worker VMs so as to establish a processing pipeline of VMs working on the same transactions, e.g., from the same network communication session or from sessions with multiple clients. Dispatcher 25 forwards delayed, unified responses from the worker VMs back to clients after waiting to determine whether transactions were attacks or not (avoiding the problem of "rolling back" the clients). By forwarding transaction messages to the VMs serially, dispatcher 25 forces the VMs' services into deterministic behavior, avoiding the complication of race conditions between simultaneous requests.

There are a number of potential strategies for using the pool of sandbox VMs 1-9 to balance FTN resiliency with performance. One example is to line them up into a "processing pipeline," in which each transaction is executed on each VM but in a different time step. That is, the first transaction is executed on VM1, then during the next "time step" the first transaction is executed on VM2 while the second transaction is executed on VM1. When the first transaction in a sequence is executed on the final VM (i.e., a set of n transactions have been loaded into the queue of n VMs), all of the VMs are paused, checked for evidence of attack, and restored as needed. If none are compromised, the entire state of the set of VMs is checkpointed at the same time. This process is repeated after deploying another set of n transaction to the VMs. This pipeline approach allows the FTNs to perform the security checks and create backups less frequently (rather than after every transaction, after every n transactions where n is the number of VM workers), yet still provides a set of discrete checkpoints that are only one transaction apart so the dispatcher can "roll back" the FTN to the appropriate point.

The clean checkpoints of all VMs are stored on the checkpoint server. In one example, this host is not connected to the VMs, but rather to the hypervisors hosting the VMs on a privileged network. The FTN's critical processes (synchronization, integrity checking, checkpointing, and restoration) are executed by the hypervisors as directed by the control module, so that under normal operation (which includes "normal" attacks; i.e., attacks on processes or their operating systems) the critical processes are safe from compromise. In the unlikely event that an attacked VM escalates privilege and compromises its hypervisor, the entire FTN must be restored from a cold backup, i.e., its initial configuration. This restoration would involve swapping the hard drives of the physical servers, which requires manual intervention but can be still accomplished within minutes. The compromised hard drives would be made available to a response/forensics team for analysis.

The operation of an FTN utilizes one or more intrusion detection systems (IDSs). For the case of an attack on service availability, (a network or host-based DoS), a DoS that is not easily detectable is a rather ineffective attack and does not require resiliency. More subtle is an attack that quietly compromises a node for the purpose of stealthily exfiltrating or altering data. IDSs detecting such stealthy attacks exist, and the FTN may be used with such an IDS to detect attacks on a node's confidentiality and integrity. Because the FTN's server hypervisors may have a higher level of privilege than the VMs, IDSs executed from the hypervisors may provide FTNs with a higher level of assurance than typical IDSs executing within the VMs could achieve.

The architecture of the FTNs is configured to operate on a per transaction basis. Synchronization, checkpointing, and restoration within FTNs may be driven by breaking down I/O of a service (e.g., communication sessions such as FTP, HTTP or the like) into discrete transactions. The simplest types of transactions involve the exchange of a single pair of messages; for example a database commit request and acknowledgement of success or an HTTP GET request and content-filled response. Net-centric Service Oriented Architectures (SOAs), as well as much of the Internet at large, follow this paradigm.

Since dispatcher 25 performs synchronization using service-level transactions, it is able to define and detect transactions at the application level of the network stack. Dispatcher 25 may extract higher-level semantics from the lower layers of the stack, such as the transport layer (TCP packets). Such extraction may be protocol-specific, and possible for any discrete messaging protocol with a known specification. Messages may be sent as text (e.g., web service SOAP/WL messages) or as programmatic data structures (e.g., Java RMI data objects), and FTNs may support both.

In one example, dispatcher 25 is a transaction router executing within a VM that presents the outside network with a single interface to the FTN, accepts incoming transaction requests from clients, individually forwards them to the worker VMs in the pipeline, and sends transaction responses back to the clients. Dispatcher 25 is transaction-aware for the specific service(s) its FTN is providing. Dispatcher 25 provides a store-and-forward component for transactions that sends transaction requests to the worker VMs after each synchronization time step, and responses to clients can only be sent after the IDS verifies worker VM integrity post-transaction. The store-and-forward mechanism may occur at the application level (i.e., layer 7 and up); that is, it may accept and acknowledge the multiple TCP packets that constitute a single transaction message in accordance with the application-layer protocol. In addition, software-encrypted sessions may be handled at the application level. In this case, the dispatcher may act as a proxy, making encrypted connections with clients rather than the individual worker VMs doing so. Hardware encryption would be orthogonal, and therefore straightforward to accommodate.

When a worker VM becomes compromised, that VM and all preceding VMs in the pipeline (VMs that have executed transaction subsequent in time to the transactions executed by the compromises VM) are reconstituted. This recovery process may start with promotion of the most up-to-date "clean" VM to the front of the pipeline and proceeds with identifying which warm checkpoints to use for reconstitution.

A survivability threshold of an FTN may be applied; i.e., the level of attack and/or compromise may be determined and compared to a threshold before the FTN is taken offline and reconstituted from a cold backup.

Each FTN worker VM may have an independent disk image containing its operating system and services. For nodes requiring large amounts of data storage, the worker VMs may be connected to a single storage array. A trade-off must be made between resources and security for these types of nodes. A centralized storage may save on hardware, space, and power requirements, but may only protect against compromise of the VMs' OS and processes. This still presents considerable protection because it severely limits the actions an attacker can take. Alternatively, data storage may be replicated on independent disks for all VMs, which requires more resources but provides additional protection against data corruption and theft. In this case, checkpointing may occur for each VMs' disk space.

The system may be configurable between the number of worker VMs and the frequency of integrity checks. This allows an administrator to manage the trade-off between resources and performance. The factors affecting performance include (1) the time between periodic IDS checks/checkpointing, (2) the processing time required for the IDS checks/checkpointing, and (3) the transaction latency introduced by the depth of the worker VM pipeline. More worker VMs improves performance in the first two cases, but degrades it in the third case. In all cases, additional VMs require additional hardware, space, and power.

In addition, an administrator may configure a level of the IDS checks (security) so as to control the time requirement for the integrity checks (performance). At the simplest level, the IDS may be configured to only checks for DoS attacks by verifying that the VM's critical service is still running and available; this would be a quick check. At a higher level, the IDS may be configured to look for malware in the VM's RAM or disk; this would take longer but defend against more subtle threats.

In some embodiment, dispatcher 25 may include functionality of an Application-Level Gateway (ALG) that operates at the network layer. That is, an ALG is a type of proxy that dynamically helps certain applications work through firewalls and NAT connections. To do this, the ALG understands the protocols used by the applications it supports. It may perform deep packet inspection to set up ephemeral ports, routes, and connections based on the incoming protocol being used.

The FTN dispatcher 25 may extend the functionality of the ALG by supporting simple text protocols such as HTTP and FTP but also a variety of protocols. The dispatcher may set up connections between clients and servers, and also extract, store, and forward transaction messages itself rather than simply set up connections for pass-through communications. Finally, to support protocols that can only be understood at the session or application layer, the FTN dispatcher may operate as a proxy, making its own connections to both the client and server.

For example, to handle encrypted (SSL) sessions by tunneling the connection, or by using the SOCKS protocol [http://tools.ietf.org/search/rfc1928], dispatcher 25 may operate as a proxy. In this case, dispatcher 25 may be provided a server key for the worker VMs and make the connection to clients. It could then either forward the encrypted packets, or create decrypted (plaintext) packets to forward to the worker VMs.

In one example, the dispatcher serializes transactions to a single pipeline of VMs to simplify synchronization. Alternatively, the dispatcher may parallelize some types of transactions (e.g., read-only transactions)

The worker VMs are backed up, or checkpointed, after the periodic IDS scans. The VM's memory and disk image may be written to files. In some cases, much of a VM's RAM may already stored on disk in swap space, and Copy-on-Write (CoW) disk images only store the differences between a file system's shutdown state and its active one. These two factors may be used to reduce the time required to create a checkpoint.

A simple write of VM state as described above is called a "discard" checkpoint. Periodically the FTN could perform "merge" snapshots, which merge the CoW differences from a discard snapshot to a previous snapshot or the original disk image. This would reduce the number of stored snapshots. Another alternative is to just throw away discard snapshots as they age, but this may cause discontinuities in live data. The types of snapshots available and their age could be primary factors in determining which snapshots to restore after one or more worker VMs are compromised.

VMs may become compromised yet remain undetected for an extended period. To address this problem, VMs could be periodically restored from a cold, but known to be clean, backup. This technique is called proactive recovery. Such a technique may be simpler to implement in the case where worker VMs all tie in to a common database; the VMs could be refreshed without disrupting the results of their transactions. This technique would be more difficult to apply, when all VMs and their storage is fully replicated, without losing the database's state changes.

In one example, FTNs are used with respect to application-level database transactions using a distributed storage model; that is, each worker VM in the FTN has its own database. The FTN's internal state can be synchronized with that of the operational network on which it resides, and the FTN can recover from a host-based denial of service attack.

Figure 3:
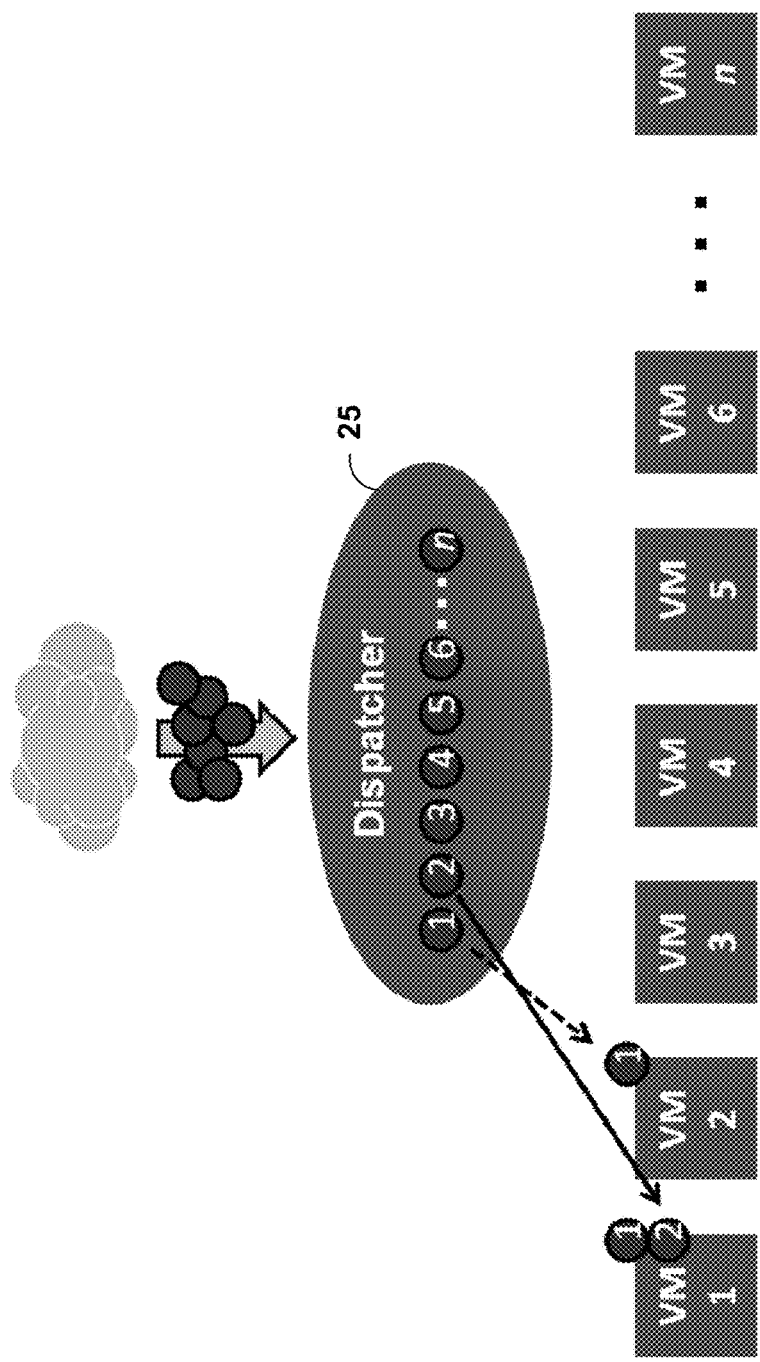
FIG. 3 is a diagram illustrating a dispatcher within a FTN dispatching initial incoming transaction requests (#1, #2) to a first few worker VMs (1, 2) in a group of n virtual machines.

FIG. 3 is a diagram illustrating dispatcher 25 dispatching initial incoming transaction requests (#1, #2) to the first two worker VMs (1, 2) in a group of n virtual machines. For example, during a first time step transaction #1 from network communications may be dispatched to the first VM in the group. During the second time step, the first transaction is dispatched to a second VM and a second transaction for the network communications serviced by the FTN is dispatched to the first VM, as shown in FIG. 3. In this way transactions for the multiple communication session may be serialized and deployed to the VMs in a pipelined fashion.

Figure 4:
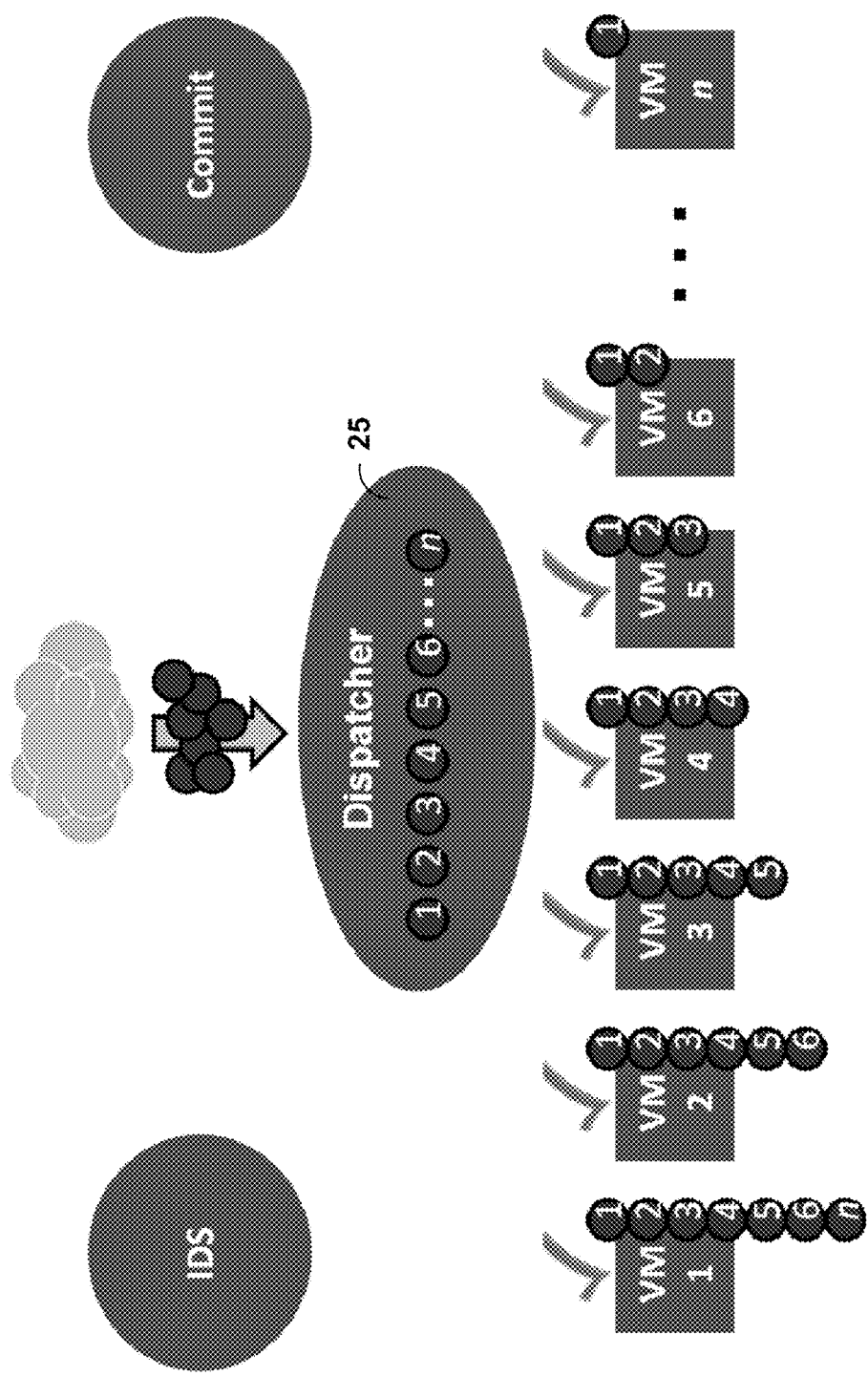
FIG. 4 is a diagram illustrating a subsequent state of the pipeline of VMs where the dispatcher has deployed n incoming transaction requests (#1-#n) over n timesteps to the set of VMs (1-n) so as to form a fully loaded pipeline of virtual machines.

FIG. 4 is a diagram illustrating a subsequent state of the pipeline of VMs where dispatcher 25 has deployed n incoming transaction requests (#1-#n) over n timesteps to the set of VMs (1-n) so as to form a fully loaded pipeline of virtual machines. At this point, all of the VMs are paused and validated with IDS checks for evidence of attack. In this example, no attack is detected (shown by checkmarks) and the full set of virtual machines is checkpointed at once.

Figure 5:
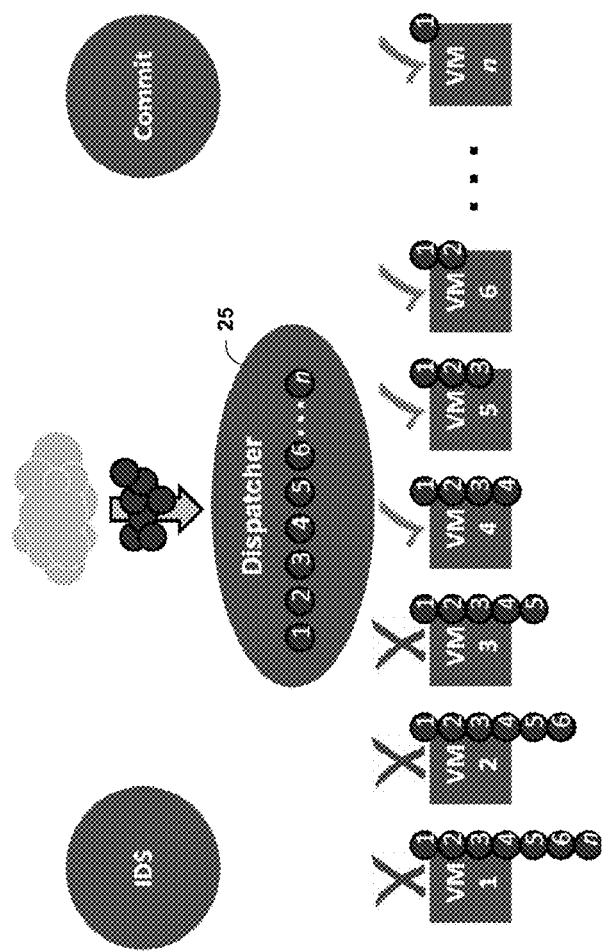
FIG. 5 is a diagram illustrating a subsequent state of the pipeline of VMs where the dispatcher has deployed a second set of n incoming transaction requests (#1-#n) over a second n timesteps to the set of VMs (1-n). In this example, VMs 1-3 are determined to be in a compromised state.

FIG. 5 is a diagram illustrating a subsequent state of the pipeline of VMs where dispatcher 25 has deployed a second set of n incoming transaction requests (#1-#n) over a second n timesteps to the set of VMs (1-n). In this example, VMs 1-3 are determined to be in a compromised state.

Figure 6:
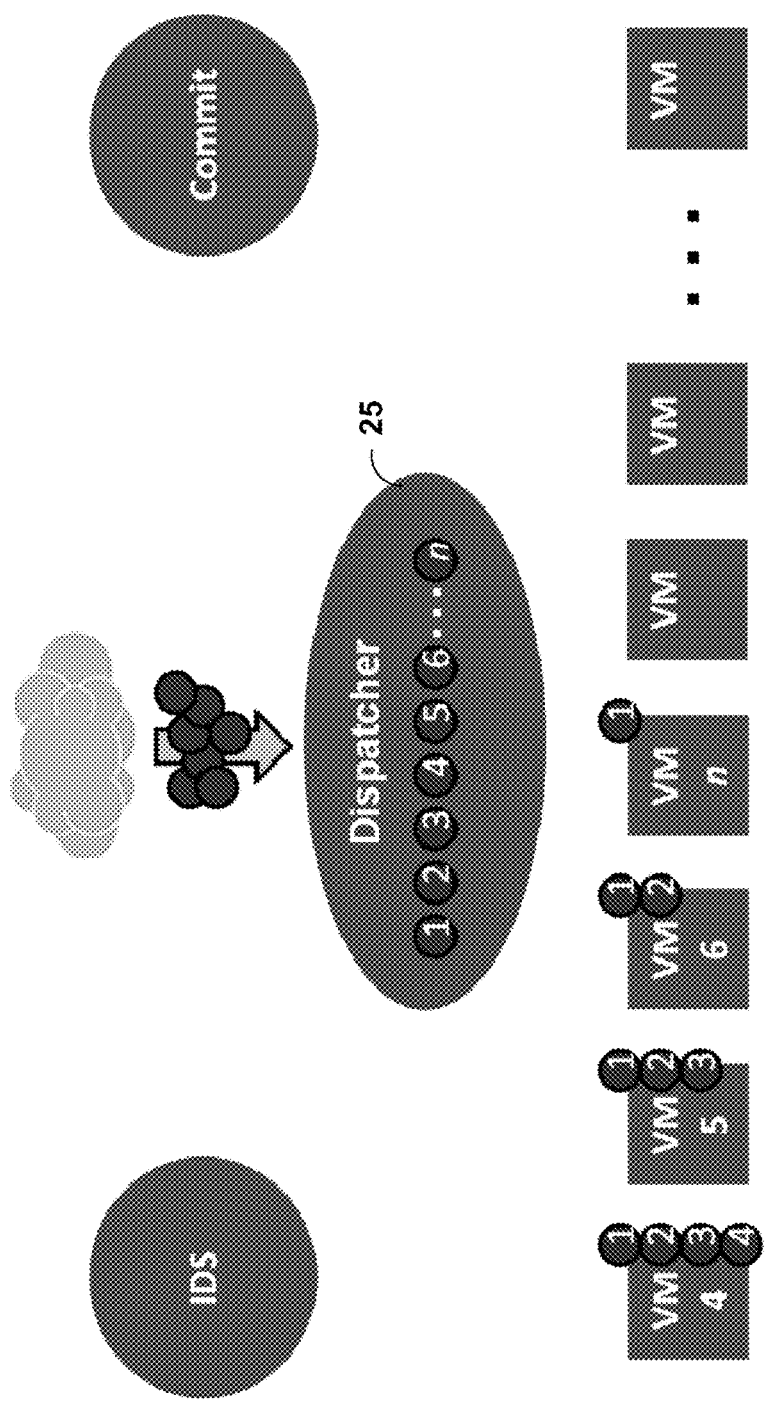
FIG. 6 is a diagram illustrating a subsequent state in which the compromised VMs 1-3 have been removed from the front-end of the pipeline.

FIG. 6 is a diagram illustrating a subsequent state in which the compromised VMs 1-3 have been removed from the front-end of the pipeline. Remaining VMS 4-n are promoted to earlier stages of the pipeline and new VMs are created at the tail end of the pipeline to once again form a pipeline of n VMs. The new VMs may be instantiated by the hypervisor and initialized with a most recent checkpointed state to ensure consistency. Compromised VMs 1-3 may be automatically isolated and their state saved for later forensic analysis of VMs.

Figure 7:
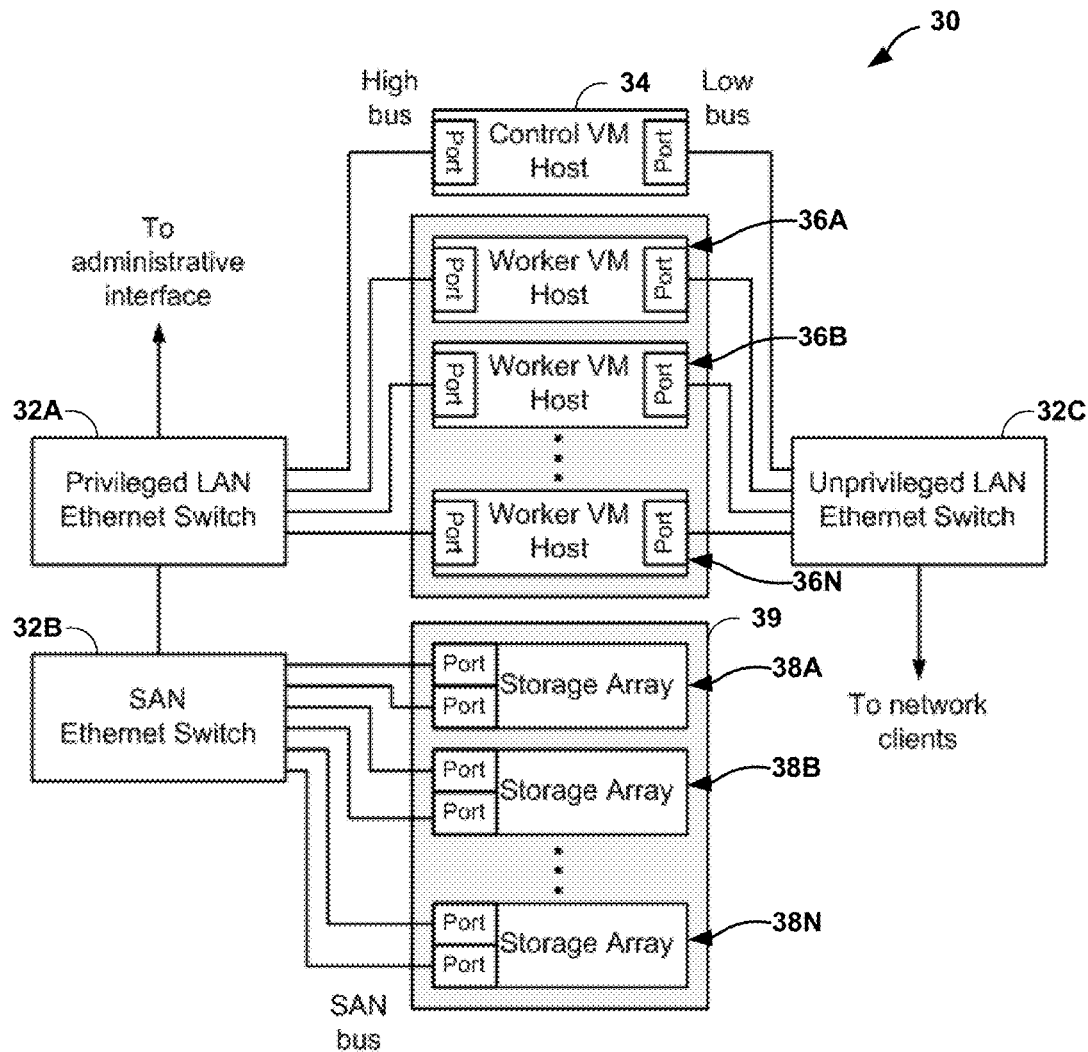
FIG. 7 is a block diagram illustrating an example FTN hardware architecture.

FIG. 7 is a block diagram illustrating an example FTN hardware architecture 30. In some examples, FTNs may utilize three general categories of hardware: rack-mounted servers with virtualization support, rack-mounted storage arrays, and Ethernet switches. In such examples, the servers may include two general categories: a single host for the control VM (e.g., control VM host 34) and one or more hosts for worker VMs. In the example of FIG. 7, FTN hardware architecture 30 includes a group of worker VM hosts 36A, 36B, and 36N, collectively referred to herein as "worker VM hosts 36." One or more storage arrays may be connected to form storage area network (SAN) 39. For instance, as illustrated in FIG. 7, SAN 39 includes storage arrays 38A, 38B, and 38N, collectively referred to herein as "storage arrays 38." Privileged LAN Ethernet switch 32A, SAN Ethernet switch 32B, and unprivileged LAN Ethernet switch 32C, collectively referred to herein as "Ethernet switches 32," provide network connectivity for three separate communications busses: an unprivileged (low) bus, a privileged (high) bus, and a SAN bus.

FTN hardware architecture 30 may utilize commercially-available (i.e., commodity) hardware, thereby facilitating installation and deployment of the FTN. For instance, because FTNs may utilize such commodity hardware, the FTN may be implemented without the need for specially-designed hardware. Moreover, each of the three hardware types utilized by the FTN (e.g., servers, storage arrays, and switches) may be homogenous, thereby facilitating configuration and replacement of the hardware devices. For instance, control VM host 34 and each of worker VM hosts 36 may be the same type of server device. Similarly, each of Ethernet switches 32 may be the same type of Ethernet switch, and each of storage arrays 38 may be the same type of storage array.

Control VM host 34 and worker VM hosts 36 execute each execute hypervisors that provide an operating environment for one or more privileged and unprivileged VMs. A privileged VM has access to the hypervisor, whereas an unprivileged VM does not. Control VM host 34 executes an unprivileged VM including three of the principal software components of the FTN: a software firewall, dispatcher, and accumulator (discussed in further detail below). Each of the worker VM hosts 36 executes one or more unprivileged VMs that form the worker pool for processing client transactions. In addition, each of the worker VM hosts 36 executes a privileged VM.

As illustrated, control VM host 34 and each of worker VM hosts 36 connect to the high and low busses utilizing a separate network port for each bus. The low bus ports are connected directly to each host's unprivileged VMs, which process client transactions that may potentially compromise the integrity of the VM. The high bus ports are connected to each host's privileged VMs, which execute the command and control communications of the FTN. One exception is the unprivileged VM executing on control VM host 34, which is connected to both the privileged (high) and unprivileged (low) busses to enable the VM to process client transaction information as well as synchronize with the software components on the high bus. Safeguards may be implemented to protect the integrity of this VM and prevent cross-communication between the privileged and unprivileged networks.

SAN 39 includes storage arrays 38, each of which includes one or more hard drives and software to interface with other storage arrays. To increase network I/O, each of storage arrays 38 include two memory controllers. Each of the two memory controllers includes a dedicated network port connected to the SAN bus via SAN Ethernet switch 32B. SAN Ethernet switch 32B provides a single interface for SAN 39 to the high bus via privileged LAN Ethernet switch 32A, such as by using the internet Small Computer System Interface (iSCSI) network storage protocol.

A FTN may use SAN 39 for both long-term archiving of VM checkpoints and centralized storage of shared software used by worker VM hosts 36, such as the checkpointing and validation modules (described below). SAN 39 enables management of VM checkpoints at the block level using Logical Volume Management (LVM).

Figure 8:
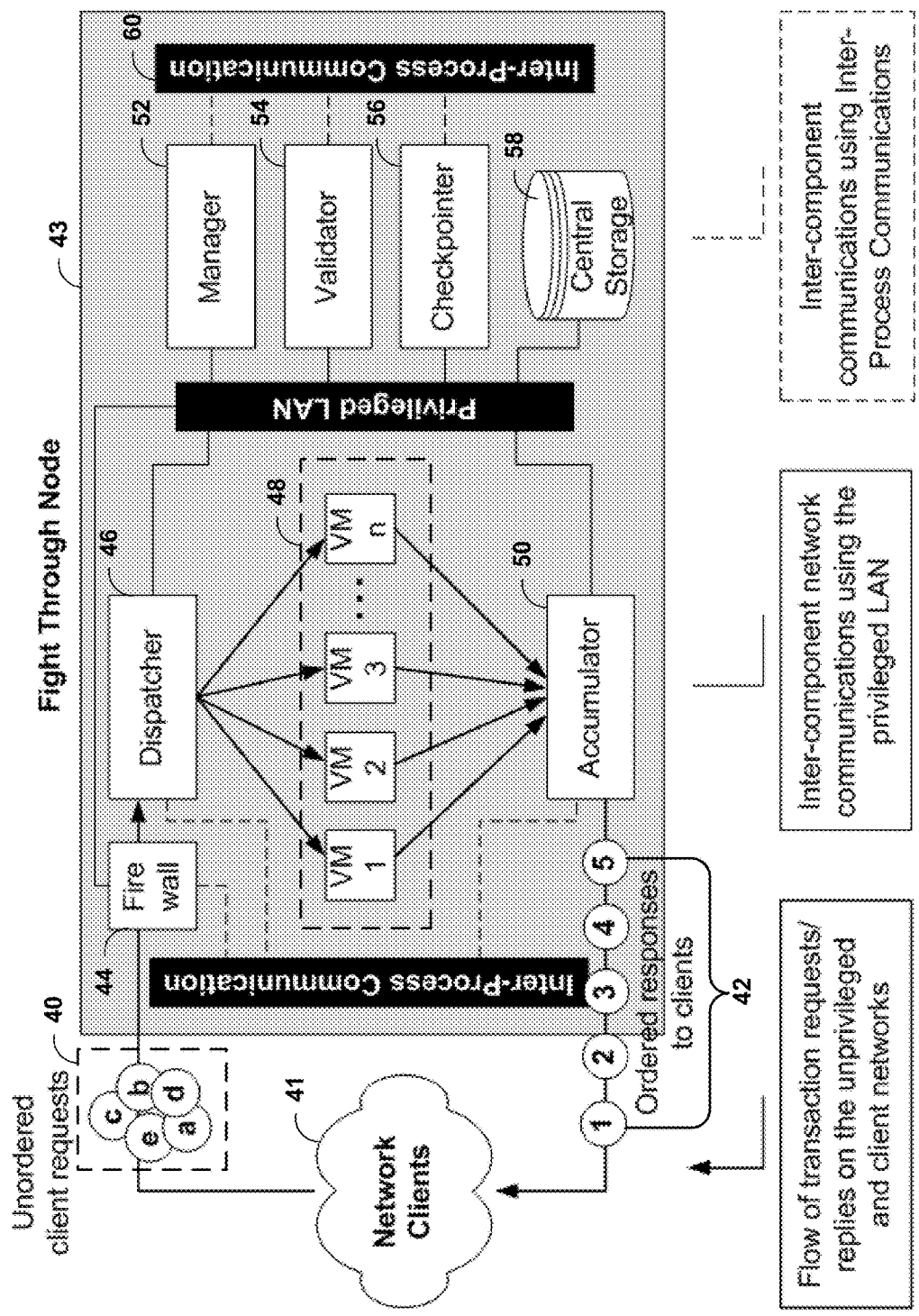
FIG. 8 is a block diagram illustrating an example FTN architecture.

FIG. 8 is a block diagram illustrating an example FTN architecture for a FTN 43. As illustrated in FIG. 8, the example FTN architecture includes firewall 44, dispatcher 46, worker VMs 48, accumulator 50, manager 52, validator 54, checkpointer 56, and central storage 58. In some examples, firewall 44, dispatcher 46, worker VMs 48, and accumulator 50 are all hosted by unprivileged VMs (i.e., VMs without access to the hypervisor executing on one or more processors to provide an operating environment for the VM), and are connected to an unprivileged LAN over which client transactions are communicated. Network communications over the unprivileged LAN may be considered potentially dangerous. That is, network communications over the unprivileged LAN may include data or other communications that may potentially compromise the integrity of the VMs, such as worker VMs 48 or other VMs associated with FTN 43. As illustrated in FIG. 8, firewall 44, dispatcher 46, and accumulator 50 are also connected to privileged LAN 51 for command and control messaging.

FTN 43 uses inter-process communications (IPC) and network communications on privileged LAN 51 to synchronize each of the components of the FTN. Because firewall 44, dispatcher 46, and accumulator 50 may be hosted by a single VM, they may exchange synchronization communications using IPC. Components located on different VMs or different physical hosts exchange synchronization communications using privileged LAN 51.

In one example implementation, synchronization messages may be passed between components using a two-level communications protocol. Low-level message passing primitives support high-level messages by managing communication channels and transmitting the high-level messages. The primitives may be used for both network communications and IPC to make communications substrate transparent. As one example, five primitive operations include: LISTEN, LINK, WRITE_LINK, READ_LINK, and BREAK_LINK. The five primitive operations may be used to: open a receiver's end of a channel, open a sender's end of a channel, place a message in the receiver's message queue, fetch a message from the receiver's message queue, and terminate the channel (from either end).

As an example, five high-level message types that may be exchanged using the low-level messaging primitives include: queries, status updates including unsolicited updates or responses to queries, commands, errors, and interrupts. Examples of queries include, but are not limited to, "verify VM x is running," "verify service is ready," and "verify component x operation." Examples of status updates include, but are not limited to, "VM x is running," "VM x is ready for requests," "component x is running," "all VMs are running," "all VMs are ready for requests," "VMx ready for connection," "VM x ready for validation/checkpointing," "VM x validated/checkpointed," "VM x archived," "VM x checkpoint y is located at z," "VM x loaded onto host y," "logical VM ordering is . . . ," and "VM network addresses are . . . " Examples of commands include, but are not limited to, "start VM x using image y," "load VM x onto host y," "add firewall rule x," "pause/unpause VM x," "verify/checkpoint VM x," "archive VM x checkpoint y," "shut down/destroy VM x," and "start/stop/reset component x." Examples of errors and exceptions include, but are not limited to, "timeout," "null pointer," "resource does not exist," and "insufficient permission." Examples of interrupts and faults include, but are not limited to, "segmentation fault," and "user interrupts."

Manager 52, validator 54 and checkpointer 56 are hosted by privileged VMs (i.e., VMs with access to the hypervisor), and are connected to privileged LAN 51. Central storage 58 is also connected to privileged LAN 51, but is not hosted by a VM in the example of FIG. 8. Network communications over privileged LAN 51 may be considered secure, and are used for command and control communications, including for system administration.

In some examples, transaction processing is accomplished in a loop using the unprivileged LAN between network clients 41, firewall 44, dispatcher 46, worker VMs 48, and accumulator 50. As illustrated in FIG. 8, dispatcher 46 receives unordered client transaction requests 40 via firewall 44. In response, dispatcher 46 processes the unordered requests and inserts them into an ordered queue that is forwarded to the worker VMs 48 (i.e., the worker VM pipeline). Dispatcher 46 may, in certain examples, be implemented using a plugin architecture, thereby enabling support for multiple network protocols using separate modules for distinct protocols. Such a plugin architecture may enable FTN 43 to support any combination of protocols for which plugins exist.

As one example, dispatcher 46 may sequentially deploy copies of the transaction in a delayed fashion to worker VMs 48 so as to establish a processing pipeline of VMs working on the same transactions according to the following operational algorithm: (1) listen to firewall 44 for incoming unordered client transaction requests 40, (2) receive unordered incoming client transaction requests 40 from firewall 44, (3) parse unordered client requests 40 into discrete transactions, (4) order the discrete transaction requests and insert the ordered transaction requests into an ordered queue, (5) wait for at least one of accumulator 50, manager 52, or checkpointer 56 to indicate that the next VM of worker VMs 48 is ready to receive new requests, (6) remove the request from the ordered queue, (7) forward the request to the next worker VM in the pool of available worker VMs 48, and (8) record the request to a log (e.g., for later recovery or forensic analysis). The dispatcher repeats the operational algorithm (i.e., loops through operations 1-8) until the worker VM pool 48 is full. In response to determining that the VM pool is full, the dispatcher signals validator 54 (e.g., using privileged LAN 51) that the integrity of a VM of worker VMs 48 is ready to be checked and continues to repeat the operational algorithm.

In the example of FIG. 8, accumulator 50 receives transaction results from worker VMs 48 and stores them until the integrity of the VMs has been checked. If the VMs remain uncompromised, accumulator 50 forwards the unified responses from worker VMs 48 back to network clients 41

(e.g., using the unprivileged LAN). As one example, accumulator 50 may operate according to the following operational algorithm: (1) connect to unpaused VMs when signaled by at least one of manager 52 or checkpointer 56, (2) listen for VM transaction results from clients, (3) wait for transaction results from worker VMs 48, (4) receive one or more transaction results from worker VMs 48, (5) parse the received VM transaction results into discrete transactions, and (6) insert non-duplicate results in an ordered queue. Accumulator 50 repeats the operational algorithm until accumulator 50 receives an indication from validator 54 that the integrity of a VM of worker VMs 48 has been checked. In response to receiving the indication from validator 54, accumulator 50 removes the requests from the queue, forwards the unified responses from worker VMs 48 back to network clients 41, records the results to a log, and continues to repeat the operational algorithm.

Worker VMs 48 receive client transaction requests from dispatcher 46, process the requests, and forward the results to accumulator 50. For instance, a worker VM may operate according to the following operational algorithm: (1) receive a start or unpause command from one or more of manager 52 or checkpointer 56 via the hypervisor, (2) wait for verification of a readiness status request from manager 52, (3) reply to the readiness status request received from manager 52, (4) wait for a client request from dispatcher 46, (5) receive a client request from dispatcher 46, (6) process the received request, (7) forward the transaction results to accumulator 50, and (8) signal dispatcher 46 that the worker VM is ready to receive a new client request. The worker VM repeats operations (4) through (8) of the operational algorithm until the pool of worker VMs 48 is full. When the pool of worker VMs 48 is full, validator 54 pauses the worker VMs to check the integrity of worker VMs 48 (described below). If the VMs remain uncompromised, all VMs within the worker VM pipeline 48 are backed up, or checkpointed. After checkpointing is complete, worker VMs 48 are unpaused and continue to operate according to the operational algorithm beginning from operation (1) of the algorithm.

In the example of FIG. 8, manager 52 is hosted by a privileged VM executing on a control VM host (e.g., control VM host 34 of FIG. 7). Manager 52 coordinates overall FTN execution by synchronizing the other FTN components in various operational modes, including recovery mode. Example operations of manager 52 include, but are not limited to: coordinating initialization and boot-up of the FTN system; initialization of other components included in FTN 43; setting up the pool of worker VMs upon system startup, full condition, or during recovery; verifying when the worker VM pool is ready to receive transaction request; informing other components of FTN 43 of the logical ordering and network addresses of the worker VMs; handling faults, errors, exceptions, and interrupts; coordinating the recovery process among other components of FTN 43; disassembling the worker VM pool upon system shutdown, full condition, or during recovery; coordinating system shutdown; and monitoring the unprivileged control VM for compromise. In addition, the run state of worker VMs may be controlled by manager 52 via the hypervisor. Manager 52 may include a user interface (UI) to enable administrators to configure, control, and monitor the status of FTN 43. As one example, a UI provides one or more controls (e.g., knobs, buttons, sliders, and the like) to enable an administrator to vary parameters associated with FTN 43, such as the number of VMs included in the worker VM pool, how many transactions to dispatch simultaneously, etc. Such parameters may enable an administrator to fine-tune and balance certain aspects of FTN 43, such the level of security, performance characteristics (e.g., transaction latency), and the like.

Validator 54 checks the integrity of the VMs with an Intrusion Detection System (IDS). For example, validator 54 may check each VM using a host-based IDS (HIDS). In such an example, the integrity of each VM is checked using the HIDS and network intrusion detection is handled using firewall 44.

In some examples, the HIDS may execute in the background of the host VM and intercede when a compromise is detected (e.g., a "stack canary," which may detect buffer overflow attacks). This type of system may decrease the execution time of the HIDS, thereby reducing latency introduced when checking the integrity of VMs. As another example, the HIDS may monitor access control. Examples of such a HIDS include SE Linux which may detect unprivileged access attempts on system resources, and system call wrappers which may be used to monitor resource usage by executing processes. As yet another example, the HIDS may include a file system integrity checker that scans each file of interest. Such file system integrity checker HIDS systems may scan each file, or only those that have been modified during the previous execution step of the VM. Agent HIDS may interface with validator 54 using the unprivileged LAN. Validator 54 may then communicate with other components of the FTN regarding the integrity of the VMs using privileged communication channels.

Validator 54 checks the integrity of worker VMs 48 between transactions. Results from validator 54 may be used to automatically reconfigure firewall 44. For instance, the source of the transaction that caused the compromise may be optionally blocked at firewall 44 to prevent re-infection. As one example, validator 54 may operate according to the following operational algorithm: (1) wait for dispatcher 46 to signal that a VM is ready to be validated, (2) pause the VM (optionally, depending upon the specific agent HIDS), (3) check the integrity of the VM using the HIDS, such as by executing the HIDS and requesting results from the HIDS agent if the HIDS is not a real-time HIDS, (4) signal checkpointer 56 when a VM has been checked and is determined to be uncompromised, and (5) enter the checkpoint results into a log (such as for later forensic analysis). The validator may continue to operate according to the operational algorithm by looping through the algorithm beginning from operation (1).

In some examples, multiple HIDS agents may be executed for validation. For instance, one or more of a first class of agents may monitor the kernel, one or more of a second class of HIDS agents may monitor executing processes, and one or more of a third class of HIDS agents may monitor data structures in memory or on disk. The type of HIDS select may depend upon the server FTN 43 is running. For instance, a database FTN may use a HIDS agent to monitor the integrity of database tables.

In certain examples, a HIDS may be unable to ascertain the time or cause of a compromise, possibly due to a delay between the time of attack (TOA) and the time of detection (TOD). As another example, some attacks may not be atomic. That is, some attacks may take a number of time steps to complete. To account for such time delays or non-atomic attacks, a configurable parameter may be set to enable FTN 43 to roll back an arbitrary number of transactions. The ability to roll back to an arbitrary point may provide flexibility in recovering from attacks that are not atomic or were detected after a period of time. The roll back parameter may be tuned for one or more of the type of IDS used by FTN 43 or the type of compromises detectable by the IDS.

Other virtual machines, such as virtual machines preceding the compromised virtual machines in the pipeline, may also be isolated. This may provide an ability to roll back to an arbitrary point, which may provide flexibility in recovering from attacks that are not atomic, e.g., attacks that took a number of time steps to complete.

In certain examples, rather than using HIDS executing on the VMs, validator 54 may utilize Virtual Machine Introspection (VMI). By utilizing VMI, validator 54 may examine the state of a VM via the hypervisor over which the VM executes. The VMI-based validation may improve validation accuracy because it may not be detectable by software executing on the VM, and it may not be hidden by rootkits.

Checkpointer 56 checkpoints the processing pipeline of virtual machines (e.g., worker VMs 48) by recording a state for each of the plurality of virtual machines. Checkpointer 56 may save the state of VMs operating at one or more levels, such as at one or more of the hardware-level, operating system-level, or application-level. Checkpointing hardware-level VMs involves saving the state of the VM's disk and RAM to the host's disk. Operating system—level VMs are a lighter-weight abstraction that may enable checkpointer 56 to save only the RAM used by the VM, rather than save unused RAM to the disk of the VM host. In some examples, Checkpointer 56 may checkpoint application-level VMs by patching a kernel or instrumenting a scripted or interpreted programming language such as Python or Java. Such application checkpointing may help to defend against process-hijacking attacks.

In certain examples, the time for checkpointer 56 to record a state for each of the plurality of virtual machines may be decreased by using a relatively small micro-kernal, such as Damn Small Linux (DSL) and installing only the applications and libraries used to perform the various operations of FTN 43. In addition, the time for checkpointer 56 to record a state for each of the plurality of virtual machines may be decreased by reducing the amount of RAM allocated to the VM, thereby reducing the time to write the associated RAM to the disk of the VM host. Further, checkpoint speed may be optimized by utilizing a hard drive of the VM host that uses solid state drive (SSD) memory because SSD memory may typically perform sequential write operations much faster than a traditional hard drive.

As one example, checkpointer 56 may operate according to the following operational algorithm: (1) wait for validator 54 to signal when a VM is ready to be checkpointed, (2) pause the VM if the VM has not been paused by Validator 54, (3) checkpoint the VM by recording the state of the VM to the hard disk of the local VM host, (4) unpause the VM, and (5) notify accumulator 50 and manager 52 when the VM has been checkpointed. Checkpointer 56 may continue to operate according to the operational algorithm by looping through the algorithm beginning from operation (1). In addition, checkpointer 56 may periodically record VM checkpoints to long-term SAN storage (e.g., SAN 39 of FIG. 7).

Checkpointer 56 may periodically archive VM checkpoints to central storage 58, thereby helping to ensure that the disks of the local VM hosts do not fill up. Central storage 58, in some examples, includes a hardware SAN (e.g., SAN 39 of FIG. 7) and one or more modules executable to coordinate checkpoint management. As an example, the checkpoint management algorithm may delete checkpoints from central storage 58 at exponentially increasing time intervals. For instance, the checkpoint management algorithm may cause central storage 58 to store every one of the latest one thousand checkpoints, one in ten of the most recent ten thousand checkpoints, one in one hundred of the most recent one hundred thousand checkpoints, and so on. Such an algorithm may allow for farther roll-back at the expense of granularity of stored checkpoints.

When validator 54 determines that one or more of worker VMs 48 is compromised, the FTN components enter a recovery mode of operation. As an example, the FTN-wide recovery mode of operation may operate according to the following operational algorithm: (1) validator 54 notifies other components of FTN 43 that a VM is compromised, (2) FTN components cease regular operation (e.g., accumulator 50 does not forward the response to the hostile transaction to network clients 41), (3) manager 52 pauses each of the plurality of worker VMs 48, (4) manager 52 signals checkpointer 56 to record the state of each of worker VMs 48 (in parallel) for forensic analysis, (5) manager 52 requests the hostile transaction request from dispatcher 46 and forwards it to firewall 44, (6) firewall 44 uses the hostile transaction to reconfigure to prevent further attacks from that vector, (7) dispatcher 46 continues to accept and buffer incoming client transaction requests, (8) manager 52 removes those worker VMs that have processed the hostile transaction from the active pool of worker VMs, (9), manager 52 promotes the set of last known uncompromised VMs to earlier stages of the worker VM pipeline, (10) manager 52 creates new VMs at the tail end of the pipeline to once again form a pipeline of n VMs, and (11) manager 52 notifies other components of FTN 43 to resume normal operation.

Firewall 44 may reconfigure itself after a restoration to prevent future attacks from the same vector. Firewall 44 may be signature-based, rather than anomaly-based, to help reduce false positives. Firewall 44 may include two enforcement engines: an IP-level packet inspection to analyze packet headers, and deep packet inspection to analyze packet data. In addition, firewall 44 may include algorithms to process hostile transactions (as determined by validator 54) to produce firewall policies for blocking similar future transactions. For example, such policies may include blocking the attacker's IP or IP block, and performing deep packet inspection to isolate the data sent to the FTN's service and creating a signature for blocking similar requests.

The predicted efficiency of an FTN in comparison to a standard server may be estimated by the following mathematical model equation:

$$e = \frac{T*n}{(T*n) + V + C} \qquad \text{Equation 1}$$

where "e" is the efficiency of the FTN, "T" is the average round trip time of a transaction, "n" is the number of worker VMs in the pool, "V" is the time to validate a VM, and "C" is the time to checkpoint a VM.

Figure 9:
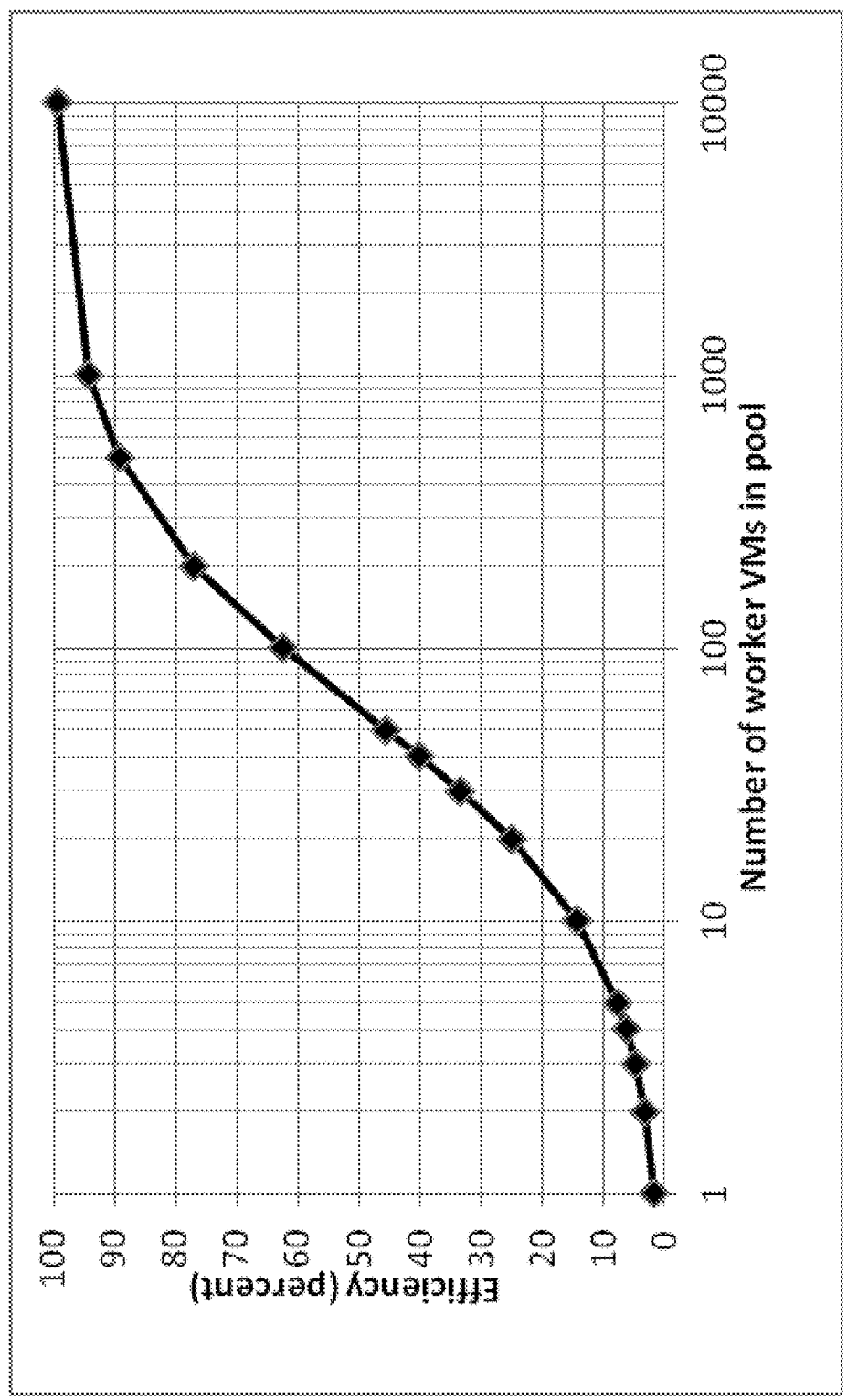
FIG. 9 illustrates a graph of a predicted efficiency of an FTN versus the size of the worker VM pool according to a mathematical model using an assumed set of constraints.

FIG. 9 illustrates a graph of a predicted efficiency of an FTN versus the size of the worker VM pool according to Equation 1 using the following constant values: "T=0.1 seconds," "V=1 second," and "C=5 seconds."

Figure 10:
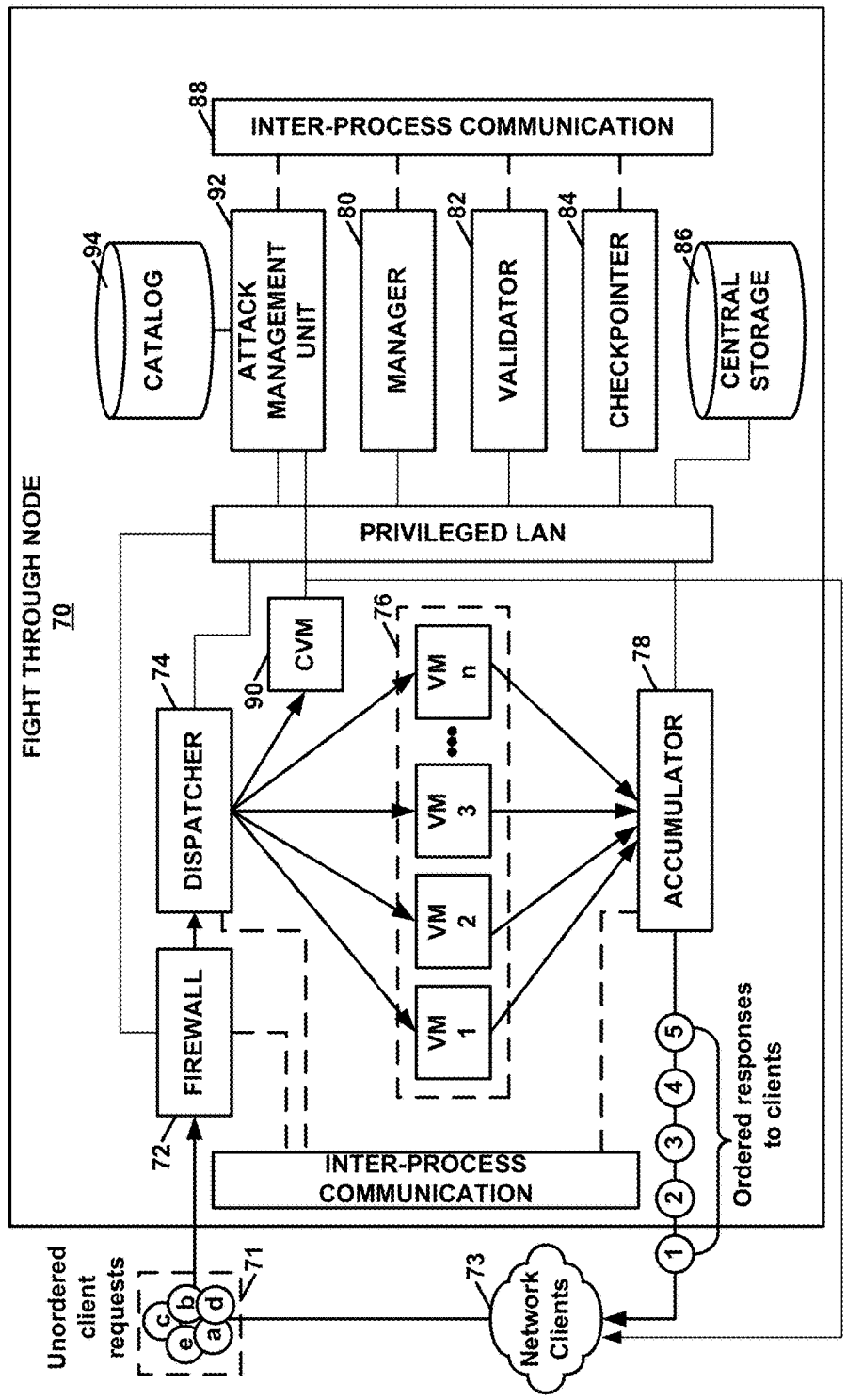
FIG. 10 is a block diagram illustrating an example FTN, in accordance with the techniques of this disclosure.

FIG. 10 is a block diagram illustrating an example FTN, in accordance with the techniques of this disclosure. In most respects, FTN 70 of FIG. 10 operates in the same manner as FTN 43 of FIG. 8. For instance, FTN 70 includes a firewall 72, a dispatcher 74, VMs 76, an accumulator 78, a manager 80, a validator 82, a checkpointer 84, central storage 86, and inter-process communication 88 that operate in analogous ways to firewall 44, dispatcher 46, VMs 48, accumulator 50, manager 52, validator 54, checkpointer 56, central storage 58, and inter-process communication 60 of FIG. 8. In the example of FIG. 10, FTN 70 also comprises an attack management unit 92 and a catalog 94. In other examples, attack management unit 92 and/or catalog 94 may be implemented separately from FTN 70.

In this example, rather than discard compromised VMs, FTN 70 of FIG. 10 may continue executing compromised VMs and continue to send transaction requests to the compromised VMs, such a compromised VM (CVM) 90. As such, because FTN 70 continues to execute the compromised VM(s), the potential attacker may not be alerted that FTN 70 has detected the attack or otherwise determined that a particular VM may be compromised. However, attack management unit 92 of FTN 70 may isolate the compromised VMs from using one or more services provided by FTN 70. For instance, attack management unit 92 may prevent CVM 90 from accessing central storage 86. Continuing to execute a CVM may enable attack management unit 92 to obtain additional information about a cyber-attack and the associated attacker while enabling the cyber-attack to play out with potentially diminished risk of the cyber-attack being ultimately successful.

It is further observed that an attacker may expect a compromised node to produce responses to transaction requests that differ from responses to the same transaction requests generated by a non-compromised node. Thus, if the attacker expects a node to be compromised, but if the attacker receives responses to transaction requests characteristic of a non-compromised node after launching a cyber-attack, the attacker may be tipped off that the cyber-attack was thwarted. The attacker may then abort the cyber-attack. However, it may be valuable to allow the attacker to continue the cyber-attack in order to learn more about the cyber-attack, learn more about the attacker, or to fight back against the attacker. Hence, in accordance with one or more additional techniques of this disclosure, in response to determining that a VM of FTN 70 is compromised, attack management unit 94 may isolate the compromised VM such that the compromised VM is unable to use a resource provided by FTN 70, but dispatcher 74 may continue to dispatch subsequent transaction requests to the compromised VM, which may be executed by the compromised VM. FTN 70 may continue to forward to a client device responses generated by the compromised VM in response to the subsequent transaction requests.

Because FTN 70 may continue using a VM (e.g., CVM 90) that was compromised in a cyber-attack and may also continue using non-compromised VMs (e.g., VMs 76), attack management unit 92 may perform analysis regarding the cyber-attack. For example, CVM-1 may denote a non-compromised VM occurring immediately after a CVM in the processing pipeline. In this example, attack management unit 92 may compare CVM-1 and CVM to obtain information about the cyber-attack that compromised the CVM. For example, in response to detecting the plurality of VMs includes a CVM, attack management unit 92 may copy a state of a non-compromised VM, the non-compromised VM having executed each transaction of the plurality of transactions up to, but not including, a last transaction of the plurality of transactions executed by the CVM. In this example, attack management unit 92 may compare the state of the non-compromised VM to a state of the compromised VM. Attack management unit 92 may compare CVM-1 and CVM in various ways. For example, attack management unit 92 may perform disk forensics to examine and compare the disks of CVM-1 and CVM. In some examples, attack management unit 92 may use VM introspection to examine and compare the running state, such as the contents of memory, of CVM-1 and CVM. In some examples, live forensics and memory forensics may be used. In one particular example, attack management unit 92 may compare a list of files on disks of both CVM-1 and CVM and look for files present on CVM not present on CVM-1. In some examples, attack management unit 92 may hash (e.g., using MD5 or SHA1) all files on both CVM-1 and CVM and look for files changed between CVM-1 and CVM. In some examples, attack management unit 92 examines RAM of CVM-1 and CVM to find a list of running processes and loaded drivers and to find processes/drivers in CVM that are not present in CVM-1. In some examples, attack management unit 92 examines the RAM of CVM-1 and CVM to find open network connections and listening ports present in CVM that are not present in CVM-1.

Based on this obtained information, attack management unit 92 may generate attack signatures that describe the types of cyber-attacks encountered. The generated attack signatures may be similar to virus signatures, but may be focused specifically on VMs. Attack management unit 92 may update catalog 94 based on the generated attack signatures. Thus, catalog 94 may store information regarding cyber-attacks. In this way, based on the comparison of a state of a non-compromised VM and a state of a compromised VM, attack management unit 92 may update a catalog of attack types. The "signatures" in catalog 94 can be the result of file system analysis, memory analysis, network traffic analysis, VM introspection, and other techniques. Using catalog 94, attack management unit 94 can build VM "inoculations" against attacks or attack strategies. For example, if attack management unit 94 finds a new file, process, or driver created between CVM-1 and CVM, attack management unit 94 may create a rule in a security product (e.g., anti-virus, intrusion detection system) in a VM that is triggered by the file, process, or driver. In some instances, the security product is outside the VM (e.g., in a hypervisor). Further, attack management unit 94 can correlate that data to known vulnerabilities of the code making up the VMs 76 so that analysts can better understand the interactions being exploited in a cyber-attack. For example, a cyber-attack may attempt to create a buffer overflow condition that inserts malicious code into a particular area of memory. In this example, the buffer overflow vulnerability may be known. Hence, in this example, if attack management unit 92 detects the exploitation of the known buffer overflow vulnerability, attack management unit 92 or an analyst may be better able to understand how the cyber-attack was intended to work.

Because FTN 70 may continue running a compromised VM (e.g., CVM 90), FTN 70 may be are able to perform particular processing jobs that FTN 70 would not have been able to perform if the compromised VM were discarded. For example, FTN 70 can comprise two or more machines going forward, one machine runs the compromised VM and one or more additional machines that continue running the non-compromised VMs of FTN 70. In some examples, manager 80 of FTN 70 immediately removes the compromised VM from the processing pipeline and replaces the compromised VM with a non-compromised VM. In some examples, manager 80 waits to switch the compromised VM for a non-compromised VM until attack management unit 92 has quarantined the compromised VM.

Furthermore, in some examples, attack management unit 92 analyzes responses that a compromised VM generates in response to transaction requests. For example, attack management unit 92 may use gathered information set up a trace back process that operates live as the subsequent transaction requests occur. A trace back process attempts to determine an origin of a packet on the internet. In one example, an attacker may send initial transaction requests using spoofed IP addresses that do not correspond to a computer used by the attacker, but cause the compromised VM to send responses (e.g., responses containing exfiltrated data) to one or more devices with IP addresses. By monitoring the responses from the compromised VM, attack management unit 92 may be able to trace back a source of an attack or a responsible party based on where the responses are being send. The gathered information may include transaction requests, responses to transaction requests, information regarding the state of the compromised VMs, information regarding requests by the compromised VMs to access protected services, and so on.

Additionally, in some examples, attack management unit 92 can use the gathered information to build up a catalog 94 of information regarding attacks. For example, certain types of requests may only be associated with cyber-attacks. For example, a Web service may have a very particular format for normal HTTP requests, and attacks deviate substantially from that format. Similarly, a normal request may only produce a small amount of data in response to a query, whereas a data exfiltration SQL injection attack would produce a large quantity of data. In this example, attack management unit 92 may use this information to build up catalog 94. In some examples, attack management 92 may send data back to the attacker to install malware on one or more devices that are executing a cyber-attack. In such examples, FTN 70 may be characterized as a fight-back node (FBN). The purpose of an FBN is to collect information regarding a cyber-attack and to develop a strategy that the FBN, or other nodes, can use to push bad information and code out the attacker. For instance, the pattern of attack (e.g., what requests are made, what resources are accessed or modified) gives the defender information necessary to modify the attack in order to subvert the attacker. For example, if the attacker appears to be copying an internal Web site, the contents of the site can be modified to include watermarks, Javascript-based browser exploits, or Javascript-based "phone home" functions in an attempt to identify and/or incapacitate the attacker. Thus, in some examples, FTN 70 may modify a response to transaction request generated by a compromised VM to include data or code to install or facilitate installation of malware on a device attacking the node. In this example, FTN 70 may send the modified response to the device attacking the node.

Figure 11:
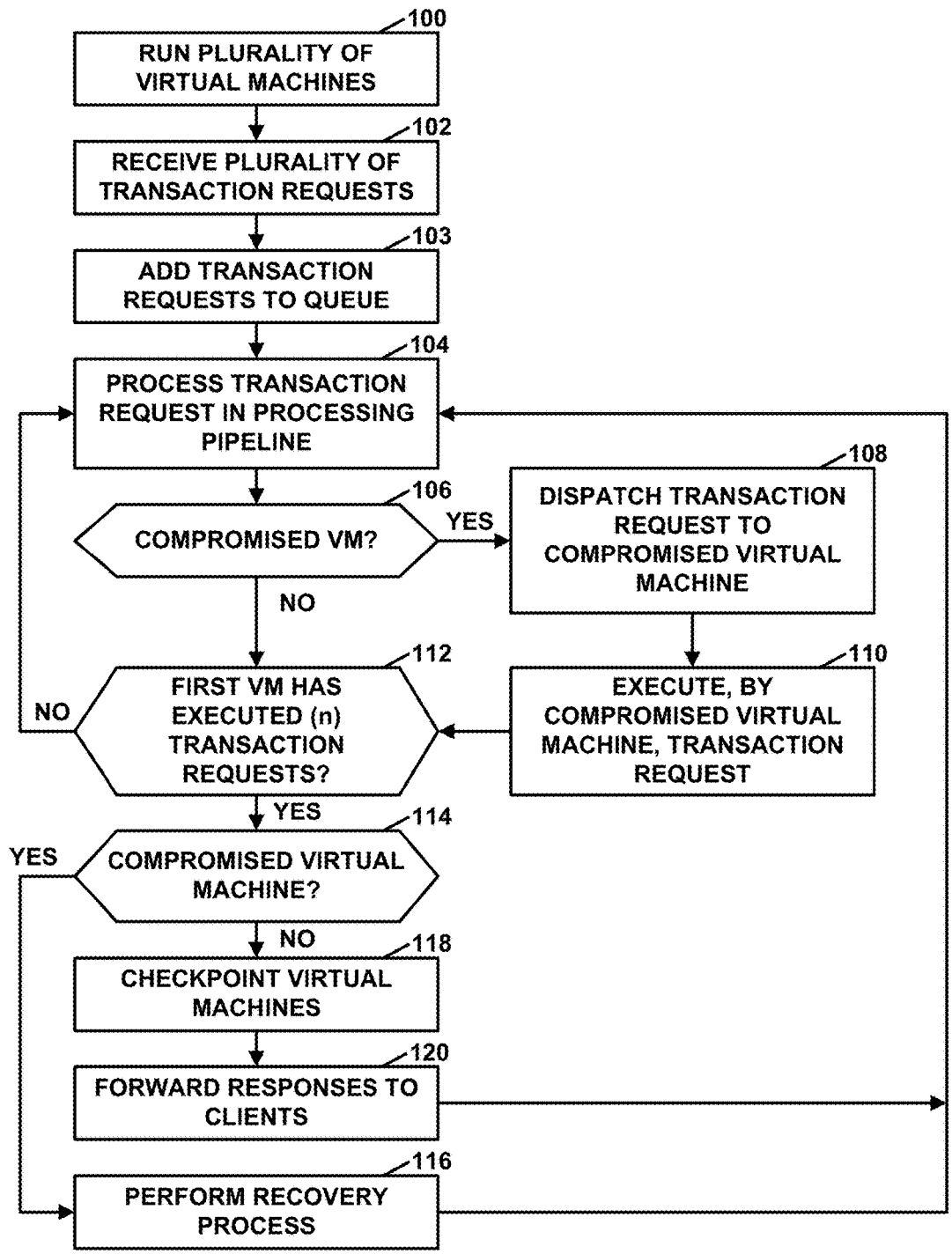
FIG. 11 is a flowchart illustrating an example operation in which a compromised VM seamlessly continues execution in isolation, in accordance with a technique of this disclosure

FIG. 11 is a flowchart illustrating an example operation in which a compromised VM seamlessly continues execution in isolation, in accordance with a technique of this disclosure. FIGS. 11-14 are described with reference to FIG. 10 for the sake of clarity, but are not necessarily limited to the implementation of FIG. 10. For instance, actions described with respect to FIGS. 11-14 may be performed by different components or units.

In the example of FIG. 11, FTN 70 may run a plurality of VMs (e.g., worker VMs 76 (FIG. 10)) that includes (n) VMs (100). Each respective VM of the plurality of VMs is associated with a respective position in an ordered sequence of the VMs. For instance, a first VM may be associated with a first position in the ordered sequence of VMs, a second VM may be associated with a second position in the ordered sequence of VMs, and so on. Thus, as described elsewhere in this disclosure, the VMs may form a so-called processing pipeline. It is to be noted however that, unlike some usages of the term processing pipeline, outputs of earlier VMs of the processing pipeline of this disclosure do not necessarily form inputs of subsequent VMs of the processing pipeline.

Furthermore, in the example of FIG. 11, dispatcher 74 of FTN 70 (FIG. 10) receives a plurality of transaction requests (102). Dispatcher 74 may add the transaction requests to a transaction request queue (103). The transaction requests may include client transaction requests 71 (FIG. 10). Dispatcher 74 may receive the plurality of transaction requests over a period of time. Furthermore, actions 104-112 may be performed before receiving (n) transaction requests. Dispatcher 74 may continue to receive and enqueue transaction requests while actions 104-120 are performed.

FTN 70 may process a transaction request from the transaction request queue using the processing pipeline (104). For instance, FTN 70 may process the transaction request in the manner described below with regard to FIG. 13.

Additionally, dispatcher 74 may determine whether there is a compromised VM (106). Attack management unit 92 (FIG. 10) of FTN 70 may have already removed the compromised VM from the processing pipeline and isolated the compromised VM from accessing a service provided by FTN 70. In response to determining there is a compromised VM ("YES" branch of 106), dispatcher 74 may dispatch a copy of the transaction request to the compromised VM (108). The compromised VM may then execute the transaction request (110).

If there is no compromised VM ("NO" branch of 106) or in addition to the compromised VM executing the transaction request, dispatcher 74 may determine whether the first VM of the processing pipeline has executed (n) transaction requests following a most recent time validator 54 (FIG. 10) checked whether the worker VMs of the processing pipeline have been compromised. The first VM of the processing pipeline may be the VM associated with a position in the ordered sequence of VMs occurring first. The value (n) may be equal to the number of worker VMs in the processing pipeline. Dispatcher 74 may make this determination in various ways. For example, dispatcher 74 may maintain a counter of transaction requests dispatched to the first VM. In another example, since the first VM has executed (n) transaction requests when the last VM of the processing pipeline has executed one transaction request, dispatcher 74 may make this determination after dispatching a single transaction request to the last VM of the processing pipeline. The last VM may be associated with a position in the ordered sequence of VMs occurring last. Based on the first VM not yet having executed (n) transaction requests following the most recent time validator 82 checked whether the worker VMs of the processing pipeline have been compromised ("NO" branch of 112), FTN 70 may process a next transaction request of the plurality of transaction requests using the processing pipeline (104).

Based on the first VM having executed (n) transaction requests following the most recent time validator 82 checked whether the worker VMs of the processing pipeline have been compromised ("YES" branch of 112), validator 82 (FIG. 10) may detect whether any of the VMs has been compromised (114). In some instances, validator 82 may detect that multiple VMs of the processing pipeline have been compromised.

Validator 82 may detect whether any of the VMs has been compromised in accordance with any of the examples provided elsewhere in this disclosure. For instance, validator 82 may use an intrusion detection system to determine whether the plurality of VMs includes one or more compromised VMs. In some examples, validator 82 may implement a "voting" system for detecting compromised VMs. In examples of the "voting" system, validator 82 compares responses generated by different VMs in response to the same transaction request. If the comparison reveals that different VMs generated meaningfully different responses to the same transaction request, validator 82 may determine that plurality of VMs includes at least one compromised VM. Thus, different responses (i.e., answers) may indicate the occurrence of an attack. Therefore, in this example, validator 82 may determine, based on a comparison of a plurality of responses, whether any of the VMs has been compromised. In this example, each response of the plurality of responses is generated by different VMs of the ordered sequence of VMs in response to the same transaction request of the plurality of transaction requests.

Determining whether the responses are meaningfully different may depend on a networking protocol and may require the attack to cause different answers on different VMs. For example, if a particular input (e.g., an HTTP request) causes different outputs (e.g., HTTP responses from some plurality of FTN VMs), the particular input may be an attack. However, not all attacks necessarily cause different outputs. Thus, engineering VMs to be more likely to cause different outputs under attack may be beneficial. Example techniques for engineering VMs to be more likely to cause different outputs under attack are described in U.S. patent application Ser. No. 15/228,698, filed Aug. 4, 2016, the entire content of which is incorporated by reference. In some instances, validator 82 may be "protocol aware" to determine if two outputs are "different". For example, a typical HTTP response often includes a timestamp and unique identifying information about the responding server. These may be different between two VMs, but the difference is not semantically meaningful.

In some examples, FTN 70 may be engineered to cause easily-detectable aberrations in the event of an attack. For example, the VMs may be described to be likely to produce software faults in the event of an attack, such software faults may be defined as an attack, thereby increasing the odds of detecting an attack. For example, VMs 76 may run different software configurations that are semantically identical but not actually identical. For instance, in this example, if VMs 76 are running a simple Web server, VMs 76 may run different flavors of Linux, BSD, and Windows with different Web server software. In this example, VMs 76 will all behave dramatically differently under cyber-attack, because most attacks are brittle (e.g., the cyber-attack they may work on Apache on Linux, for example, but not on Apache on Windows or Nginx on Linux.) In another example, the internal application binary interfaces of VMs 76 (the agreed-upon standard for calling functions and system calls) is randomized, guaranteeing software incompatibility (and, in fact, very likely system faults) between VMs 76.

Furthermore, in some examples where validator 82 implements a voting system, the ability of validator 82 to detect a compromised VM may be enhanced by having each of the VMs have a different configuration. The different configurations may be functionally equivalent to a normal user. However, because attacks are usually brittle (i.e., sensitive to a particular configuration of a system), an attack is now more likely to cause different response in different VMs.

Figure 12:
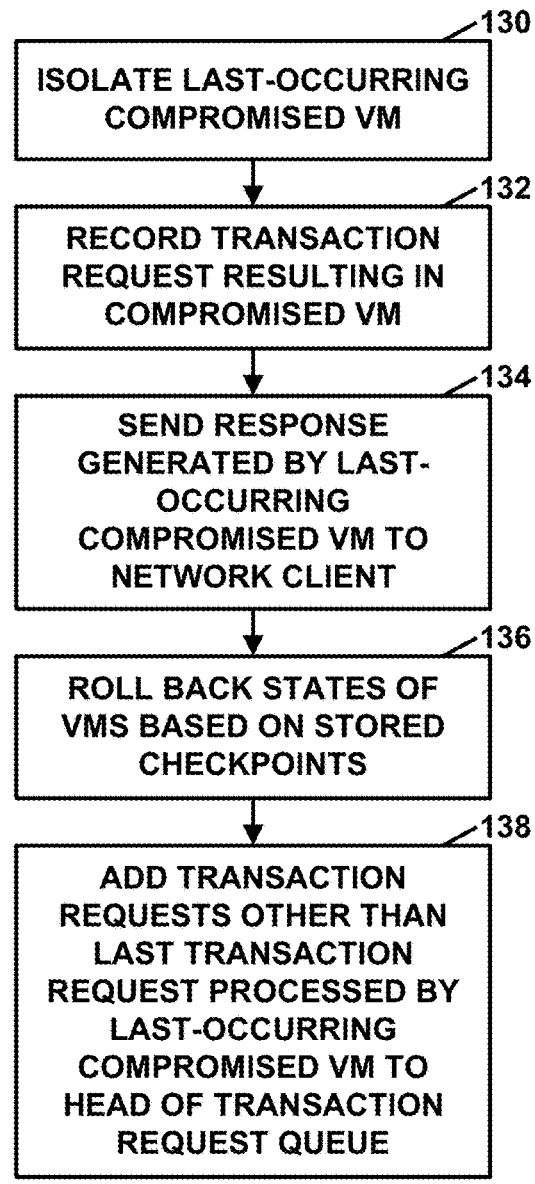
FIG. 12 is a flowchart of an example recovery process, in accordance with a technique of this disclosure.

In response to validator 82 detecting the plurality of VMs includes a compromised VM ("YES" branch of 114), FTN 70 performs a recovery process (116). FIG. 12, described below, is a flowchart of an example recovery process.

On the other hand, in response to validator 82 (FIG. 10) detecting the plurality of VMs does not include a compromised VM ("NO" branch of 114), checkpointer 84 may checkpoint the plurality of VMs (118). Additionally, accumulator 78 (FIG. 10) may forward respective responses to the plurality of transaction requests to network clients 73 (FIG. 10) (120). Subsequent to performing the recovery process or checkpointing the VMs, FTN 70 may process a next transaction request from the transaction request queue (104).

FIG. 12 is a flowchart of an example recovery process, in accordance with a technique of this disclosure. In the example of FIG. 12, attack management unit 92 isolates a last-occurring compromised VM such that the last-occurring compromised VM is unable to subsequently use the service provided by FTN 70 (130). The last-occurring compromised VM is the compromised VM associated with a latest-occurring position in the ordered sequence of VMs among the compromised VMs. In other words, attack management unit 92 may quarantine the last-occurring compromised VM. A compromised VM may also be referred to in this disclosure as a corrupted VM. In other examples, attack management unit 92 may isolate one or more compromised VMs in addition to or alternatively to the last-occurring compromised VM.

In various examples, attack management unit 92 isolates the last-occurring compromised VM in various ways. For example, attack management unit 92 may generate a copy of the last-occurring compromised VM in a quarantine area of an operating machine, a special partition on the operating machine, or on another machine. The operating machine may be a machine (e.g., computing device) on which FTN 70 runs.

In the example of FIG. 12, attack management unit 92 may record the transaction request resulting in the compromised VM (132). Thus, in addition to quarantining the last-occurring compromised VM, FTN 70 may record the transaction request that created the compromised VM. In some examples, the transaction request may comprise a parsed transaction, a capture of network traffic, or other data. In general, a parsed transaction is the network traffic of a transaction, with "protocol awareness" applied and with semantically-unimportant information removed. For example, a parsed transaction may comprise a URL from an HTTP request, along with the response (but not necessarily all the headers) it generated. In general, a transaction is an exchange between a client and a server that can be logically separated from other exchanges between the client and the server. For example, a transaction may comprise an HTTP request and the resulting response. Thus, a transaction request may comprise a request from a client for an exchange of data with a server.

Furthermore, in the example of FIG. 12, FTN 70 may send to a response generated by the last-occurring compromised VM to a network client (134). Sending the response generated by the last-occurring compromised VM to the network client may allow the attacker to continue under the assumption that the attack was successful. As a result, the attacker may provide information useful in identifying the attacker, understanding the nature or purpose of the attack, attacking the attacker, or performing other actions.

One problem researchers face is that of understanding the attack surface that a machine has exposed to the outside world. Since both the compromised VM and the FTN VMs remain operational, attack management unit 92 can analyze the attack surface by comparing the FTN VMs and the compromised VM to see how the compromised VM is attacking the FTN. In some examples, this can be done the initial quarantine (i.e., without providing more transaction requests to the compromised VM). In some examples, such as the example of FIG. 10, dispatcher 74 may continue providing transaction requests to the compromised VM and the VMs of the processing pipeline, and attack management unit 92 may compare the results as the processing moves forward. For example, a CVM may execute a transaction request and a non-compromised VM in the ordered sequence of VMs may execute that same transaction request. In this example, attack management unit 92 may compare a response to the subsequent transaction request generated by the compromised VM with a response to the subsequent transaction request generated by the non-compromised VM. In effect, this keeps the CVM attack surface exposed to the attacker while allowing FTN 70 to process accurate transactions and information to be gathered on the attacker, the attacker's interests, and the attacker's capabilities.

Additionally, in the example of FIG. 12, attack management unit 92 may roll back the states of the plurality of VMs based on stored checkpoints (136). In some examples where attack management unit 92 generates a separate copy of the last-occurring compromised VM, rolling back the plurality of VMs restores the plurality of VMs to a state based on the stored checkpoints while the copy of the last-occurring compromised VM may continue to run and receive transaction requests outside the processing pipeline. Thus, assuming the compromised VM is associated with the c'th position in the ordered sequence of VMs, attack management unit 92 may, in response to detecting the plurality of VMs includes the compromised VM, associate an additional VM with the c'th position in the ordered sequence of VMs in place of the compromised VM.

Attack management unit 92 may also add each of the last (n) transaction requests other than the last transaction request processed by the last-occurring compromised VM to the head of the transaction request queue (138). Action 138 is performed because rolling back the VMs in action 136 may effectively undo the changes to the states of the VMs caused by the last (n) transaction requests. However, the last (n) transaction requests may include legitimate transaction requests unassociated with any cyber-attack. Thus, undoing the effects of the legitimate transaction requests without reapplying the effects of the legitimate transaction requests may cause errors when the VMs process subsequent legitimate transaction requests. Thus, by adding each of the last (n) transaction requests other than the last transaction request to the head of the transaction request queue may allow the rolled-back VMs to process the legitimate transaction requests among the last (n) transaction requests, thereby arriving at a correct state for handling future legitimate transaction requests. In action (108) of FIG. 11, dispatcher 74 does not dispatch copies of transaction requests to the compromised VM that occurred prior to the last transaction request processed by the compromised VM. Thus, the compromised VM does not receive multiple copies of the same transaction requests.

Figure 13:
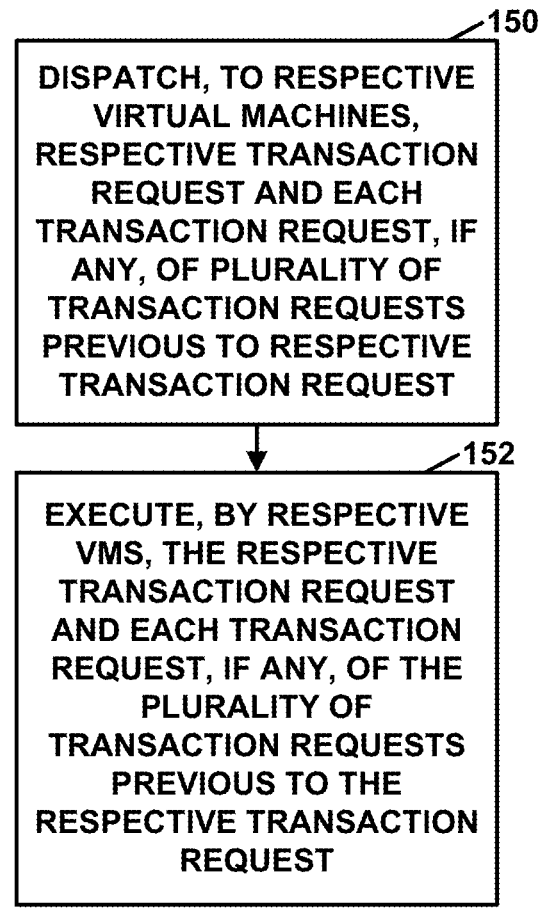
FIG. 13 is a flowchart illustrating an example operation for processing a respective transaction request of a plurality of transaction requests, in accordance with a technique of this disclosure.

FIG. 13 is a flowchart illustrating an example operation for processing a respective transaction request of a plurality of transaction requests, in accordance with a technique of this disclosure. The operation of FIG. 13 may implement the action in FIG. 11 of processing a transaction request in the processing pipeline of worker VMs 76 (FIG. 10). Thus, the operation of FIG. 13 may be performed for each respective transaction request of a plurality of transaction requests. In the example of FIG. 13, dispatcher 74 (FIG. 10) dispatches the respective transaction request and each transaction request, if any, of the plurality of transaction requests previous to the respective transaction request to respective VMs of the ordered sequence of VMs (150). Dispatching a transaction request to a VM may comprise forwarding a copy of the transaction request to the VM. Additionally, the respective VMs of the ordered sequence of VMs execute the respective transaction request and each transaction request, if any, of the plurality of transaction requests previous to the respective transaction request (152).

Thus, in an instance of the operations of FIG. 11-13, FTN 70 may run a plurality of VMs that includes (n) VMs. Each respective VM of the plurality of VMs may be associated with a respective position in an ordered sequence of the VMs. A first VM of the plurality of VMs is associated with a position in the ordered sequence of VMs occurring first. Furthermore, FTN 70 may receive a plurality of transaction requests that consists of (n) transaction requests. For each respective transaction request of the plurality of transaction requests, FTN 70 may dispatch the respective transaction request and each transaction request, if any, of the plurality of transaction requests previous to the respective transaction request to respective VMs of the ordered sequence of VMs. Additionally, the respective VMs of the ordered sequence of VMs may execute the respective transaction request and each transaction request, if any, of the plurality of transaction requests previous to the respective transaction request, wherein a service provided by the node is usable as part of the respective VMs of the ordered sequence of VMs executing the respective transaction request and each transaction request, if any, of the plurality of transaction requests previous to the respective transaction request. Based on the first VM having executed (n) transaction requests in the plurality of transaction requests, FTN 70 may detect whether any of the VMs has been compromised. In response to detecting the plurality of VMs includes a compromised VM, FTN 70 may isolate the compromised VM such that the compromised VM is unable to subsequently use the service. After isolating the compromised VM, FTN 70 may receive a subsequent transaction request, dispatch the subsequent transaction request to the compromised VM, and the compromised VM may execute the subsequent transaction request.

Figure 14:
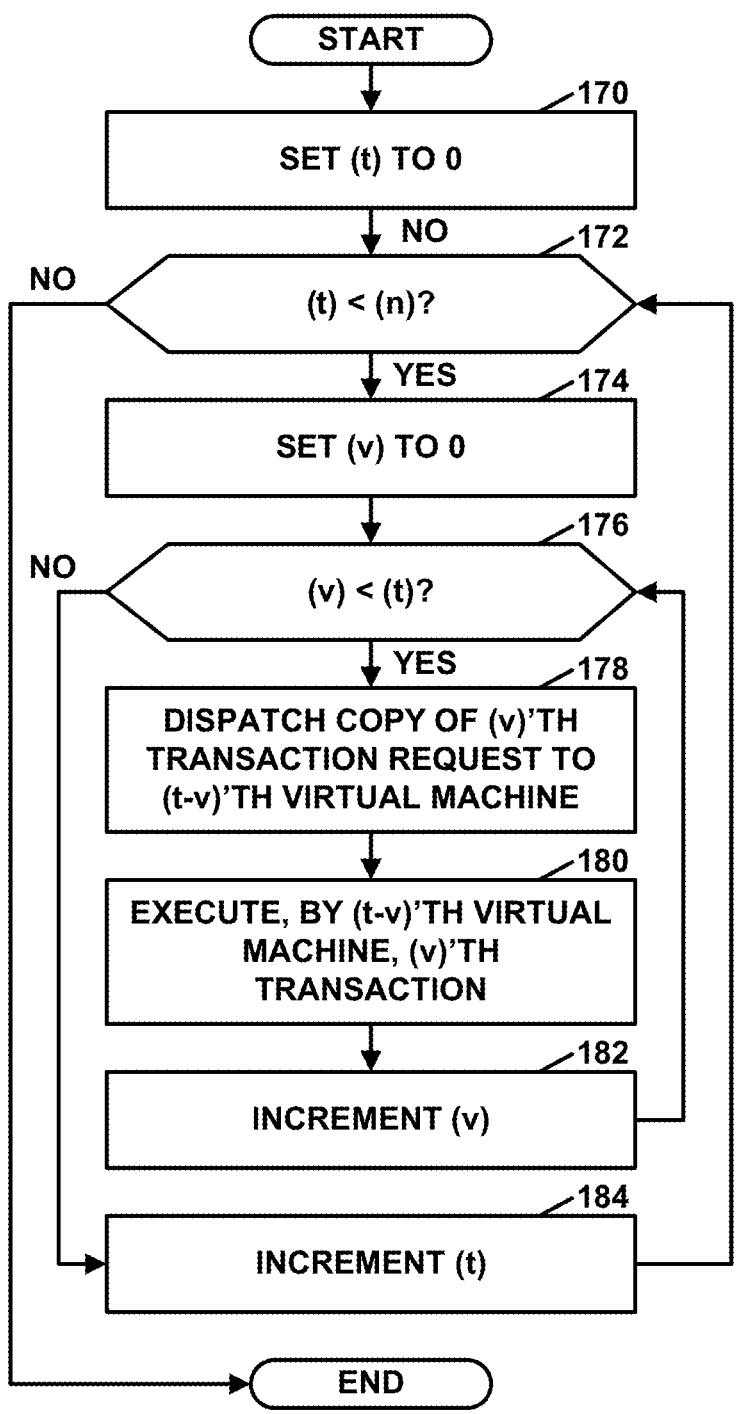
FIG. 14 is a flowchart illustrating an example operation for processing a plurality of (n) transaction requests in a processing pipeline, in accordance with a technique of this disclosure.

FIG. 14 is a flowchart illustrating an example operation for processing a plurality of (n) transaction requests in a processing pipeline, in accordance with a technique of this disclosure. The operation of FIG. 14 is an example way of performing of performing the operation of FIG. 13 for each transaction request of a plurality of transaction requests. In the example of FIG. 14, each of worker VMs 76 (FIG. 10) is associated with a respective position in an ordered sequence of VMs indexed from to 0 to (n−1), where n is the number of worker VMs 76. Additionally, each transaction request of the plurality of (n) transaction requests is associated with a position in an ordered sequence of transaction requests indexed from 0 to (n−1).

In the example of FIG. 14, dispatcher 74 (FIG. 10) sets a time step value (t) to 0 (170). Dispatcher 74 may then determine whether (t) is less than (n) (172). In response to determining that (t) is less than (n) ("YES" branch of 202), dispatcher 74 sets a value (v) to 0 (174). Next, dispatcher 74 determines whether (v) is less than (n) (176).

In response to determining that (v) is less than (n) ("YES" branch of 176), dispatcher 74 dispatches a copy of the v'th transaction to the (t−v)'th VM in the ordered sequence of VMs (176). The (t−v)'th VM executes the v'th transaction (180). Additionally, dispatcher 74 increments (v) (182). Dispatcher 74 then determines again whether (v) is less than (t) (176). If (v) is still less than (t), actions 178-182 may be repeated with the incremented value of (v).

However, in response to determining (v) is not less than (t) ("NO" branch of 176), dispatcher 74 increments (t) (184). Dispatcher 74 may then determine again whether (t) is less than (n) (172). If (t) is still less than (n), actions 174-184 may be repeated with the incremented value of (t). However, in response to determining (t) is not less than (n) ("NO" branch of 172), the operation for processing the series of transaction requests ends. Action (172) of FIG. 14 may correspond to action (112) of FIG. 11. Thus, after determining (t) is not less than (n) in action 172 of FIG. 14, validator 82 (FIG. 10) may detect whether any of worker VMs 76 have been compromised (action 114 of FIG. 11).

An entity may initiate a cyber-attack in order to cause a computing system to perform actions not desired by an operator of the computing system. For example, an entity may initiate a cyber-attack in order to cause the computing device to provide sensitive data to the entity without permission from the operator of the computing system. In another example, an entity may initiate a cyber-attack in order to cause the computing device to become non-functional.

Many types of cyber-attacks are implemented by causing a low access level process of a server computing system to store malicious software code (e.g., malware) and/or other malicious data. For example, the low access level process may embed malicious software code and/or other malicious data in one or more operating system files, random access memory, or a Basic Input/Output System (BIOS). Although this disclosure refers to software or data associated with cyber-attacks as being "malicious," cyber-attacks may be initiated for lawful purposes. A process with a higher access level (e.g., an operating system) may then execute the malicious software code or otherwise use the malicious data. The subsequent execution of the software code or use of the malicious data by the higher access level process may cause the server computing system to perform actions not desired by an operator of the computing system.

For example, a client computing device may initiate a cyber-attack on a server computing system by sending a request for the server computing system to perform a first transaction. The transaction may be a discrete unit of interaction between the server computing system and a client computing device. In this example, the server computing system may execute the first transaction, which causes the server computing system to store malicious software code in a random access memory (RAM) or a persistent storage device associated with the server computing system. In this example, the malicious software code may persist after execution of the first transaction is complete. Furthermore, in this example, the server computing system may execute a second transaction. The second transaction may or may not be associated with the cyber-attack. During execution of the second transaction, the server computing system may execute or otherwise use the malicious software code, resulting in the server computing system performing actions not desired by the operator of the server computing system, such as divulging secret data.

Particular techniques of this disclosure may at least partially address one or more of the problems described above. For example, a server computing system may receive messages from client computing devices. The messages may include requests from client computing devices for the server computing system to initiate transactions. In this disclosure, a "transaction" may be a discrete unit of interaction between a server computing system and a remote client computing device. In this example, the server computing system may assign each of the transactions of a different VM (VM). When the server computing system assigns a transaction to a VM, the VM is in a "fresh" state, meaning that the server computing system has not previously assigned a transaction to the VM. Because the VM is in a fresh state, there may be no opportunity for a previous transaction to infect the VM with malicious software code or malicious data. After the transaction is complete, the server computing system may discard the VM. Thus, in this example, the server computing system does not assign another transaction to the VM or otherwise reuse the VM. In this way, each VM instance may process one (or more) transactions for a client and is then deleted. This periodic deletion of VMs may prevent an attacker from gaining a foothold within the server computing system's execution environment.

Furthermore, the server computing system may be associated with a shared database. The shared database may be persistent independent from any of the VMs. When VMs execute transactions, the VMs may request modifications to data in the shared database. Such modifications may include additions to the data in the shared database, modifications of existing data in the shared database, deletions of existing data in the shared database, and so on. In accordance with some examples of this disclosure, the server computing system may generate checkpoints associated with the transactions. If a particular transaction is suspected of being associated with a cyber-attack, the server computing system may use one or more checkpoints associated with the particular transaction to roll back changes to the shared database initiated by execution of the particular transaction. Rolling back changes to the shared database may help to prevent the storage of malicious code or malicious data in the shared database.

Figure 15:
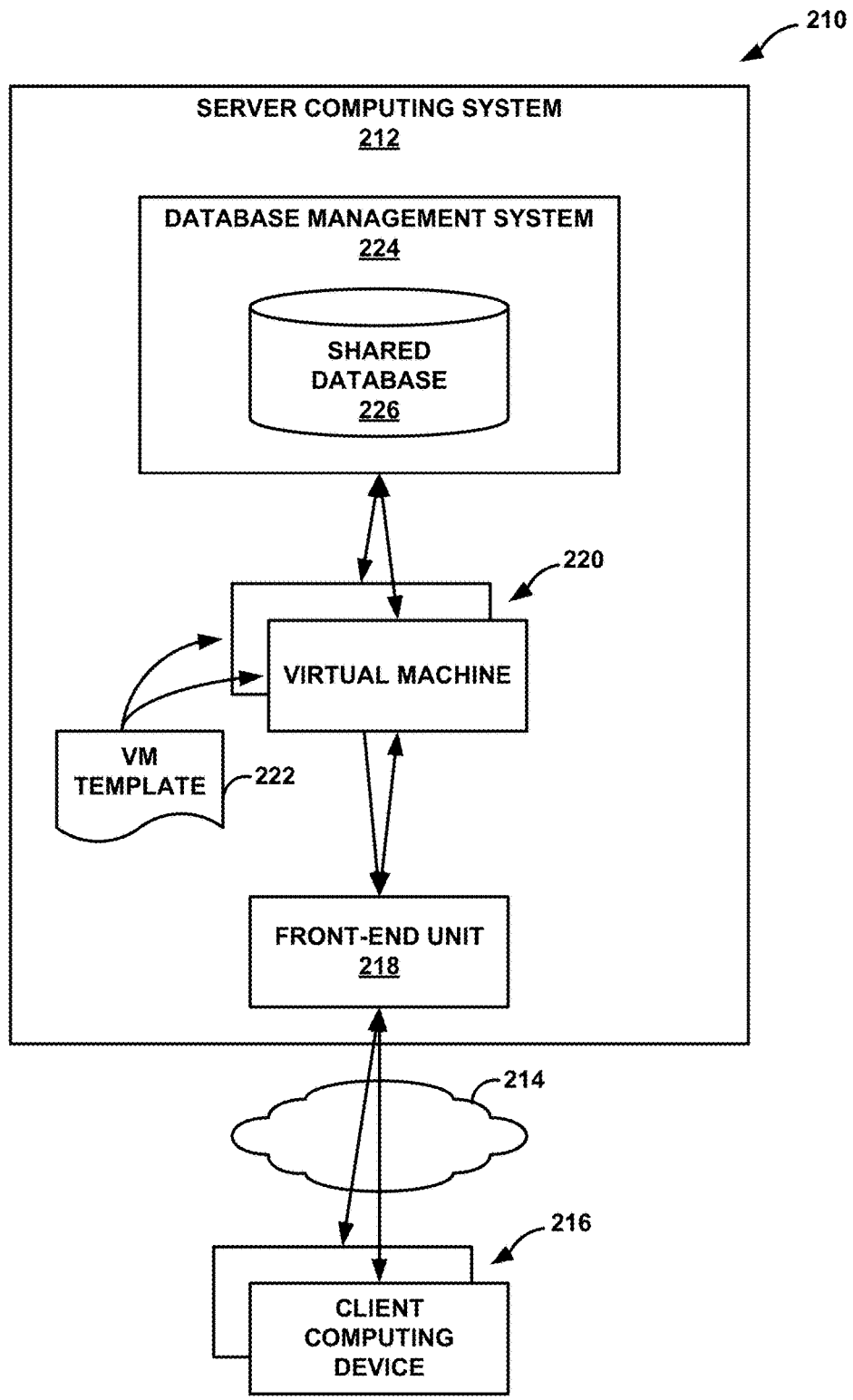
FIG. 15 is a block diagram illustrating an example system that may utilize one or more techniques of this disclosure.

FIG. 15 is a block diagram illustrating an example system 210 that may utilize one or more techniques of this disclosure. In the example of FIG. 15, system 210 includes a server computing system 212, a network 214, and a plurality of client computing devices 216. Other examples may include more, fewer, or different components, devices, and/or systems.

Server computing system 212 may provide a Fight-Through Node with Disposable VMs (FTN-D). In general, FTN-Ds may be computer systems that are resilient against cyber compromise. In other words, FTN-Ds may be designed to be resilient to attacks and operate reliably despite compromise. As described herein, server computing system 212 may use a pool of ephemeral VMs to isolate and destroy malware (i.e., malicious software and/or data) in applications' primary execution environments. Furthermore, as described herein, persistent data managed by server computing system 212 may be frequently (e.g., periodically) check-pointed so that changes to the persistent data may be rapidly rolled back to previous states if compromise is suspected. That is, the technologies used to achieve resiliency may include sandboxing, disposable VMs, parallel processing, rapid checkpointing, and rapid restoration. While survivable against many network attacks (i.e., cyber-attacks), the design of an FTN-D may be particularly effective against more insidious host-based attacks that compromise a server.

Server computing system 212 (i.e., a FTN-D) may replace or augment nodes (e.g., servers) on enterprise networks, military networks, governmental networks, or other types of networks. In some examples, an FTN-D may be an intrusion-tolerant system that is used to replace network nodes (e.g., servers) hosting mission-critical services in a network. Networks equipped with FTN-Ds may be resilient, enabling critical processes to operate despite successful attacks on nodes of the network.

Server computing system 212 may be implemented using one or more computing devices. Each of the one or more computing devices may be a physical device for processing information. Example types of computing devices may include server computing devices, personal computers, mobile computing devices, in-vehicle computing devices, and other types of physical devices for processing information. In some examples, the FTN-D provided by server computing system 212 comprises a software solution that may optionally include dedicated hardware (e.g., one or more physical servers that use VMs to run the same network-available services as an existing server). Furthermore, in some examples, server computing system 212 may comprise commodity hardware located physically and logically inside an entity's (e.g., an enterprise's) network. In other examples, server computing system 212 may provide the FTN-D as a cloud service, using cloud resources instead of local hardware. A cloud-based version of a FTN-D may flexibly scale up or down the number of VMs in a pool of initialized VMs depending on client traffic.

Each of client computing devices 216 may comprise one or more computing devices. For example, client computing devices 216 may include personal computers, mobile computing devices (e.g., laptops, smartphones, tablet computers, etc.), server computing devices, intermediate network devices (e.g., routers, switches, etc.), and/or other types of physical devices for processing information. A client computing device acts as a client of a service, such as a service provided by a server device.

Network 214 may facilitate communication between client computing devices 216 and server computing system 212. Network 214 may include various types of communication networks. For example, network 214 may include one or more cellular data networks, one or more wired or wireless local area networks (LANs), one or more wide area networks (WANs), the Internet, and/or another type of communication network.

In the example of FIG. 15, server computing system 212 comprises a front-end unit 218, a plurality of VMs (VMs) 220, a VM template 222, and a database management system 224. Front-end unit 218, VMs 220, and database management system 224 may be implemented as software executed by one or more processing circuits of the one or more computing devices of server computing system 212. Furthermore, in some examples, front-end unit 218, VMs 220, and database management system 224 may be implemented as software executed by one or more processing circuits of different computing devices of server computing system 212. Thus, in such examples, front-end unit 218 may be implemented as software executed by one or more processing circuits of a first computing device of server computing system 212, database management system 224 may be implemented as software executed by one or more processing circuits of a second computing device of server computing system 212, and VMs 220 may be implemented as software executed by one or more processing circuits of one or more additional computing devices of server computing system 212.

Front-end unit 218 may comprise one or more front-end components that mediate between external clients (e.g., client computing devices 216) and VMs 220 by forwarding transaction traffic. For example, front-end unit 218 may comprise a listener, a connection handler, a proxy, a dispatcher, an accumulator, a logger, and/or other front-end components.

Front-end unit 218 may receive messages from client computing devices 216 via network 214. The messages may include various types of information. For example, front-end unit 218 may receive, from one of client computing devices 216, a message that implicitly or explicitly includes a request to initiate a transaction. The transaction may be a discrete unit of interaction between server computing system 212 and the client computing device. In one example, the transaction may be a Transmission Control Protocol (TCP) connection (i.e., a TCP session). In this example, front-end unit 218 may receive a TCP SYN message from the client computing device. The TCP SYN message may include a request to initiate a TCP connection. In other examples, the transaction may be a SQL session or another type of session. In examples where a transaction is a session, server computing system 212 may receive multiple messages associated with the session. In other examples, the transaction may comprise a single message, such as a Hypertext Transfer Protocol (HTTP) request. In another example, a transaction may be an application-level message from one of client computing devices 216 followed by a corresponding return message from server computing system 212. Because many network protocols are designed with a transactional model, the approach of this example may be applicable to a wide variety of services.

In examples where transactions are TCP sessions, the techniques of this disclosure may be applicable to any application based on TCP. Furthermore, in such examples, it may not be necessary to customize front-end unit 218 for each application by specifying how applications define transactions. Examples where transactions are TCP sessions may require less overhead to process complex client-server interactions than examples where transactions are application-level messages, and may therefore be performed faster and more securely. In some instances, front-end units (e.g., firewall, handler, dispatcher, etc.) that operate on a TCP session level may be less complex (and hence have a smaller attack surface) than front-end units that operate at an application level.

In response to receiving, from one of client computing devices 216, a message that comprises a request to initiate a transaction, front-end unit 218 may assign the transaction to one of VMs 220. In addition, front-end unit 218 may forward the message to the VM assigned to the transaction. In some examples, front-end unit 218 may receive, from the client computing device, additional messages associated with the transaction. In such examples, front-end unit 218 may forward the additional messages to the VM assigned to the transaction. For example, front-end unit 218 may receive a TCP SYN message from a client computing device and may assign the corresponding TCP session to one of VMs 220. In this example, front-end unit 218 may forward the TCP SYN message to the assigned VM and may also forward other TCP messages associated with the TCP session (e.g., TCP ACK messages, TCP FIN messages, etc.) to the assigned VM.

In some examples, front-end unit 218 does not assign a transaction to one of VMs 220 if front-end unit 218 has previously assigned a transaction to the VM. Thus, when front-end unit 218 assigns a transaction to one of VMs 220, the VM may be in a "fresh" state. In other words, a fresh VM is used for each transaction. It may be possible for front-end unit 218 to assign each transaction to a different fresh VM by handling transactions in disposable VMs. In general, a disposable VM may be a VM intended to be used briefly and discarded. Each of VMs 220 may be a disposable VM.

In some examples, because none of VMs 220 has previously processed a transaction, there may be no opportunity for a previous transaction to install malicious code or malicious data on VMs 220, or otherwise reconfigure VMs 220. Thus, using disposable VMs to interact with other computers may prevent stealth malware from persistently infecting server computing system 212 or other computing systems by embedding itself in sensitive data storage areas, such as operating system files of VMs 220, in RAM, a cache, registers, or a BIOS.

In the example of FIG. 15, each of VMs 220 is based on a VM template 222. Thus, each of VMs 220 may have the same initial state. For instance, each of VMs 220 may be based on an image that includes executable software code, an operating system, drivers and all components that provide the operating environment for executing the transactions. In other words, prior to one of VMs 220 being assigned a transaction, the VM may have the same state as each other one of VMs 220 that has not yet been assigned a transaction for execution. VM template 222 may be stored on a persistent or volatile storage medium accessible by server computing system 212. Furthermore, VM template 222 may be determined to be free of malicious code and malicious data, or otherwise approved for use (e.g., following testing, assertion, or by other means). In this way, VMs 220 may all be instantiated from a common template (which can be hardened and known to be clean of infection). In other words, each of the plurality of VMs 220 may be initialized from a common template that has been determined to be free of malware infection.

In some examples, front-end unit 218 may initialize a VM from VM template 222 in response to front-end unit 218 receiving a request to initiate a transaction. In such examples, after initializing the VM, front-end unit 218 may assign the transaction to the newly initialized VM. Thus, initializing a VM may be part of assigning a transaction to the VM. In some examples, front-end unit 218 may initialize a VM in response to front-end unit 218 receiving a request to initiate a TCP session. Thus, in such examples, each new TCP session may cause a new VM to be launched (e.g., initialized).

In other examples, front-end unit 218 may initialize a pool of VMs from VM template 222. The pool of VMs may include a plurality of VMs. In such examples, when front-end unit 218 receives a request to initiate a transaction and assigns the transaction to a VM, front-end unit 218 may select the VM from among the pool of VMs. Thus, front-end unit 218 may assign the transaction to a VM that was initialized prior to front-end unit 218 receiving the request to initiate the transaction. In this way, a new VM may be instantiated for each incoming transaction, either on demand or pre-fetched.

Each of VMs 220 may comprise a software implementation of a machine (i.e., a computing device) that executes programs like a physical machine. Furthermore, VMs 220 may contain one or more applications (e.g., servers) that process client transactions. In some examples, the FTN-D provided by server computing system 212 may run a single application (e.g., a web server) which runs inside each VM instance (e.g., each of VMs 220). In alternative examples, the FTN-D may run multiple applications, either by running multiple applications within the same VM instances (e.g., VMs 220), or by dedicating different VM instances to different applications.

In some examples, one or more of VMs 220 may comprise a system VM (i.e., an operating system-level VM). A system VM may provide a complete system platform that supports execution of a complete operating system, such as Microsoft Windows, Linux, and so on. In some examples where VMs 220 are system VMs, VMs 220 may implement hardware virtualization. In other examples, one or more of VMs 220 may be a process VM (i.e., an application-level VM). A process VM may run a single application. Ideally, an application running on a process VM may only use resources and abstractions provided by the process VM.

Furthermore, in some examples, server computing system 212 may use one or more hypervisors to support one or more of VMs 220. A hypervisor may be a piece of software, firmware, and/or hardware that creates and runs VMs. In some examples, the hypervisor is a Type 1 hypervisor. In other examples, the hypervisor is a Type 2 hypervisor. A Type 1 hypervisor runs directly on a host computing device's hardware to control the hardware and to manage one or more guest operating systems (e.g., VMs). A Type 2 hypervisor may run within a conventional operating system environment.

In some examples, server computing system 212 may use a paravirtualization technique to support one or more of VMs 220. Paravirtualization is a virtualization technique that presents a software interface to VMs that is similar but not identical to that of the underlying hardware. Paravirtualization may require some modification to software. Furthermore, in some examples, server computing system 212 may use full virtualization to support one or more of VMs 220. Full virtualization may involve an almost complete simulation of the underlying hardware and may allow software (e.g., an operating system) to run unmodified. Thus, VMs 220 may be a variety of types (e.g., Type 1 hypervisor, Type 2 hypervisor, paravirtualized, fully virtualized, application-level, operating system-level, etc.). In other words, each of the plurality of VMs 220 may be a type I hypervisor, a type II hypervisor, a paravirtualized VM, a fully virtualized VM, an application-level VM, or an operating system-level VM.

In some examples, front-end unit 218 may assign transactions to VMs 220 such that VMs 220 execute the transactions serially in chronological order. That is, front-end unit 218 may wait to assign a transaction to a VM until another VM has finished processing a previous transaction. Assigning transactions to VMs in this way may help to enforce transaction ordering.

Alternatively, front-end unit 218 may assign transactions to VMs 220 such that VMs 220 may execute transactions in parallel. That is, front-end unit 218 may assign transactions to VMs 220 such that two or more of VMs 220 may be concurrently processing different transactions. Assigning transactions to VMs in this way may enable server computing system 212 to service multiple clients simultaneously or to service multiple transactions from a single client simultaneously. Thus, VMs 220 can execute client transactions serially in chronological order or in parallel.

After one of VMs 220 completes a transaction, server computing system 212 may discard the VM. For example, the transaction may be a TCP session that front-end unit 218 has assigned to a particular VM. In this example, server computing system 212 may discard the particular VM after the particular VM outputs a TCP FIN message to a client computing device and has received an ACK message from the client computing device in response to the TCP FIN message. In this way, when the TCP session ends, the particular VM is discarded. For example, a particular message may comprise a request to initiate a TCP session between server computing system 212 and a particular client computing device among client computing devices 216. In this example, server computing system 212 may determine that the particular transaction request is complete when the TCP session terminates. In another example, a transaction may consist of a single request from a client computing device and a single response from server computing system 212 to the request. Thus, in this example, the transaction may start when server computing system 212 receives the request and the transaction may be complete when server computing system 212 sends the response to the request.

When server computing system 212 discards one of VMs 220, server computing system 212 may return the resources of the VM to a pool of available resources and all state information of the VM may be lost. For example, each of VMs 220 may include RAM and a file system on a virtual "hard disk." In this example, a VM may use the file system on the VM's virtual "hard disk" to store application files, a database, and/or other types of data. In this example, data stored in the VM's RAM and virtual "hard disk" may be deleted, overwritten (e.g., with random data or "zero'ed out"), and/or become functionally inaccessible when the VM is discarded.

Because VMs 220 are discarded after VMs 220 complete transactions, any malware installed on VMs 220 while processing the transactions may be discarded along with VMs 220. For example, malware may be installed in one of VMs 220 while the VM is processing a transaction. That is, many types of cyber-attacks attempt to make permanent malicious changes to a machine (e.g., installation of a rootkit or malicious modification of a Windows registry). In this example, the malware is discarded with the VM is discarded. As a result, the malware may not be present when server computing system 212 processes another transaction. Consequently, the immediate harm from the transaction may be relatively small or non-existent. In this way, server computing system 212 may implement a security model based on discarding attacked servers rather than preventing attacks.

In general, each of VMs 220 operates within its own "sandbox." Thus, VMs 220 are unable to modify the state or data of any other one of VMs 220. Moreover, because each of VMs 220 operates within its own sandbox, VMs 220 may only be able to effect server computing system 212 in limited ways, such as by modifying data in shared database 226 or by sending messages for transmission to client computing devices 216. Furthermore, because each of VMs 220 operates within its own sandbox, the effects of a successful cyber-attack on one of VMs 220 may be limited to that VM and do not affect other parts of server computing system 212.

As part of processing transactions initiated by client computing devices 216, VMs 220 may generate messages to send to client computing devices 216. When VMs 220 generate messages to send to client computing devices 216, VMs 220 may send the messages to front-end unit 218. Front-end unit 218 may then forward the messages to appropriate ones of client computing devices 216. In this way, responses resulting from requests from clients (e.g., client computing devices 216) may be sent back from VMs 220 to the clients via front-end unit 218. In some examples, each of VMs 220 and front-end unit 218 have be assigned a different Internet Protocol (IP) address. In such examples, source IP address fields of IP packets sent by front-end unit 218 may specify the IP address of front-end unit 218. Likewise, destination IP addresses of IP packets sent by client computing devices 216 to server computing system 212 may specify the IP address assigned to front-end unit 218. Front-end unit 218 may use other information in the IP packets received by front-end unit 218 to forward the IP packets to particular ones of VMs 220.

In some examples, front-end unit 218 may store transaction responses from VMs 220 until an intrusion detection system has validated the transaction responses as benign. In this example, front-end unit 218 may only send a transaction response back to one of client computing devices 216 after the intrusion detection system has validated that the transaction response is benign. Furthermore, in one example, front-end unit 218 may duplicate requests from a client computing device and may forward the requests to a plurality of VMs. In this example, front-end unit 218 may store the results from each of the multiple VMs and compare the results for consistency before returning one of the results to the client computing device. In this example, each of the plurality of VMs may run different software (i.e., front-end unit 218 may assign the copies of the request to VMs having software diversity) such that each VM may react to a cyber-attack in a different way.

In the example of FIG. 15, shared database 226 comprises a database that is read and/or write accessible by each of VMs 220 (i.e., VMs assigned to process transactions initiated by client computing devices 216). In other words, shared database 226 may be accessible to each of the plurality of VMs 220. In general, shared database 226 may be an organized collection of data. In some examples, shared database 226 may be read and/or write accessible by software, firmware, and/or hardware other than or in addition to VMs 220.

Shared database 226 may store various types of data. For example, shared database 226 may store website data, application state data, session state data, documents, navigation data, scientific data, business data, military data, governmental data, file system data, or various other types of data. Shared database 226 may be implemented in various ways. For example, shared database 226 may comprise a relational database. In another example, shared database 226 may comprise a file system. In a third example, shared database 226 may comprise a block-level storage abstraction. Other applicable types of databases may include NoSQL databases, NewSQL databases, object-oriented databases, RDF databases, XML databases, and so on.

Shared database 226 may be persisted independently of VMs 220. Thus, shared database 226 may continue to exist and be accessible regardless of whether any of VMs 220 exist. For instance, shared database 226 may exist and may be accessible before any of VMs 220 are instantiated and after all of VMs 220 are discarded.

Furthermore, as part of processing transactions initiated by client computing devices 216, VMs 220 may generate database modification requests. The database modification requests may be requests to modify data in shared database 226. In this disclosure, a database modification request may be "associated with" a transaction when a VM generates the database modification request as part of processing the transaction. VMs 220 may generate database modification requests to modify data in shared database 226 because data written to RAM, virtual "hard disks," or other real or virtual data storage media associated with VMs 220 may be deleted (and/or become functionally inaccessible) when VMs 220 are discarded. For instance, the use of disposable VMs may assume a component to hold persistent (shared) state, such as shared database 226. Thus, the example FTN-D design of FIG. 15 may be suitable for many server applications that maintain persistent state on a backend server.

Database management system 224 may receive database modification requests from VMs 220. Furthermore, database management system 224 may perform modifications to shared database 226 in response to the database modification requests. For example, database management system 224 may receive a database modification request associated with a particular transaction. In this example, database management system 224 may perform a modification to shared database 226 in response to the database modification request associated with the respective transaction request.

In some examples, database management system 224 may implement an Application Programming Interface (API). In some such examples, VMs 220 may generate database modification requests when VMs 220 invoke particular methods of the API. Likewise, database management system 224 may receive a database modification request when database management system 224 receives an invocation of a method of the API. Thus, in some examples, the local results of client transactions processed by VMs 220 may be saved via a limited API to a persistent, shared storage component (e.g., a file system) that is integrated with a FTN-D provided by server computing system 212. In some examples, a persistent file system stored at shared database 226 may be configured to only interact with specific ones of VMs 220, and only interact in specific ways using the limited API. For instance, a Network File System (NFS) protocol may be used as an interface between VMs 220 and the persistent shared file system.

The use of shared database 226 (e.g., a shared file system) may provide for continuity of application state between transactions. For example, as part of processing a first transaction, a first VM may generate a database modification request to write a particular piece of data to shared database 226. In this example, as part of processing a second transaction, a second VM may generate a database read request to read the particular piece of data from shared database 226. In another example, server computing system 212 may host a content management system. In this example, server computing system 212 may need to save files or update a database, and if these changes were made locally inside the ephemeral VMs 220, the changes would be deleted when VMs 220 are discarded.

Some applications maintain state between transactions (e.g., either in application memory, on disk, etc.). For example, a web server may have a persistent session with a client (e.g., one of client computing devices 216). The FTN-D provided by server computing system 212 may transfer such internal application state between VM instances via shared database 226 (e.g., a persistent shared file system). In some examples, application state is flushed to the shared file system before a VM is destroyed, and read back in by applications when new VMs are instantiated. Thus, the VM may generate a database modification request as part of completing a transaction. The database modification request may request storage to shared database 226 of an application running on the VM.

In accordance with one or more examples of this disclosure, database management system 224 may implement checkpointing and rollback for shared database 226. Checkpointing is used to record a state history of shared database 226 (e.g., a persistent shared file system). The use of checkpointing may allow shared database 226 to roll back if a compromise is detected on shared database 226. Shared database 226 may be checkpointed at some interval (e.g., after each client transaction or some multiple number of client transactions) to preserve a fine-grained history of the state of shared database 226. In some examples, checkpointing may rely on a file system such as ZFS to create differential snapshots of the file system state. In such examples, the ZFS file system may be used because the ZFS file system natively supports checkpointing and rollback.

In accordance with one or more examples of this disclosure, a transaction may be determined to be associated with a cyber-attack. In some such examples, an intrusion detection system (IDS) operating on server computing system 212 or another computing system may determine that a transaction is associated with a cyber-attack. In other examples, a human may determine that a transaction is associated with a cyber-attack. In general, a transaction may be determined to be associated with a cyber-attack if the transaction constitutes (e.g., comprises) an attempt to cause server computing system 212 or another computing system to perform actions not desired by an operator of server computing system 212 (e.g., an enterprise, governmental unit, etc.).

In response to determining that a transaction is associated with a cyber-attack, database management system 224 may use checkpoint data associated with the transaction to roll back modifications to shared database 226 performed in response to database modification requests associated with the transaction. In some examples, a rollback may be automatically triggered when an unauthorized change to shared database 226 (e.g., a file system) is detected (e.g., using a file system IDS, an application-level IDS, an OS-level IDS, or by manual inspection). In some examples, the rollback may be triggered manually. In one example, shared database 226 may comprise a file system and database management system 224 may check the file system state for correctness. In this example, if the state is incorrect (e.g., because of a transaction associated with a cyber-attack), the state can be rolled back to a previous correct snapshot. In other words, the persistent shared file system can also be restored to an earlier checkpoint. In examples that use checkpointing and a persistent shared state file system, a transaction may be a unit of computation used to form discrete points for disposing of VMs and/or checkpointing a persistent shared state file system.

In many instances, IDSs have high rates of both false negatives (i.e., missed cyber-attacks) and false positives (i.e., false alarms). Furthermore, in many instances, Intrusion Prevention Systems (IPSs) have high rates of both false negatives (i.e., permitting cyber-attacks) and false positives (i.e., denying legitimate activity). An IPS may monitor network and/or system activities for malicious activity, log information about the malicious activity, attempt to block and/or stop the malicious activity, and report the malicious activity. Furthermore, the rate at which humans can identify cyber-attacks is slow. Accordingly, IDSs, IPSs, and human analysis may not be reliable for fighting through cyber-attacks. For at least this reason, the FTN-D provided by server computing system 212, in some examples, does not attempt to prevent cyber-attacks within a transaction (e.g., session). For instance, in some examples, IDSs and IPSs of server computing system 212 do not try to find or block malware while the malware is executing. Rather, server computing system 212 may run each transaction to completion and then discard the VMs on which the transactions ran. For example, if a transaction installed a rootkit on a VM, the rootkit is discarded with the VM. If the transaction modified the persistent application state on shared database 226 in some way, server computing system 212 may discover the incorrect state by application-level checks and may correct the state by rollback. Discrete points in time at which the FTN-D disposes of VMs and creates checkpoints may be determined by discrete units of interaction with remote clients that may be called "transactions." For example, server computing system 212 may generate a checkpoint in response to initiation or termination of a TCP session.

In some examples, the FTN-D provided by server computing system 212 is scaled back in order to provide reduced functionality with better performance. This disclosure may refer to such scaled back versions as "lightweight" FTN-Ds. For example, applications providing a read-only service might not need a persistent shared storage component (e.g., shared database 226). Accordingly, the persistent shared storage component, along with the checkpointing processes, the rollback processes, and any IDS or validation component, may be eliminated. In cases where database management system 224 and associated processes are eliminated, the remaining FTN-D components may integrate instead with a third-party persistent storage system, or a third-party processing system.

One example principle behind the FTN-Ds of this disclosure is similar to the concept of fault tolerance. However, faults may be independent failures, such as hardware malfunctions, and may occur without malicious intent. The response to faults may simply be to repair or replace failed components, with little likelihood of a repeated fault in the near term. Fault-tolerant systems typically use approaches such as replication and redundancy. In contrast to fault tolerant systems, FTN-Ds may be intrusion tolerant systems, a general property of which is that a successful attack on one part of a system should not affect its overall security. Intrusion tolerance may be related to fault tolerance but may be more difficult to address because intrusions may exploit systemic design vulnerabilities, and may occur with malicious intent. Fault tolerant techniques such as component replication may not protect against intrusions, because all components are susceptible to the same attack, and attacks can be repeated frequently. In fact, fault tolerant and intrusion tolerant approaches may not necessarily complement each other. For example, the common fault tolerant approach of replication may generally increase attack surface and the likelihood of compromise. Intrusion tolerance (or attack tolerance) is a type of survivability or resiliency strategy. Some existing resiliency strategies focus on mitigating denial of service (DoS) attacks at the network level to maintain service availability. In contrast to techniques that mitigate only denial of service attacks, the FTN-Ds of this disclosure may focus on mitigating host compromises, which may include a range of attacks on confidentiality, integrity, and availability. Because of this focus, FTN-Ds may be effective against more subtle security threats, such as advanced persistent threats and stealth malware. As described herein, FTN-Ds may run applications inside of VMs to isolate compromises from the host hardware and OS. Common terminology for running one or more clients inside a VM is "virtual appliance" or "browser appliance."

Figure 16:
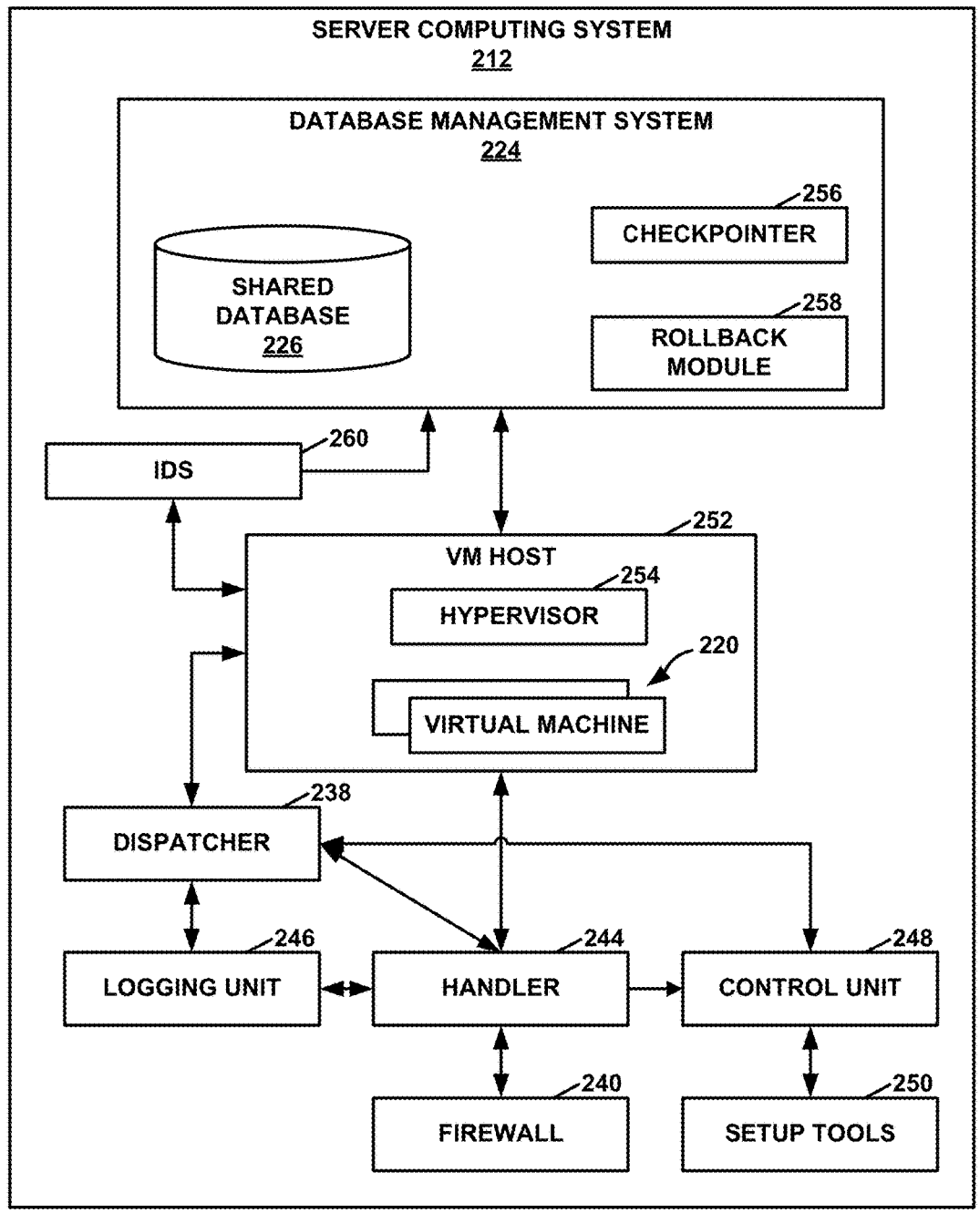
FIG. 16 is a block diagram illustrating an example server computing system, in accordance with one or more techniques of this disclosure.

FIG. 16 is a block diagram illustrating an example server computing system 212, in accordance with one or more techniques of this disclosure. In the example of FIG. 16, server computing system 212 comprises a dispatcher 238, database management system 224, a firewall 40, a handler 244, a logging unit 246, a control unit 248, setup tools 250, and a VM host 252. In some examples, front-end unit 218 (FIG. 15) includes dispatcher 238, firewall 40, handler 244, control unit 248, and setup tools 250. In other examples, server computing system 212 may include more, fewer, or different components.

Firewall 40 may receive data from a network (e.g., network 214). Firewall 40 forwards data that satisfy particular criteria (e.g., data specifying particular port numbers, data specifying particular protocol identifiers, etc.). Firewall 40 does not forward received data that do not satisfy the particular criteria. Handler 244 may receive specific types of data forwarded by firewall 40. For example, handler 244 may receive TCP data forwarded by firewall 40. In another example, handler 244 may receive HTTP data forwarded by firewall 40. When handler 244 receives a data, handler 244 may provide the same or different data to logging unit 246. Logging unit 246 may process and/or store data in order to log data received by handler 244. In addition, handler 244 may forward messages (e.g., TCP messages) to dispatcher 238.

In the example of FIG. 16, VM host 252 comprises a hypervisor 254 and VMs 220. Hypervisor 254 may create and run VMs 220. Hypervisor 254 may be a Type 1 or a Type 2 hypervisor. In other examples, VM host 252 may comprise multiple hypervisors and VMs 220 may run on different ones of the hypervisors of VM host 252. Each of VMs 220 may be a disposable VM in that each of VMs 220 may be discarded after a transaction assigned to the VM is complete.

Dispatcher 238 may identify transactions associated with the messages received from handler 244. In addition, dispatcher 238 may interact with VM host 252 to assign transactions to VMs 220. In some examples, dispatcher 238 may send requests to hypervisor 254 to instantiate a new VM. In other examples, dispatcher 238 may select a VM from a pool of fresh VMs previously instantiated by hypervisor 254. Furthermore, when dispatcher 238 assigns a transaction to a VM, dispatcher 238 may instruct handler 244 to forward messages associated with the transaction to the VM assigned to the transaction. Logging unit 246 may log data provided by dispatcher 238 (and/or data based on data provided by dispatcher 238).

Control unit 248 may provide a user interface for configuration and control of server computing system 212. In some examples, the user interface is a local or remote graphical user interface (GUI), a command line interface, or another type of interface. Logging unit 246 may log data provided by control unit 248 (and/or data based on data provided by control unit 248). Setup tools 250 may comprise tools for configuring server computing system 212. For example, setup tools 250 may include an FTN-D installer application, a VM deployment tool, and so on. In this example, the VM deployment tool may include tools for service and appliance configuration, tools for operating system configuration, tools for platform configuration, and/or other types of tools.

In the example of FIG. 16, database management system 224 comprises shared database 226, a checkpointer 256, and a rollback module 258. In some examples, when database management system 224 receives a database modification request from one of VMs 220, database management system 224 may apply changes indicated by the database modification request to shared database 226. Furthermore, when database management system 224 receives a database modification request from one of VMs 220, checkpointer 256 may generate checkpoint data. Rollback module 258 may use the checkpoint data to roll back changes to shared database 226.

Furthermore, in the example of FIG. 16, server computing system 212 includes an IDS 260. IDS 260 may analyze data to determine whether a transaction is associated with a cyber-attack. For example, IDS 260 may analyze configuration states of VMs 220 to determine whether a transaction has caused a VM to enter a state that is known to be associated with a cyber-attack. In some examples, IDS 260 may analyze requests from VMs 220 to read and/or modify shared database 226. Furthermore, in some examples, IDS 260 may analyze messages generated by VMs 220 for output by server computing system 212 to client computing devices (e.g., client computing devices 216). In some examples, IDS 260 may analyze the state of shared database 226 to determine whether one or more transactions are associated with one or more cyber-attacks or whether shared database 226 is in a compromised state. In some examples, when IDS 260 determines that a transaction is associated with a cyber-attack, IDS 260 may instruct rollback module 258 to roll back changes to shared database 226 associated with the transaction.

Thus, in the example of FIG. 16, server computing system 212 may be a network node comprising a hardware-based processing system having a set of one or more processing units, a plurality of VMs executing on the one or more processing units, a dispatcher that receives, from one or more client computing devices, a plurality of messages associated with transactions, assigns each of the transactions to the plurality of VMs, and discards each of the VMs when the transactions assigned to the VMs are complete. Furthermore, server computing system 212 may comprise one or more intrusion detection systems that detect whether any of the VMs or the shared database has been compromised. In addition, server computing system 212 may comprise a checkpointing module that generates checkpoint data based on requests from the VMs to modify a shared database. Server computing system 212 may also comprise a rollback module that uses the checkpoint data to roll back modifications to the shared database that are associated with a particular transaction when the one or more intrusion detection systems determine that a VM to which the particular transaction was assigned has been compromised, or that the shared database has been compromised.

Figure 17:
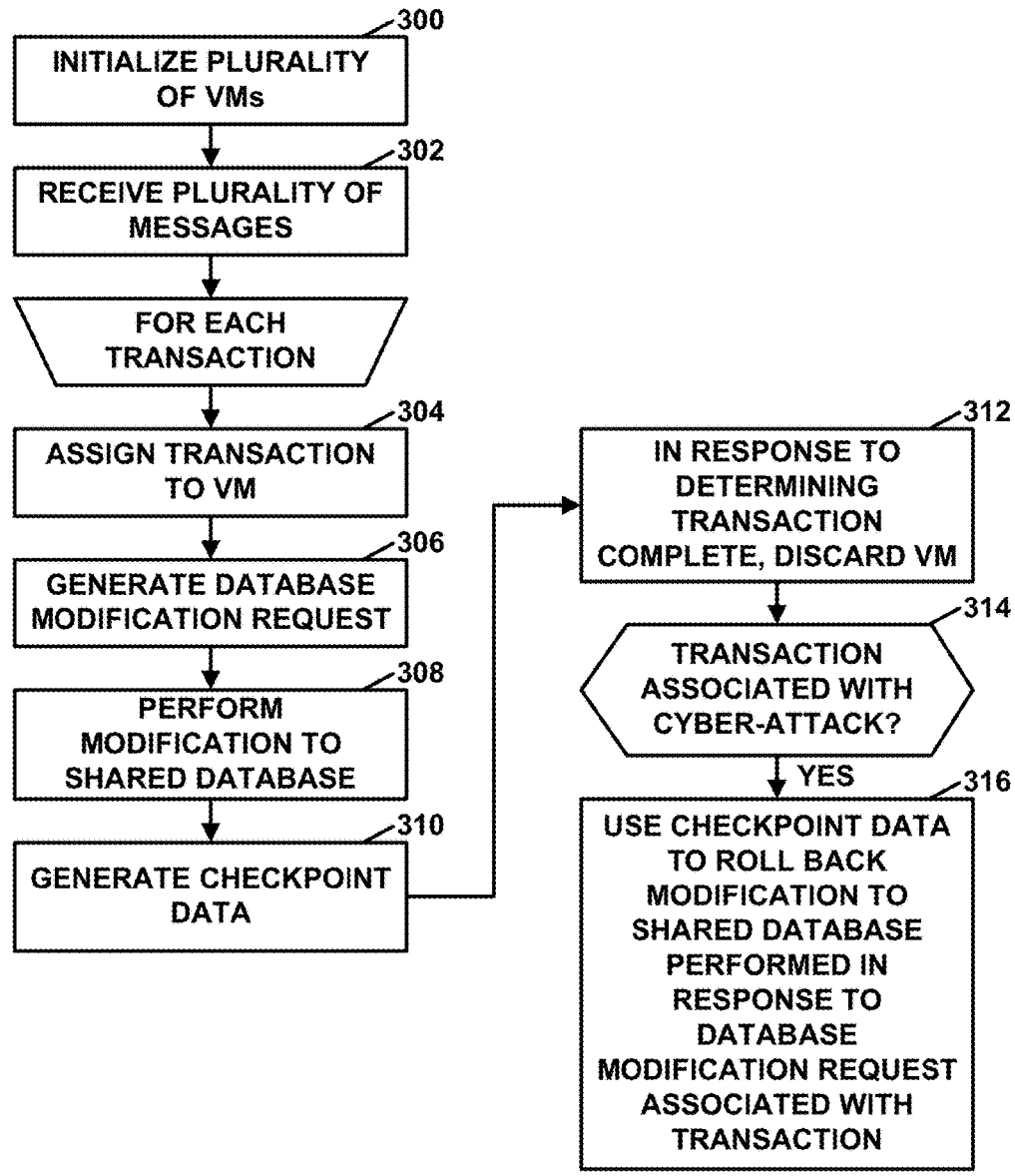
FIG. 17 is a flowchart illustrating an example operation of a server computing system, in accordance with one or more techniques of this disclosure.

FIG. 17 is a flowchart illustrating an example operation of server computing system 212, in accordance with one or more techniques of this disclosure. In the example of FIG. 17, server computing system 212 may initialize a plurality of VMs that execute on one or more computing devices of server computing system 212 (300). In addition, server computing system 212 may receive a plurality of messages from one or more client computing devices (302). Each of the plurality of messages may correspond to a transaction in a plurality of transactions. Although the example of FIG. 17 shows server computing system 212 as initializing the plurality of VMs prior to receiving the plurality of messages, in other examples, server computing system 212 may initialize each VM in the plurality of VMs in response to receiving a message that corresponds to a new transaction.

Server computing system 212 may perform the following actions of FIG. 17 for each respective transaction in the plurality of transactions. Particularly, server computing system 212 may assign the respective transaction to a respective VM from the plurality of VMs (304). The respective transaction may be the first transaction assigned to the respective VM. Furthermore, the respective VM may generate, as part of the respective VM processing the respective transaction, a database modification request associated with the respective transaction (306). Server computing system 212 (e.g., database management system 224) may perform a modification to a shared database (e.g., shared database 226) in response to the database modification request associated with the respective transaction (308). In this way, the respective VM may record operational state data to shared database 226 resultant from the processing of the transaction. The shared database is persisted independently of the plurality of VMs. Furthermore, server computing system 212 may generate checkpoint data associated with the respective transaction (310). In some examples, server computing system 212 may generate the checkpoint data associated with the respective transaction in response to the database modification request associated with the respective transaction. In other examples, server computing system 212 may generate the checkpoint data associated with the respective transaction in response to determining that a number of database modification requests associated with the respective transaction exceeds a threshold (e.g., 2, 3, 4, etc.).

In response to determining that processing of the respective transaction is complete, server computing system 212 may discard the respective VM (312). In some examples, server computing system 212 may generate the database modification request as part of completing the transaction. Furthermore, in some examples, the database modification request may request storage to shared database 226 of an application state of an application running on the respective VM. In such examples, server computing system 212 may initialize a particular VM such that an instance of the application running on the particular VM has the application state. In some such examples, the application is a server (e.g., web server, an FTP server, an email server, etc.) that provides a network service.

In addition, server computing system 212 may determine whether the respective transaction is associated with a cyber-attack (314). In other examples, a human or another computing system may determine that the respective transaction is associated with a cyber-attack. Furthermore, in some examples, server computing system 212 may determine that the respective transaction is associated with a cyber-attack in response to determining that the respective transaction attempted to perform an unauthorized modification of programming code of the VM or an unauthorized modification of a configuration of the VM. In another example, server computing system 212 may determine that the respective transaction is associated with a cyber-attack in response to determining that the respective transaction is associated with an unauthorized request to access or modify data in shared database 226. In response to determining that the respective transaction is associated with a cyber-attack (YES of 314), server computing system 212 may use the checkpoint data associated with the respective transaction to roll back the modification to shared database 226 performed in response to the database modification request associated with the respective transaction (316).

Figure 18:
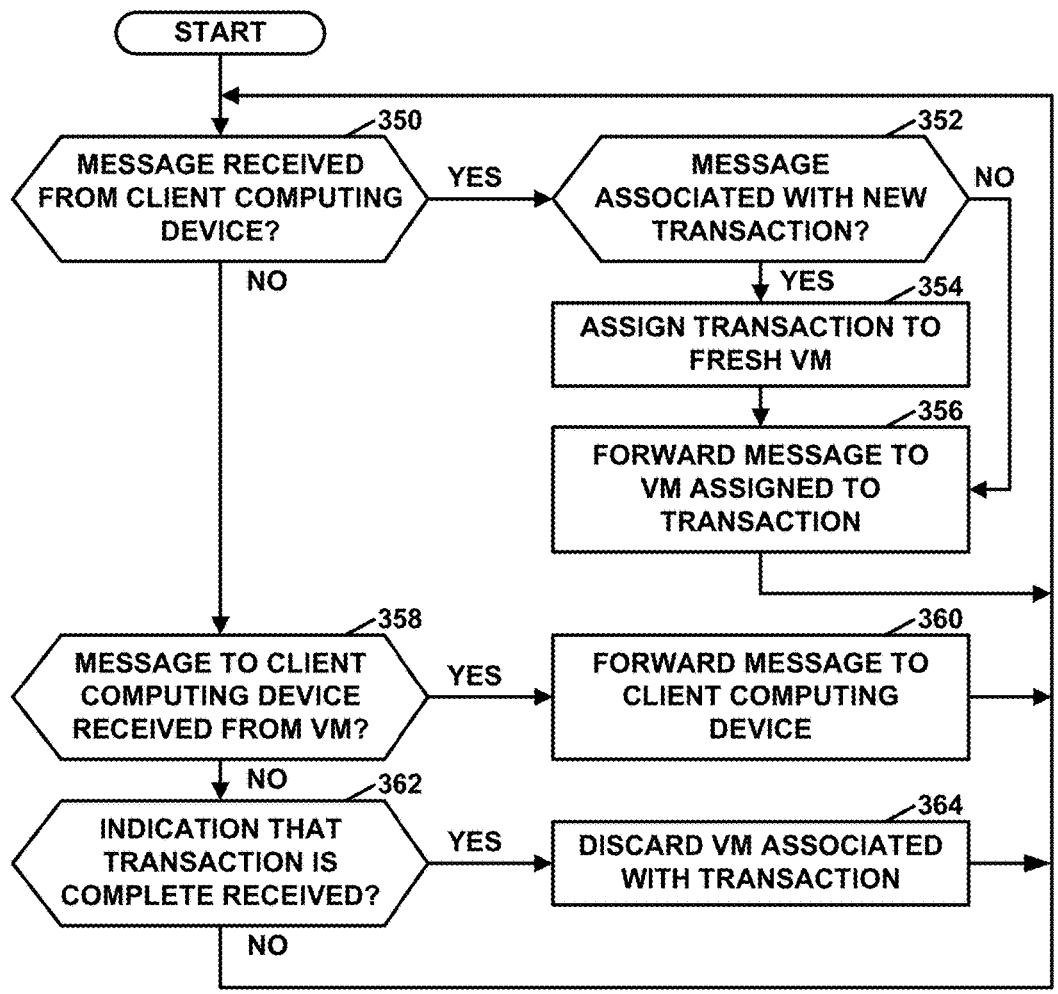
FIG. 18 is a flowchart illustrating an example operation of a front-end unit, in accordance with one or more techniques of this disclosure.

FIG. 18 is a flowchart illustrating an example operation of front-end unit 218, in accordance with one or more techniques of this disclosure. In the example of FIG. 18, front-end unit 218 may determine whether a message has been received from a client computing device (e.g., one of client computing devices 216) (350). In response to determining that a message has been received from a client computing device ("YES" branch of 350), front-end unit 218 may determine whether the message is associated with a new transaction (352). In response to determining that the message is associated with a new transaction ("YES" branch of 352), front-end unit 218 may assign the transaction to a fresh VM (354). In some examples, front-end unit 218 may instantiate (e.g., initialize) the VM as part of assigning the transaction to the VM. In other examples, front-end unit 218 may select the VM from a pool of previously initialized fresh VMs as part of assigning the transaction to the VM. After assigning the transaction to the VM or in response to determining that the message is not associated with a new transaction ("NO" branch of 352), front-end unit 218 may forward the message to the VM assigned to the transaction associated with the message (356).

Otherwise, front-end unit 218 may determine whether a message to a client computing device has been received from a VM (358). In response to determining that a message to a client computing device has been received from a VM ("YES" branch of 358), front-end unit 218 may forward the message to the client computing device (360).

Furthermore, front-end unit 218 may determine whether an indication that a transaction is complete has been received (362). In response to determining that front-end unit 218 has received an indication that a transaction is complete ("YES" branch of 362), front-end unit 218 may discard a VM associated with the transaction (364). In response to determining that the transaction is not complete ("NO" branch of 362), front-end unit 218 may again determine whether a message has been received from a client computing device (350).

Figure 19:
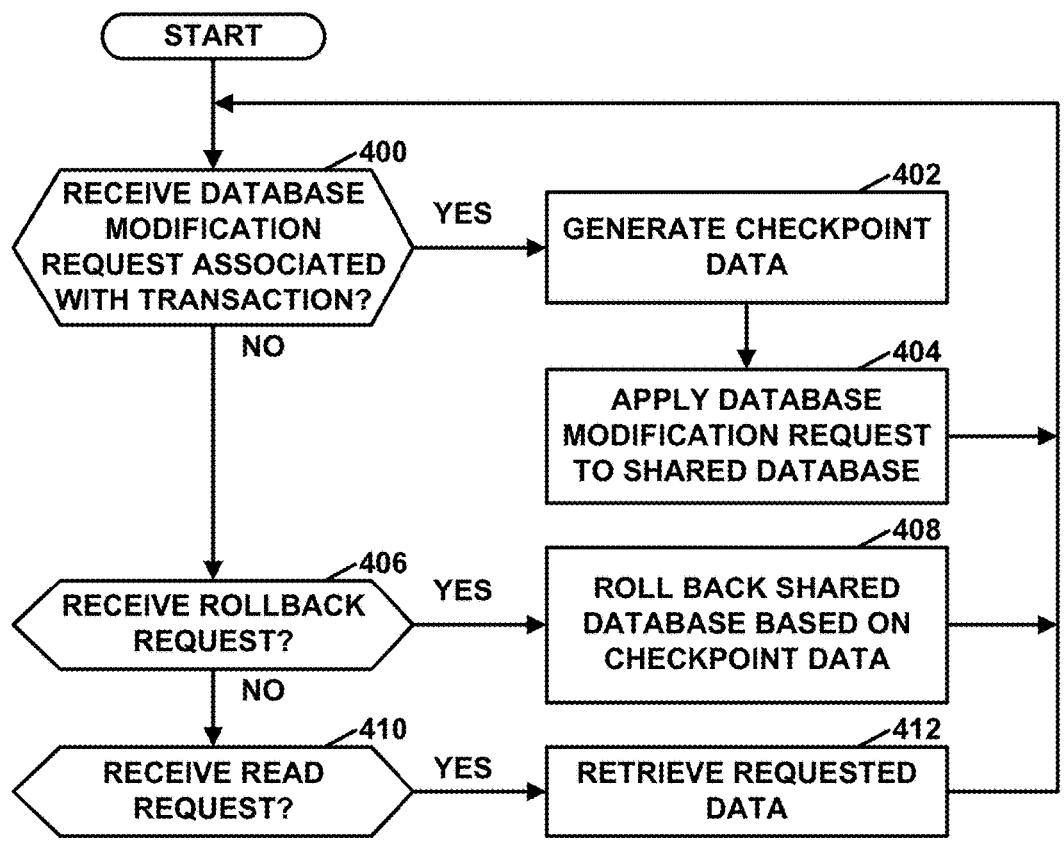
FIG. 19 is a flowchart illustrating an example operation of a database management system, in accordance with one or more techniques of this disclosure.

FIG. 19 is a flowchart illustrating an example operation of database management system 224, in accordance with one or more techniques of this disclosure. In the example of FIG. 19, database management system 224 may determine whether database management system 224 has received a database modification request associated with a transaction (400). In response to determining that database management system 224 has received a database modification request associated with a transaction ("YES" branch of 400), database management system 224 may generate checkpoint data associated with the transaction (402). In addition, database management system 224 may apply the database modification request to shared database 226 (404).

Otherwise, database management system 224 may determine whether database management system 224 has received a rollback request (406). Database management system 224 may receive a rollback request when a transaction has been determined to be associated with a cyber-attack. In response to receiving a rollback request ("YES" branch of 406), database management system 224 may roll back shared database 226 based on the checkpoint data (408).

Furthermore, database management database 24 may determine whether database management system 224 has received a read request (410). In response to determining that database management system 224 has received a read request ("YES" branch of 410), database management system 224 may retrieve, from shared database 226, data requested by the read request (412). Otherwise, in response to determining database management system 224 has not received a read request, database management system 224 may repeat the operation of FIG. 19.

Figure 20:
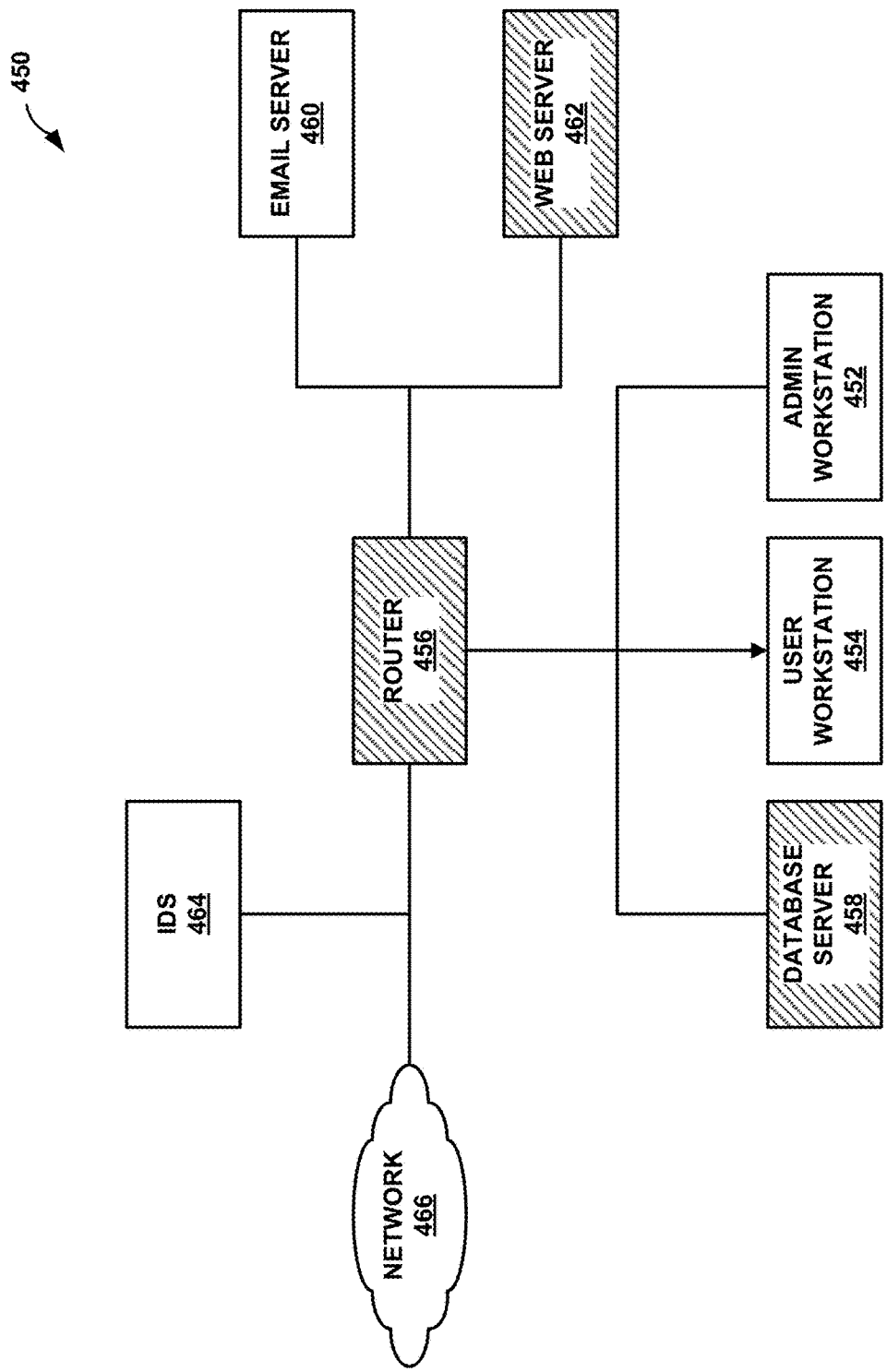
FIG. 20 is a conceptual diagram illustrating an example network that includes fight-through nodes, in accordance with one or more techniques of this disclosure.

FIG. 20 is a conceptual diagram illustrating an example network that includes fight-through nodes, in accordance with one or more techniques of this disclosure. In the example of FIG. 20, each box represents a node of a network 450 and lines indicate physical and/or wireless communication channels between nodes. Network 450 may be an enterprise network, a data center network, or another type of network. In the example of FIG. 20, the nodes of network 450 include an administrator workstation 452, a user workstation 454, a router 456, a database server 458, an email server 460, a web server 462, an IDS 464, and may include other nodes. Router 456 and IDS 464 may receive data from a network 466 (e.g., the Internet). Moreover, router 456 may send data on network 466. Furthermore, in the example of FIG. 20, router 456, database server 458, and web server 462 may be FTN-Ds. In other examples, other nodes of network 450 or other networks may be FTN-Ds. Although the techniques of this disclosure have been described herein as being performed on a "server computing system," the techniques of this disclosure are not so limited. Rather, other types of computing systems may be (or may provide) FTN-Ds.

Figure 21:
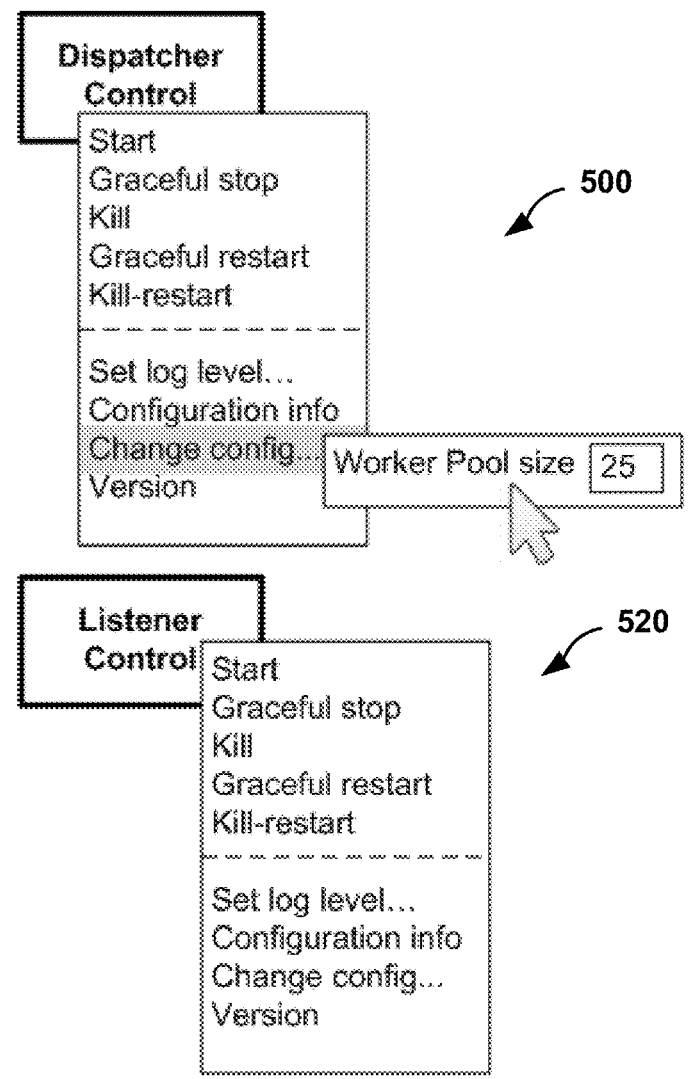
FIG. 21 is a conceptual diagram illustrating an example dispatcher control interface and an example listener control interface, in accordance with one or more techniques of this disclosure.

FIG. 21 is a conceptual diagram illustrating an example dispatcher control interface 500 and an example listener control interface 520, in accordance with one or more techniques of this disclosure. Dispatcher control interface 500 may enable a user to interact with dispatcher 238 (FIG. 16). Listener control interface 520 may enable a user to interact with a listener (e.g., handler 244 of FIG. 16).

In the example of FIG. 21, dispatcher control interface 500 includes menu items "Start," "Graceful stop," "Kill," "Graceful restart," "Kill-restart," "Set log level . . . ," "Configuration info," "Change config . . . ," and "Version." The menu items "Start," "Graceful stop," "Kill," "Graceful restart," and "Kill-restart" may enable a user to start, stop, and/or restart dispatcher 238. The menu item "Set log level . . . " may enable the user to set a level with which dispatcher 238 logs information. The menu items "Configuration info" and "Version" may enable the user to view various configuration and version information about dispatcher 238. The menu item "Change config . . . " may enable the user to change various aspects of dispatcher 238. For instance, in the example of FIG. 21, a field that enables the user to change the worker pool size (i.e., the number of VMs to which dispatcher 238 assigns transactions) may be displayed when the user selects the menu item "Change config . . . "

Furthermore, in the example of FIG. 21, listener control interface 520 includes menu items similar to those of dispatcher control interface 500. However, in the example of FIG. 21, selection of the menu item "Change config" in listener control interface 520 does not cause a computing device to display a field that enables the user to change the worker pool size.

FIG. 22 is a conceptual diagram illustrating an example transaction and worker details table 540, in accordance with one or more techniques of this disclosure. In the example of FIG. 22, table 540 displays a current state of server computing system 212. Particularly, table 540 includes a separate row for each separate transaction. Furthermore, table 540 includes a transaction ID field, a client IP field, a duration field, a traffic in/out field, a worker id field, a memory percentage field, and a central processing unit (CPU) percentage field for each of the transactions. Table 540 may be sorted based on each of the columns. Furthermore, in some examples, each column of table 540 may be repositionable.

In the example of FIG. 22, a computing device may output, for display, a contextual menu 542 when the computing device receives an indication of user input to select an entry in table 540. Contextual menu 542 may include menu items that enable the user to manage a transaction and/or a worker (i.e., a VM instance) assigned to the transaction.

FIG. 23 is a conceptual diagram illustrating an example global statistics table 560, in accordance with one or more techniques of this disclosure. Global statistics table 560 displays information about the performance and activity of server computing system 212. In the example of FIG. 23, global statistics table 560 includes a quantity of transactions field, a traffic in field, a traffic out field, a worker usage percentage field, a worker startup time field, a worker refresh time field. The fields of global statistics table 560 may be computed for various time periods, such as since startup or for the current month, week, day, hour, or minute.

FIG. 24 is a conceptual diagram illustrating an example alerts interface 580, in accordance with one or more techniques of this disclosure. Server computing system 212 may output an alerts interface (such as alerts interface 580) to alert a user (e.g., a system administrator) to various types of information, such as errors and warnings. For instance, in the example of FIG. 24, alerts interface 580 may alert a user to the fact that an error occurred because "Worker 2340923" is not responding.

In some examples, server computing system 212 may refresh a VM (e.g., one of VMs 220) responsive to receiving an indication of user input. In this way, server computing system 212 may implement manual triggers for refreshing VMs 220. Refreshing a VM may involve discarding the VM and, in some instances, assigning one or more transactions previously assigned to the VM to a fresh VM. In other instances, refreshing a VM may simply involve discarding the current VM. In some examples, the indication of a user input to refresh a VM may comprise an indication that a user has pressed a virtual or physical button of a user interface. In this way, a lifetime of a resource (e.g. a VM) may be tied to user interface controls or other manual inputs. In this disclosure, the "lifetime" of a resource, such as a VM, may start when the resource is initialized and end when the resource is discarded.

Thus, in some examples, a computing system (e.g., server computing system 212) may initialize, from one or more common templates, a VM that executes on one or more computing devices of the computing system. Responsive to an occurrence of an initiation condition of a transaction, the computing system may assign the transaction to the VM. The VM may generate, as part of the VM processing the transaction, a database modification request associated with the transaction. Responsive to the database modification request associated with the transaction, the computing system may perform a modification to a shared database (e.g., shared database 226) that is persisted independently of the VM. Additionally, the computing system may generate checkpoint data associated with the transaction. Responsive to a manual trigger, the computing system may discard the VM. Furthermore, responsive to a rollback request, the computing system may use the checkpoint data associated with the transaction to roll back the modification to the shared database performed responsive to the database modification request associated with the transaction.

In some examples, server computing system 212 may refresh a VM in response to automatic triggers. The automatic triggers may comprise a set of rules. For example, server computing system 212 may automatically refresh a VM in response to an intrusion detection system detecting the occurrence of an intrusion or other type of cyber-attack. Thus, the VM can be automatically refreshed to a safe state in response to the intrusion detection system detecting the occurrence of an intrusion. In another example, server computing system 212 may refresh a VM at the termination of a transaction assigned to the VM if the transaction is associated with a first class of user, but does not refresh the VM if the transaction is associated with a second class of user. In another example, server computing system 212 may refresh a VM at the termination of a transaction assigned to the VM if particular actions occurred while processing the transaction, but does not refresh the VM if the particular actions did not occur while processing the transaction. In another example, server computing system 212 may refresh a VM at the termination of a transaction assigned to the VM if the transaction belonged to a first type of transaction, but does not refresh the VM if the transaction belongs to a second type of transaction.

Thus, in some examples, a computing system (e.g., server computing system 212) may initialize, from one or more common templates, a VM that executes on one or more computing devices of the computing system. Responsive to an occurrence of an initiation condition of a transaction, the computing system may assign the transaction to the VM. The VM may generate, as part of the VM processing the transaction, a database modification request associated with the transaction. Responsive to the database modification request associated with the transaction, the computing system may perform a modification to a shared database (e.g., shared database 226) that is persisted independently of the VM. Additionally, the computing system may generate checkpoint data associated with the transaction. Responsive to an automatic trigger, the computing system may discard the VM. Furthermore, responsive to a rollback request, the computing system may use the checkpoint data associated with the transaction to roll back the modification to the shared database performed responsive to the database modification request associated with the transaction.

Software implementing a FTN-D (i.e., FTN-D software) may run multiple copies of software that fulfill the same purpose. For example, a desktop machine may run two copies of an operating system. In another example, a server may run fifty identical copies of server software. In some such examples, a dispatcher may take inputs and distribute the inputs to different virtualized systems. On a desktop computer, such inputs may include inputs from a keyboard, a mouse, and a monitor. Dispatcher 238 may distribute such inputs to one VM running on the desktop computer, while leaving one or more additional VMs running on the desktop computer in quiescent states. On a network server, such inputs may include network connections and/or data received from client devices. Each TCP session may be directed to a separate VM running on the network server. In this way, each TCP session may be isolated from each other TCP session. Furthermore, in this way, the dispatcher (e.g., dispatcher 238) may perform multiplexing from the outside world to the pool of resources in the inside world. Especially for network servers, this information may be used in the resource lifetime strategies. Each TCP session may be assigned a separate VM. When the TCP session ends, the VM to which the TCP session is assigned is reset (e.g., discarded and replaced with a freshly initialized VM).

In various examples described elsewhere in this disclosure, server computing system 212 may assign only a single transaction to a VM and may discard the VM after the transaction is complete. However, in accordance with one or more additional examples of this disclosure, server computing system 212 may assign multiple transactions to a single VM and may discard the VM after all of the transactions assigned to the VM are complete. For example, in some example implementations, server computing system 212 may refresh a given VM only after a configurable number of transactions have been completed by the VM. In other words, server computing system 212 may operate in accordance with a VM refresh rate, such as completions of every N transactions. Moreover, server computing system 212 may dynamically control the VM refresh rate N based on a number of factors, such as a current threat level specified by IDS 260. For example, dispatcher 238 of server computing system 212 may initially operate in accordance with a VM refresh rate of 10 transactions, where 10 is configured by rule or policy. Further, in accordance with defined rules, dispatcher 238 may reduce the VM refresh rate, such as to a VM refresh rate of every 5 transactions, in response to an IDS detecting a potential network attack associated with the computing system or another node within the network. Moreover, based on the rules, dispatcher 238 may apply a strict refresh rate on a single transaction basis upon confirming an actual network attack on server computing system. In this way, dispatcher 238 may provide dynamic, real-time control of a VM refresh rate in response to rule-driven factors.

Thus, in some examples, a computing system (e.g., server computing system 212) may initialize, from one or more common templates, a VM that executes on one or more computing devices of the computing system. Responsive to an occurrence of an initiation condition of a transaction, the computing system may assign the transaction to the VM. The computing system may also assign one or more additional transactions to the VM. The VM may generate, as part of the VM processing the transaction, a database modification request associated with the transaction. Responsive to the database modification request associated with the transaction, the computing system may perform a modification to a shared database (e.g., shared database 226) that is persisted independently of the VM. Additionally, the computing system may generate checkpoint data associated with the transaction. Responsive to a manual or automatic trigger, the computing system may discard the VM. For instance, the computing system may, responsive to completion of each of the one or more transactions assigned to the VM, discard the VM. Furthermore, responsive to a rollback request, the computing system may use the checkpoint data associated with the transaction to roll back the modification to the shared database performed responsive to the database modification request associated with the transaction. Thus, in some examples, the computing system may determine whether multiple transactions are allowed to be assigned to the VM when a transaction is already assigned to the VM. In such examples, the computing system may assign another transaction to the VM when multiple transactions are allowed to be assigned to the VM.

As another example, server computing system 212 may assign multiple TCP sessions to a single VM. In this example, server computing system 212 may assign multiple TCP sessions to a single VM if the multiple TCP sessions have the same origin (e.g., source IP address). For instance, it may be common that a web browser application running on a client device initiates multiple TCP sessions to server computing system 212 to access various parts of a web page (e.g., text, pictures, etc.). Server computing system 212 may assign each of these TCP sessions to the same VM.

In some examples where multiple transactions are assigned to the same VM, the multiple transactions may be considered to be "bundled" together such that the multiple transactions conceptually form a single "bundled" transaction. Server computing system 212 may, in accordance with defined rules, discard the VM only when the whole "bundled" transaction is complete. Assigning multiple transactions to a single VM may conserve computational resources associated with initiating and managing the multiple VMs to which the transaction would otherwise be assigned. Thus, in some examples, a computing system (e.g., server computing system 212) may determine, based on computing resources of the computing system, a maximum number of transactions the computing system assigns to a VM. The computing resources may include memory availability, processing resources, storage availability, I/O capabilities, and so on. Moreover, in response to other automated triggers, such as detection of a potential attack or other high threat level, dispatcher 238 may modify its operation so as to assign each TCP session to its own VM, and may transition back to bundling multiple TCP sessions as a "transaction" to be executed or otherwise processed on a common VM responsive to a reduced threat level.

Server computing system 212 may implement one or more rules that control how many transactions server computing system 212 can assign to a single VM prior to server computing system 212 discarding the VM. In some examples, these rules change based on a defensive posture or other system parameters. For example, at times when there is elevated concern about cyber-attack, server computing system 212 may assign fewer transactions to a VM prior to discarding the VM. In this example, at other times, server computing system 212 may assign more transactions to a VM prior to discarding the VM. Assigning fewer transactions to a VM prior to discarding the VM may increase security. Assigning more transactions to a VM prior to discarding the VM may increase responsiveness of server computing system 212 and/or may conserve computational resources of server computing system 212. Thus, in some examples, a computing system (e.g., server computing system 212) may determine, based on a defensive posture of the computing system, a maximum number of transactions that the computing system assigns to a VM.

In various examples, server computing system 212 may determine, based on various factors, whether to assign multiple transactions to a single VM. For instance, in one example, server computing system 212 may determine, based on an identity of a user associated with a transaction, whether to assign the transaction to a VM to which server computing system 212 has already assigned one or more transactions. Thus, in some examples, a computing system (e.g., server computing system 212) may determine, based on an identity of a user associated with the at least one transaction assigned to a VM, a maximum number of transactions that the computing system assigns to the VM. In some examples, a computing system (e.g., server computing system 212) may determine, based on a type of transaction assigned to the VM, a maximum number of transactions that the computing system assigns to the VM.

As described elsewhere in this disclosure, a transaction may correspond to a session of a communication protocol, such as TCP. However, some communication protocols do not include the notion of a session. In other words, such communication protocols are sessionless communication protocols. For example, the User Datagram Protocol (UDP) is a sessionless communication protocol. To accommodate sessionless communication protocols, server computing system 212 may determine the start and completion of a transaction based on factors other than the start and completion of a session. For example, server computing device 212 may determine the start of a transaction upon receiving one or more packets from a distinct source (e.g., a distinct IP address). In this example, server computing device 212 may determine the completion of the transaction when a terminating event occurs. In some examples, the terminating event is a determination that a particular amount of time has passed following a most recent time that server computing system 212 has received data from the source. Furthermore, in some examples, transactions can be defined as application level sessions.

Thus, in some examples, a transaction comprises a stream of data from a source. An initiation condition of the transaction may comprise receiving the stream of data from the source. In some instances, the stream of data from the source comprises a stream of UDP data. Furthermore, in some such examples, an automatic trigger for discarding a VM is an elapsing of a particular amount of time following receiving a last unit of data from the source. In other examples, the automatic trigger is an indication of a termination of an application level session.

As indicated elsewhere in this disclosure, server computing device 212 may assign transactions to VMs 220. In accordance with some examples of this disclosure, server computing system 212 may categorize transactions into a plurality of classes. For example, server computing system 212 may categorize transactions into a "trusted" class and an "untrusted class." In various examples, server computing device 212 may determine the class into which to categorize a transaction based on various factors. For example, server computing device 212 may categorize a given transaction based on a security level or role associated with the user that originated the transaction. As another example, server computing device 212 may determine, based on a sub-net of an IP address of a client device associated with a transaction, that the transaction belongs to a particular class. For instance, in this example, if the IP address of the client device associated with the transaction belongs to a sub-net of IP addresses associated with a particular organization or set of users, server computing system 212 may determine that the transaction belongs to the "trusted" class. Otherwise, in this example, if the IP address of the client device associated with the transaction does not belong to the sub-net of IP addresses associated with the particular organization or user, server computing system 212 may determine that the transaction belongs to the "untrusted" class.

Server computing device 212 may assign transactions belonging to different classes to VMs that are subject to different refresh policies (e.g., lifetime strategies). For example, server computing device 212 may assign transactions belonging to a first class to VMs that are subject to a first refresh policy and may assign transactions belonging to a second class to VMs that are subject to a second, different refresh policy. The refresh policies of VMs may dictate the circumstances under which server computing system 212 refreshes VMs (e.g., discards and, in some examples, replaces VMs with fresh VMs). Some groups of VMs 220 may be associated with more or less aggressive refresh policies than other groups of VMs 220. For example, server computing system 212 does not discard a VM subject to a first refresh policy upon completion of any transaction assigned to the respective VM. Rather, server computing device 212 may assign multiple transactions to a VM subject to the first refresh policy. In some instances, the multiple transactions assigned to a VM subject to the first refresh policy may correspond to different users, client devices, and/or IP addresses. Server computing system 212 may conserve computing resources by assigning multiple transactions to the same VM. Furthermore, in this example, server computing system 212 may discard a VM subject to a second, more aggressive refresh policy upon completion of any transaction assigned to the VM. In this example, server computing device 212 may assign transactions belonging to a "trusted" class to VMs subject to the first refresh policy and may assign transactions belonging to an "untrusted" class to VMs subject to the second refresh policy. This may result in increased performance for transactions in the "trusted" class and increased security with regard to transactions in the "untrusted" class. Thus, in some examples, a computing system (e.g., server computing system 212) may determine, based on a type of transaction assigned to the VM, a maximum number of transactions that the computing system assigns to the VM.

Thus, in some examples, a computing system (e.g., server computing system 212) may assign transactions belonging to a class to VMs from a plurality of VMs that are subject to a first refresh policy. The computing system may assign transactions belonging to a second, different class to VMs from the plurality of VMs that are subject to a second, different refresh policy. The plurality of VMs may generate, as part of the VMs processing the transactions belonging to the first class and the transactions belonging to the second class, database modification requests associated with the transactions belonging to the first class and the transactions belonging to the second class. The computing system may perform modifications to a shared database (e.g., shared database 226) responsive to the database modification requests. The shared database is persisted independently of the plurality of VMs. The computing system may generate checkpoint data associated with the transactions belonging to the first class and the transactions belonging to the second class. The computing system may discard, according to the first refresh policy, the VMs subject to the first refresh policy. The computing system may discard, according to the second refresh policy, the VMs subject to the second refresh policy. Responsive to determining that a particular transaction is associated with a cyber-attack, the computing system may use checkpoint data associated with the particular transaction to roll back the modification to the shared database performed responsive to a database modification request associated with the particular transaction, wherein the particular transaction is among the transactions belonging to the first class or the transactions belonging to the second class. For instance, in such examples, the computing system may discard each respective VM of the VMs subject to the first refresh policy after the respective VM has completed processing a first number of transactions. Similarly, in such examples, the computing system may discard each respective VM of the VMs subject to the second refresh policy after the respective VM has completed processing a second number of transactions (e.g., 1), wherein the first number of transactions is greater than the second number of transactions.

In some examples, server computing system 212 may determine, based on one or more factors, whether to assign multiple transactions to a single VM. For instance, in one example, server computing system 212 may determine, based on available computing resources, whether to assign multiple transactions to a single VM. In this example, if sufficient computing resources are available, server computing system 212 assigns each respective transaction to a different VM that is discarded upon completion of the respective transaction. In this example, if there are insufficient computing resources to do so, server computing system 212 assigns up to two transactions to a VM and server computing system 212 discards the VM after the VM has completed both of the transactions. If there are still insufficient computing resources, server computing system 212 may assign up to three transactions to a VM and server computing system 212 may discard the VM after the VM has completed all three transactions, and so on. In this way or other ways, server computing system 212 may discard VMs as frequently as possible given available computing resources.

In some instances, one or more of VMs 220 may become non-operational. For instance, a VM may "crash" or "hang." A VM that is non-operational may be non-responsive to input and/or may fail to generate appropriate output. However, a VM that is non-operational may continue to consume system resources, such as memory space and processor cycles.

In accordance with one or more techniques of this disclosure, server computing system 212 may implement one or more mechanisms for discarding and potentially restarting VMs that have become non-operational. For example, dispatcher 238 of server computing system 212 may implement a respective timer (e.g., a "watchdog timer") for each respective VM of VMs 220. Responsive to the expiration of the timer for a VM, dispatcher 238 may determine whether the VM is non-operational. If the VM remains operational, the VM, or dispatcher 238 in response to a message from the VM, may reset the respective timer for the VM. In various examples, server computing system 212 may determine whether the VM is non-operational in various ways. For example, server computing system 212 may poll or "ping" the VM to determine whether the VM is responsive. In other words, server computing system 212 may probe the VM to determine whether the VM has become non-operational. In another example, if a web server application runs on the VM, server computing system 212 may request a web page from the web server application. In this example, if server computing system 212 does not receive appropriate data associated with the web page from the VM, server computing system 212 may determine that the VM has become non-operational.

Responsive to determining that a VM has become non-operational, server computing system 212 may discard the VM. In other words, an automatic trigger for discarding a VM is a determination by a computing system (e.g., server computing system 212) that the VM has become non-operational. Furthermore, in some examples, server computing system 212 may use checkpoint data associated with one or more of the transactions processed by the VM to rollback modifications of shared database 226 associated with the one or more transactions processed by the VM. In some instances, the VM may have become non-operational because of an attack directed at the VM or server computing system 212 generally. Rolling back the modifications to shared database 226 may potentially prevent data associated with the attack from remaining in shared database 226.

In some examples, if a transaction assigned to the VM that has become non-operational is not complete, server computing system 212 may assign the transaction to an operational VM. In some examples, the operational VM is a newly-initialized VM to which server computing system 212 has assigned no other transaction. In other examples, server computing system 212 has already assigned one or more transactions to the operational VM.

In some examples, server computing system 212 may assign a single transaction to multiple VMs 220. Thus, in some examples, multiple VMs may receive packets associated with a single transaction. Server computing system 212 may continue to forward subsequent packets associated with the transaction to each of the assigned VMs. Thus, the states of each of the assigned VMs may be updated based on the packets associated with the transaction.

Responsive to the packets received by the multiple VMs, each of the multiple VMs assigned to the single transaction may generate a respective set of one or more response packets. Server computing system 212 (or another unit of server computing system 212) may process the sets of response packets. In some examples, when server computing system 212 processes the sets of response packets, server computing system 212 may forward one of the sets of response packets to a client device and discard the remaining sets of response packets. In other examples, when server computing system 212 processes the sets of response packets, server computing system 212 may compare the sets of response packets to determine whether the sets of response packets match. Server computing system 212 may determine that an error has occurred at one or more of the VMs if the sets of response packets do not match. When not all of the sets of response packets match, server computing system 212 may determine which version of the sets of response packets is most common. In other words, server computing system 212 may determine which set of response packets is most popular. Server computing system 212 may forward the most common version of the sets of response packets to the client device, discarding the remaining sets of response packets. Furthermore, in other examples, when server computing system 212 processes the sets of response packets and server computing system 212 determines that not all of the sets of response packets match, server computing system 212 does not forward any of the sets of response packets to the client device.

Assigning a single transaction to multiple VMs may assist with fault tolerance. In some examples, server computing device 212 may assign a single transaction to VMs running different operating systems. For example, server computing device 212 may assign a transaction to a first VM, a second VM, and a third VM. In this example, the first VM may run a Linux operating system, the second VM may run a MICROSOFT WINDOWS® operating system, and the third VM may run an APPLE OSX® operating system. In this example, all three VMs should return the same response packets. However, a cyber-attack targeting a vulnerability of one of the operating systems may cause the VM running that operating system to return incorrect response packets. In this example, the other two VMs may return matching correct response packets. Thus, if server computing device 212 forwards only the most common version of the sets of response packets, server computing device 212 may discard the incorrect response packets and may forward one set of the correct response packets to the client device. This may add an additional layer of security and/or fault tolerance to server computing system 212.

Thus, in some examples, packets may be forwarded to a plurality of resources (e.g., VMs). For example, all packets associated with a single TCP connection may be replicated and forwarded to three different resources. In this case, the "response data" sent to the external party (e.g., any data sent by FTN-managed resources) may be handled via a variety of policies. One such policy is to use a single resource as the "canonical" resource and to discard, or otherwise render impotent, data transmitted by the other resources. One such policy is to compare the outputs of the multiple resources, potentially performing higher-level semantic interpretation (e.g., application-layer) and to produce a new output based on the collective results of the multiple resources. One such policy is a "voting system," where the most-popular response is sent to the external party (e.g., computing device). One such policy may be a "parallel check," where an error condition is triggered if the responses from the individual resources are not identical.

Thus, in some such examples, the computing system (e.g., server computing system 212) may initialize, from the one or more common templates, a plurality of VMs that execute at the one or more computing devices of the computing system. Responsive to the occurrence of an initiation condition of the transaction, the computing system may assign the transaction to the plurality of VMs. The plurality of VMs may generate respective sets of response data. The computing system may select a particular set of response data from the sets of response data. For instance, the computing system may select a most common of the sets of the response data. The computing system may forward the particular set of response data to another computing system (e.g., one of client computing devices 216).

Although many examples of this disclosure have been described with regard to a server computing system, many such examples are applicable at a client computing systems or standalone computing system. For instance, many such examples may be implemented on desktop computing devices, mobile computing devices, kiosks, or other types of computing devices. In such examples, a transaction may be defined in additional ways. For example, a transaction may be defined as a user session of the client device. In this example, the client device may assign a log-in session to a VM running at the client device. The VM may perform processing associated with the log-in session. Furthermore, in this example, a transaction may begin when a user logs in to the client device and may end when the user logs out of the client device. The client device may discard the VM when the user logs out of the client device. Thus, the client device may assign a fresh VM to the next log-in session. Therefore, on the client device, actions performed on the client device by the previous user may have no effect of the VM assigned to the next log in session.

Thus, in some examples, a client computing system may initialize, from one or more common templates, a VM that executes on one or more computing devices of the client computing system. Responsive to an occurrence of an initiation condition of a transaction, the client computing system may assign the transaction to the VM. The VM may generate, as part of the VM processing the transaction, a database modification request associated with the transaction. Responsive to the database modification request associated with the transaction, the client computing system may perform a modification to a shared database (e.g., shared database 226) that is persisted independently of the VM. Additionally, the client computing system may generate checkpoint data associated with the transaction. Responsive to a manual or automatic trigger, the client computing system may discard the VM. Furthermore, responsive to a rollback request, the client computing system may use the checkpoint data associated with the transaction to roll back the modification to the shared database performed responsive to the database modification request associated with the transaction.

Furthermore, although many examples of this disclosure have been described with regard to VMs, many such examples are applicable to other types of resources. In some examples, a resource is a logical computer system with two following properties:
  a. The system is virtualized or is otherwise isolated (in a security sense).
  b. The system's state is controllable by a computing system (e.g., server computing system 212) such that its state can be recorded (checkpoint/snapshot) and the system can be reverted to the recorded state (rollback/restore). In some examples, there is no requirement that the recordable state is an arbitrary state, just that the recordable state is some state. In particular, only the ability to record an acceptable "clean" state may be required. If additional state is recordable, server computing system 212 may take advantage of that.

The resource may be a system running under hardware or platform virtualization, including full virtualization, partial virtualization, paravirtualization, and hardware-assisted virtualization. The virtualized system may then be under the control of a hypervisor.

A fight-through node (FTN), such as server computing system 212, may comprise software that manages a collection of one or more resources and that state of those resources according to a "resource lifetime strategy." In some examples, the virtualized system of server computing system 212 may be a VM in an Infrastructure-as-a-Service cloud. The resource may be a full system, a partial system, or software running under operating-system-level virtualization (for example, vServer™, LXC™, OpenVZ™, jails). The virtualized system may be an entity in a Platform-as-a-Service cloud. The resource may be a virtualized or sandboxed application running under a non-virtualized operating system. The virtualized system may be an entity in a Software-as-a-Service cloud or in any of the related X-as-a-Service cloud models. The resource may be a physical system with controllable state. For example, the virtualized system may comprise a physical system that can be power-cycled and reimaged over an independent control channel. The collection of all resources managed by a single FTN may span multiple categories of resources listed above.

The types of encapsulation listed above may be nested, where each layer may be controllable by FTN. For example, a collection of FTN resources may consist of N physical machines that can be reimaged (e.g., with controllable power supplies, a boot-ROM, and a PXE image server), each of which runs M VMs, each of which contains K operating-system-level isolation containers.

In some examples, the resources (e.g., VMs) may be identical clones of a "template" system. For example, in the case of a fully-virtualized system, the template system may be a snapshot of the state of a suspended system (e.g., in which the content of RAM of the system has been written to disk or other non-volatile computer-readable storage medium). In other examples, the resources may be identical clones of a plurality of different templates. For example, the pool of resources may be N*M systems, consisting of N copies, each of M different but functionally equivalent templates.

In some examples, the resources may be dynamically modified on an individual resource on rollback/restore (e.g., the resource could have a unique MAC or IP address injected into the running system state after it is restored). This modification may be done by VM introspection, an agent on the resource, or agentless remote code execution.

An FTN may "accept" network packets or connections and send them to a set of resources according to an "allocation strategy." Packets sent from the resource to the originator are handled accordingly. That is, the FTN may act as a network proxy for the resources.

In some examples, network packets or connections could be a TCP connection, one or more UDP packets, or other collections of network packets (IP or not). The collection of packets sent to a particular resource could encompass more than a single connection. For instance, a collection of related connections could be sent to the same resource. For example, a Web browser typically establishes many connections in a short period to the same server when loading a Web page; all of these related connections could be sent to the same resource. This packet-forwarding could be performed as a "transparent proxy" (operating in the Layer 2-4 space) or as a "smart proxy" that understand the semantics of the transmitted data at the application layer (layer 7) and acts based on that information. Accordingly, the sent packets could be identical to the original packets or could be modified. The sent packets could represent only a fraction of a single (layer 4-5) connection. For example, in the case of a smart proxy, if a single TCP connection is used to transmit three HTTP requests, the three HTTP requests could be sent to different resources.

The resource may have network access to an external network, such as the Internet, or may be network-isolated. The resource may be connected to one or more back-end systems (e.g., through a network). The back-end systems may be physical machines, physical networks, arbitrary resources accessed over a network, or any of the system types listed above in "resource." An example may be a dedicated physical or VM. The back-end systems may support one or more systems for data and/or execution state checkpoint and rollback. Those systems may in turn expose the checkpoint/rollback functionality to the FTN. Such systems include VM check pointing and check pointing file systems such as ZFS. These back-end systems may contain intrusion detection, fault detection, data-corruption detection, availability watchdogs, or other system health monitors. These monitors may be implemented within the back-end system, through VM introspection, or through remote execution using an agent or an agentless system. These monitors may be configured to provide information to the FTN, such as causing an alert with an intrusion, fault, or data corruption is detected.

The resources may be connected to the FTN through a data-transmission path, which may be a network. The network may be dedicated to this task and may be isolated from other networks. This network may be dynamically built by the FTN at run time. Each resource may be connected to the FTN by a separate network. The resources may be configured so that the individual networks connecting the FTN to each resource are identical (e.g., each resource has the same MAC and IP address but is on an independent network). Any of the above internal networks may be physical, partially virtual (e.g., VLANs), or fully virtual (e.g., hypervisor internal networking).

The FTN may implement an allocation strategy. The allocation strategy may be a policy for how to distribute packets to individual resources. The allocation strategy may use any layer-2 through layer-7 networking information, as well as information about the state(s) of the resources and back-end systems. As an example, the allocation strategy might create a strict one-to-one association between active TCP connections and resources. Thus, for one TCP connection, there may be a resource that is exclusively used by that one connection. As an example, the allocation might create a one-to-one association between a particular IP address and a resource, so that all traffic from that IP address is sent to the same resource. As an example, the allocation might send packets from different subnets to different sets of resources. For example, packets from an "internal" or "trusted" subnet might be sent to less-restricted resources while packets from "external" or "untrusted" subnets might be sent to more-restricted resources.

An FTN may selectively present, multiplex, or otherwise manage non-network I/O interfaces to the resources. For example, a "desktop FTN" might run two identical copies of a virtualized operating system, only one of which (the "active" VM) is attached to the display and captures keyboard and mouse input. When the resource lifetime strategy determines that the active VM should be restored to its original state, the FTN may make the inactive VM active, destroy the now-inactive (formerly active) VM, and create a new VM that is a clone of the original template as a new inactive VM.

A FTN may implement a resource lifetime strategy. The resource lifetime strategy may be a policy for when and how to restore/roll back resources and/or back-end systems to particular states. The resource lifetime may be tied to allocation strategy. The resource lifetime may be tied to user interface controls or other manual inputs. The resource lifetime may be tied to back-end system health monitors or other automated inputs. As one example, the FTN may use the allocation strategy that each TCP connection is associated with its own resource. The resource lifetime strategy may then be to restore that resource to its original state at the end of the TCP connection.

To support the transition to virtual endpoints and to defend against persistent and stealthy cyber-attacks on computing systems by advanced adversaries, users may need the capability to use fast, reliable, and automated reconstitution of servers and endpoints for securing and maintaining networks and computer systems. In accordance with one or more techniques of this disclosure, a software platform (FTN-D) may transparently restore any protected system to a known-good state within seconds, compared to hours or more for current practices. This may directly addresses a need for enhanced capability: it may provide a reliable, automated, and secure reconstitution mechanism for servers and endpoints that can be used to refresh system health, reconstitute compromised machines after attacks, and combat persistent threats, including proactively reimaging systems as a tailored response option in anticipation of increased cyber threats.

Reimaging or rebuilding desktop and server systems may be a component of computer security and IT management. It may restore the computer to a pristine state, eliminating accumulated errors, data corruption, and persistent malware. Because it may be the only way to guarantee removal of persistent malware, reimaging is a necessary component of effective cyber intrusion incident response. However, reimaging may be a time-consuming process that has a serious negative impact on system availability.

FTN-D may solve this problem by providing a rapid system reconstitution capability, enabling reconstitution of a protected system within seconds rather than hours. FTN-D is a configurable architecture for using Disposable VMs (D-VMs) on servers and endpoints to provide fast system reconstitution and to improve system security and resilience. FTN-D may create and manage D-VMs and persistent storage systems, enabling FTN-D to securely and reliably restore a server or endpoint to a pristine state in near real time.

Figure 25:
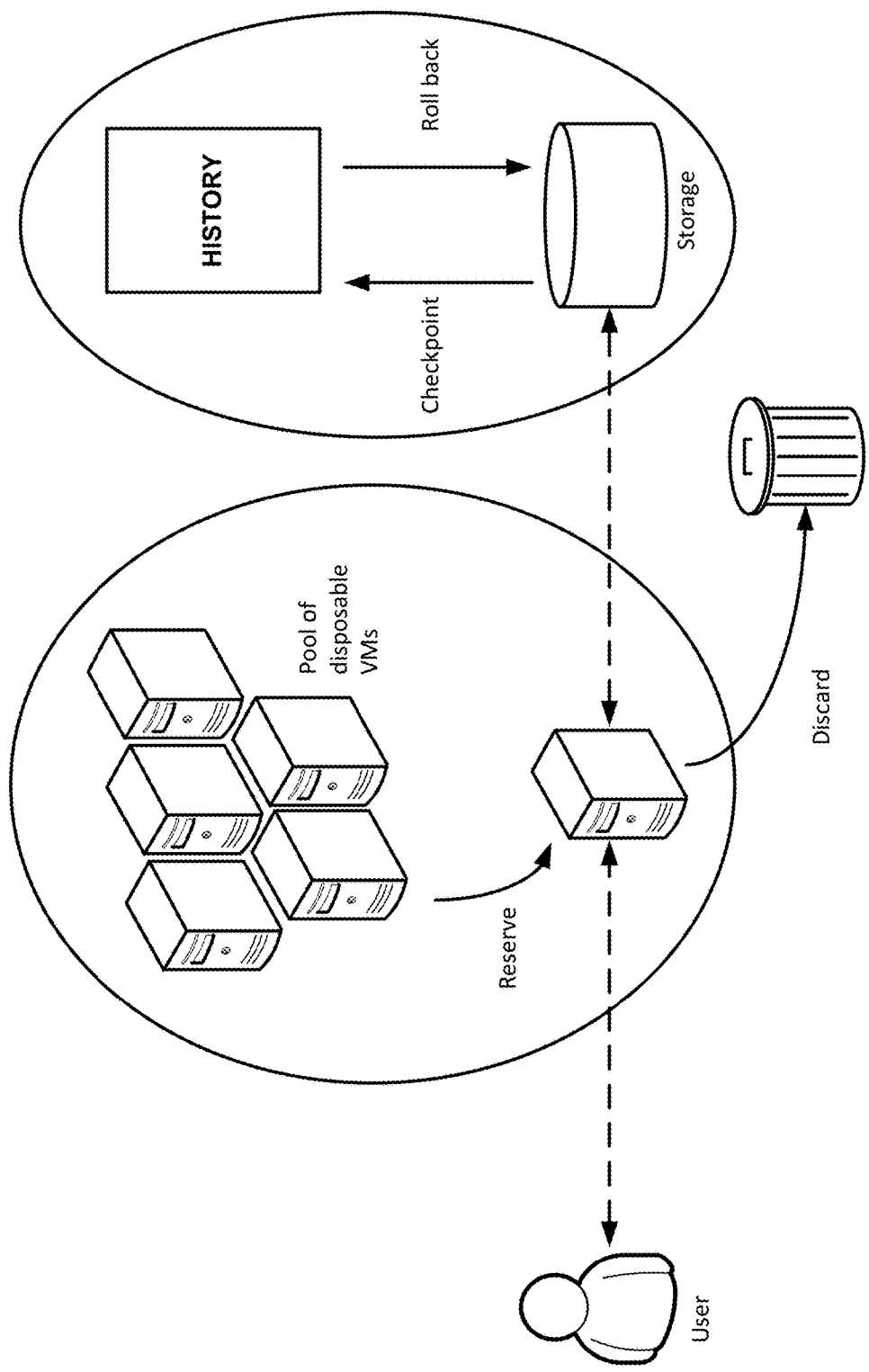
FIG. 25 is a conceptual diagram illustrating an example operation of a fight-through node with disposable virtual machines, in accordance with one or more techniques of this disclosure.

A capability of FTN-D is that it may encapsulate a system's runtime state in a disposable VM. Users of the FTN-D-protected system interact with a D-VM that is a temporary clone of the pristine system state. FTN-D may use virtualization and commercial off-the-shelf (COTS) hypervisor software to manage these D-VMs. The D-VM can be discarded and replaced with a new, pristine clone within seconds at the end of a user's session or in response to an automated or manual trigger, for example, as a response to software fault or cyber-attack (FIG. 25). FIG. 25 is a conceptual diagram illustrating an example operation of a fight-through node with disposable VMs, in accordance with one or more techniques of this disclosure. FTN-D provides fast system reconstitution and makes persistent attack effects temporary using disposable VMs supported by fast check-pointed storage. In a multi-user system, such as a server, FTN-D can reserve a different, isolated D-VM for each user session so that persistent effects are isolated to that user's D-VM and do not affect any other users.

FTN-D may support the D-VMs with shared, persistent storage that features fast data rollback capabilities. FTN-D may provide this storage to the D-VMs using an isolated persistent-storage VM. The storage system may provide fast, lightweight, and fine-grained file system checkpointing and rollback, enabling restoration to known-good data within seconds (FIG. 25, above). D-VMs may communicate with the storage system through restricted channels to minimize the attack surface. FTN-D can integrate with intrusion detection systems and other sources of alerts to instantly and automatically roll back storage to a pristine or pre-attack state as soon as an attack is detected. FTN-D may automatically retain an isolated copy of the pre-rollback (compromised) system state to support subsequent incident analysis and can be used to selectively reconstitute the system up to the point of compromise.

In addition to providing fast system reconstitution capabilities, FTN-D is a powerful approach to improving system security and combating persistent threats. By frequently discarding and replacing the D-VMs, thus restoring the runtime state of the system to a pristine state, FTN-D may eliminate the persistence of malware and other cyber-attack effects. FTN-D may turn persistent attacks into temporary attacks.

One example application of the FTN-D technology is FTN-D Server, which comprises a platform for hosting virtualized server software. The FTN-D Server software may run on COTS server hardware and is transparent to both client and server software. FTN-D Server can be configured to support different defensive postures with different D-VM allocation strategies and lifetimes. A server running FTN-D may periodically refresh to a pristine, known-good state, instantly and transparently, to maintain health and combat persistent threats. As response to an elevated threat of cyber-attack, an administrator can switch a FTN-D server to a defensive posture in which every connection to the server is isolated to its own D-VM, eliminating all threat of malware and persistent attacks.

FTN-D Server may increase performance and system robustness, improve system management functionality, and may provide scalability to multiple physical servers. It may enhance FTN's configurability to support a wide variety of policies for when to refresh the D-VMs, enabling a system to choose between different defensive postures depending on the desired performance/efficiency tradeoff. This may also enable FTN-D Server to host a wider variety of server applications. FTN-D may integrate an intrusion detection system, such as Snort® or Tripwire®, with the storage component to demonstrate automated rollback capabilities.

Another application of the FTN-D technology is FTN-D Desktop is a standalone software product for providing FTN-D's rapid-reconstitution capability to endpoint hardware running COTS operating systems (OSes). FTN-D Desktop may comprise a base "host" OS and the FTN-D software. System administrators may install a COTS "guest" OS on top of this software stack; the end user interacts with clones of the guest OS. FTN-D Desktop may support both thick and thin endpoints and all major desktop OSes; some versions of FTN-D Desktop support mobile devices and other platforms. FTN-D Desktop may provide a network-connected virtual endpoint that reverts to a pristine state within seconds of the end of a user session or in response to software faults or cyber-attack.

FTN-D Desktop is a specialized application of the FTN technology, where the system is hosting only a single D-VM at a time and that D-VM is an interactive desktop OS. FTN-D Desktop may be customized to work with all-local system components and a single D-VM. The storage component for desktop may be customized for usage scenarios and for integration with desktop OSes. A session policy and refresh triggers appropriate for desktop use may be implemented and an interface to interact with storage system for check-pointing and rollback may be created. FTN-D may be provide a secure, networked command-and-control system to manage FTN-D Desktop remotely. FTN-D Desktop may be fully integrated with a COTS desktop host operating system and create a software installer that facilitates easily installing the FTN-D Desktop software stack and a guest operating system on an endpoint machine. FTN-D Desktop may be tested with representative endpoint hardware systems and OSes to demonstrate compatibility.

The following paragraphs describe additional examples:

"FTN Limited" (Read-only FTN): In this example, an FTN server holds no persistent state. For instance, the system of the "FTN Limited" example may be similar to the example server computing system of FIG. 15, except without database management system 224 or without the ability to write data to shared database 226. Because the FTN server stores no persistent state, there is no opportunity for data corruption. As a result, the FTN server of the "FTN Limited" example may be highly secure and very fast. In this example, data available for clients to read is either replicated on each virtual worker's (e.g., VM's) local file system, or centrally located on a persistent data store that is made available to workers (e.g., VMs) in a read-only manner. By eliminating client threats to the FTN server's data, the number of components needed may be reduced. For instance, no intrusion detection system, checkpointing, or rollback may be necessary. Thus, an FTN server in the "FTN Limited" example may be more secure, have higher performance, be simpler and cheaper, and may protect data integrity. However, an FTN server in the "FTN Limited" example may have more limited capabilities because clients are not able to cause state changes, and no sessions may be possible. In some versions of the "FTN Limited" example, the FTN server allows for persistent application state without persistent user data. Furthermore, in other versions of the "FTN Limited" example, the FTN server allows no persistent state or data at all.

"FTN Gateway" (FTN Tier 1 Servers): In this example, an FTN has front-end components and disposable VMs, but connects to a custom back-end instead of a simple persistent storage back-end. In this example, the FTN may replace an enterprise's current front-line servers with disposable VMs, but retain the rest of the enterprise's infrastructure. In this example, the FTN may use only the front-end and worker (e.g., VM) components of the FTN and may use customer-provided infrastructure for the back end. The FTN may include a persistent state server to preserve worker (e.g., application) state between refreshes of the VMs. This example may be advantageous to some users that use existing back-end business processes and/or databases. In some versions of this example, VMs are refreshed per user session rather than per individual transaction.

"Cloud FTN" (Use Cloud hardware for FTN VMs): In this example, an FTN implements some or all FTN components in a cloud instead of locally at a facility of a user of the FTN. For instance, one or more cloud-based VMs could be implemented in the cloud. In this example, the front-end components or back-end storage may also be implemented in the cloud. Furthermore, in some examples where worker VMs are no longer on a local IPv6 network, the worker VMs may have unique IP addresses. The use of unique IP addresses may complicate worker VM generation slightly due to a potential need to configure each VM's IP rather than use identical clones. Advantageously, in this example, a customer may not need to provide hardware resources for workers, and may provide higher elasticity and scalability. Some versions of the "Cloud FTN" example implement a hybrid FTN with local VMs and can use cloud VMs when load is high or under other circumstances.

"Lightweight FTN" (Use lightweight VMs for workers): In some examples provided elsewhere in this disclosure, FTNs are designed to use hardware-level VMs such as VirtualBox™, Xen™, or VMware™ to host workers (e.g., worker VMs). Although hardware-level VMs provide good isolation, they are quite heavyweight performance-wise and may have more capabilities than necessary. For instance, hardware-level VMs may be able to run arbitrary OSs when it only may be necessary to run a single particular OS. In this "Lightweight FTN" example, a FTN uses OS-level isolation for disposable workers (e.g., VMs), such as Solaris™ containers, BSD jails, OpenVZ/Virtuozzo, and Linux chroot. Although OS-level VMs may provide worse isolation, they are lighter weight and may provide better performance. Thus, in at least some instances, "Lightweight FTN" examples may provide faster performance than examples that use hardware-level VMs.

"Alert FTN" (FTN with IDS in workers to provide alarms): In this example, IDSs are included in the worker VMs. In some implementations, the IDSs provide VM introspection. IDSs in the VMs may alert users to attacks (e.g., cyber-attacks). The attacks to which the users are alerted may belong to the types detected by whatever IDSs are installed. In this example, host-based commercial IDSs may be installed into a worker VM template. Furthermore, in some examples, a communication bridge may exist between the VMs and a host for triggering IDSs and receiving results. In examples where IDSs need to retain state over time, the IDS may use the persistent storage component (e.g., shared database 226). The "Alert FTN" example may have the advantage of notifying users of attacks that may otherwise have been ignored. In some versions of the "Alert FTN" example, the front end components of the FTN include a network IDS instead of or in addition to host-based IDSs inside the VMs.

"High Assurance FTN" (FTN with Diversity Protection and a voting algorithm). In this example, dispatcher 238 is augmented with the ability to store and forward transaction requests (e.g., to workers, such as VMs 220) and responses (e.g., to clients, such as client computing devices 216). With dispatcher 238 buffering of requests, server computing system 212 may duplicate and send a single transaction request to multiple VMs. If the internals of these VMs are diverse (e.g., the VMs run different OSs and service versions; different sets of VMs execute under different hypervisors, etc.), then an attack may have a different effect on each, causing a different response from different VMs. With dispatcher 238 buffering of responses, server computing system 212 may hold the responses from multiple VMs until the VMs have all finished processing the same request. Server computing system 212 may then compare the responses against each other. If the relevant parts of the responses do not match, server computing system 212 may determine that an attack or at least a fault has occurred and may raise an alarm. Additionally, server computing system 212 may roll back the persistent state of VMs to just prior to the transaction to delete any effects of the transaction. Because the transaction responses are buffered, the response does not need to be sent back to a client. Therefore, the entire malicious transaction may have no effect on server computing system 212, and a response may not be sent back to the client so the state of the FTN will not be inconsistent from the point of view of the client. A potential drawback of this approach is that may require that transaction processing be strictly serialized.

In some "High Assurance FTN" examples, FTN front-end components (e.g., handlers, such as handler 244) store transaction responses and forward the transaction responses back to clients only after voting validates results as consistent and/or expected. Furthermore, some "High Assurance FTN" examples employ a custom set up of two or more OSs and applications to provide services with identical interfaces but unique implementations. In some such examples, the comparison of results may take into account different response formats of each OS/application pair. Advantageously, "High Assurance FTN" examples may be able to provide an uncommon type of IDS, do not return transaction results to hostile clients, may roll back malicious changes to persistent state, and may provide fault tolerance if one worker fails.

"Multiservice FTN" (Multiple, application-level dispatchers): Some FTN designs execute a single VM template with a single service and forward all TCP sessions to workers with that template. In "Multiservice FTN" examples, a modified dispatcher (e.g., a modified version of dispatcher 238 or one or more dispatcher plugins) may operate at an application level instead of the TCP level. The modified dispatcher may recognize different protocols. For instance, the modified dispatcher may be able to recognize incoming packets as belonging to different protocols based on the targeted ports of the incoming packets and/or by pattern-matching data headers in the incoming packets. Additionally, "Multiservice FTN" examples may use multiple VM pools. Each respective VM pool may use a different template. As a result, the modified dispatcher that can, in some examples, send http (web) requests to workers running http servers, and can send smtp (email) requests to workers running email servers. Another potential advantage of protocol-level dispatchers is that protocol-level dispatchers may be able to interpret transactions as more fine-grained than a TCP session. This may provide attackers with an even smaller attack window, because holding a TCP session open would no longer maintain access to a worker VM.

Some "Multiservice FTN" examples are implemented using application-specific proxies as plugins to a main dispatcher, such as dispatcher 238. Additional "Multiservice FTN" examples base forwarding of incoming packets to workers on the target port and continue to use TCP sessions as transactions. Such additional "Multiservice FTN" examples may provide the multi-protocol functionality described above without the complication (or security) of fine-grained transactions. However, such additional "Multiservice FTN" examples may add support for multiple worker VM templates and the ability to differentiate and route to them separately. "Multiservice FTN" examples may let users host multiple services on a single FTN with no significant performance or security penalties under normal operating conditions.

"Fight Through Client": In this example, an FTN is used to protect clients from malicious servers. For instance, in this example, disposable VM clients auto-refresh themselves per the techniques of this disclosure. Thus, instead of generating workers (e.g., worker VMs) to serve incoming client requests, a client computing device generates workers that make outgoing client requests. The client computing device disposes of workers after some number of transactions (e.g., 1 or more) and then a user is presented with a new worker. For example, a transaction may be defined as a user session of the client device. For instance, in general-purpose personal computing device, a "transaction" may be a login session (i.e., the transaction ends when the user logs out). In another example involving a general-purpose computing device, a transaction may correspond to a single virtual power cycle, i.e., a transaction ends when the computing device is restarted or shut down and begins when the device restarts. In another example involving a shared general-purpose computing device, a transaction may end when the computing device enters an idle state. For instance, in this example, the transaction may end when the computing device enters a locked state, a sleep state, or after there has been no user input for a particular amount of time. In this example, a new transaction may begin when the computing device exits the idle state. In another example, a secure computing device has an associated physical access token, such as a military computing device requiring an access card. In this example, the transaction ends when the physical access token is removed. In this example, a new transaction may begin when a physical access token is inserted into a token reader of the computing device. In another example, a transaction may terminate on a computing device, such as a paid desktop computer at a cybercafé, when a paid-for time has expired. Special-purpose computers, such as kiosks, may have application-specific definitions of "transaction." For example, ATMs and airline kiosks have well defined "customer sessions." FTN-D could use these transactions, so that the worker VM is replaced in between customers.

In some examples, a "Fight Through Client" system may use VMs only for particular or individual applications. For example, a computing device does not use the "Fight Through Client" technique for all applications, but may use a "Fight Through Client" VM for a web browser on the computing device. In this example, the computing device may use an application-specific definition of a transaction, such as a "session" in a Web browser.

In some examples, the client-side workers provide a desktop or an application GUI to the user. In some examples, some state information is transferred between worker instances on the client computing device. Advantageously, some "Fight Through Client" examples do not need to rely on an IDS for security. Some "Fight Through Client" examples provide single-client VMs or multi-client VMs. In some examples, a single-client VM provides one VM to a single user and a multi-client VM provides one VM to multiple users. In other words, some "Fight Through Client" examples have VMs that are provided for multiple clients and/or users.

Furthermore, some "Fight Through Client" examples implement auto-refresh policies for worker VMs. Other "Fight Through Client" examples implement manual refresh policies for worker VMs.

Different examples of the FTN-D concept vary the implementation of the same basic system components: a front end, disposable workers, persistent storage, intrusion detection system(s), and more. The number of design parameters and variety of choice of each design parameter may afford a large number of variant FTN-D systems.

For instance, different examples techniques of this disclosure may provide for protection of servers. Furthermore, some examples provide protection for clients (e.g., applications on workstations or laptops), specific applications (e.g., browsers), or all applications. Such clients may or may not employ persistent storage. Some examples provide protection for mobile devices or other types of devices, such as hardware or embedded devices.

Furthermore, different example techniques of this disclosure may provide different worker types. For instance, some examples use heavyweight VMs (e.g., VMware™, Xen™, VirtualBox™). Some examples use lightweight containers (e.g., Jails, Containers, Chroot), physical hosts, or cloud resources.

Different example techniques of this disclosure may provide different levels of service. For instance, various examples may provide infrastructure, platform, software, or multi-service levels of service. Infrastructure-as-a-Service (IaaS), Platform-as-a-Service (PaaS), and Software-as-a-Service (SaaS) are basic cloud service classifications, though there are many cloud services that fall outside these classifications or span multiple categories.

Furthermore, different example techniques of this disclosure may provide different options with regard to persistent state. For instance, in some example configurations, the persistent state is read-only (e.g., no persistence of user data or application state). In other example configurations, the persistent state may be a built-in persistent state (for drop-in servers). The built-in persistent state may be standardized, pre-packaged or generic. Furthermore, in still other example configurations, the persistent state may be a custom persistent state (e.g., for enterprise solutions). One potential benefit of using VMs with a built-in persistent state is the ability to avoid complicated configurations of VMs. Including a built-in persistent state may be it is possible to offer VMs already configured in a product to reduce the work necessary to create a server under FTN.

Additionally, different examples may or may not implement persistent state security. For instance, some examples implement a file system IDS and/or a database constraint IDS. Different examples may have different IDS check frequency and/or IDS time (trade-off for thoroughness).

Furthermore, different examples may have different checkpointing policies. For instance, in some examples, a checkpoint policy requires checkpoint data to be generated for every transaction, for every N transactions, on a time-based schedule, or never. Different examples may also have different rollback policies.

Different examples may have different dispatcher configurations. For instance, in some different examples, a dispatcher may organize incoming packets into transactions at different levels, such as a TCP level, an application level, or an IP level. Furthermore, different examples may implement different dispatcher policies. For example, some dispatcher policies use serial workers (forced ordering, slower, stricter checkpointing). Other dispatcher policies use parallel workers (higher performance, fuzzy checkpointing). Furthermore, some dispatcher policies implement a pass-through model (e.g., to instantly respond to clients). Other dispatcher policies implement a store-and-forward model (e.g., to buffer client responses pending security analysis, e.g., voting).

Furthermore, different examples may have different worker policies and/or configurations. For instance, some examples use disposable workers. Other examples may use at least some persistent workers. Furthermore, some examples may implement proactive recovery policies for disposable workers. Such recovery (e.g., refresh) policies may include: none, after every transaction, after every n transactions, IDS-triggered, and manual. In addition, some examples implement intrusion detection for workers (e.g., in an execution environment of the workers). In some such examples, the IDSs may trigger refresh of workers and/or trigger rollback of data. In some examples, the IDSs are just for situational awareness.

Other examples may provide for FTN-aware clients, adjusting dispatcher timeouts, firewall integration, fault tolerance, handling DoS attacks, voting algorithm (parallel processing of requests) as an IDS, checkpointing VM states for later analysis, diversity in workers or applications, combining diversity with voting, protecting/monitoring the hypervisor/host, and using the FTN as a "first tier" or "front line" enterprise components. Furthermore, different choices in the design parameter space may emphasize particular aspects, including: performance (e.g., client latency), security (e.g., front end security, back end security), functionality (e.g., read only, persistent state, IDS/rollback), situational awareness (e.g., knowing about attacks or not), usability (e.g., migration, configuration, updating, etc.), and installation effort.

Figure 26:
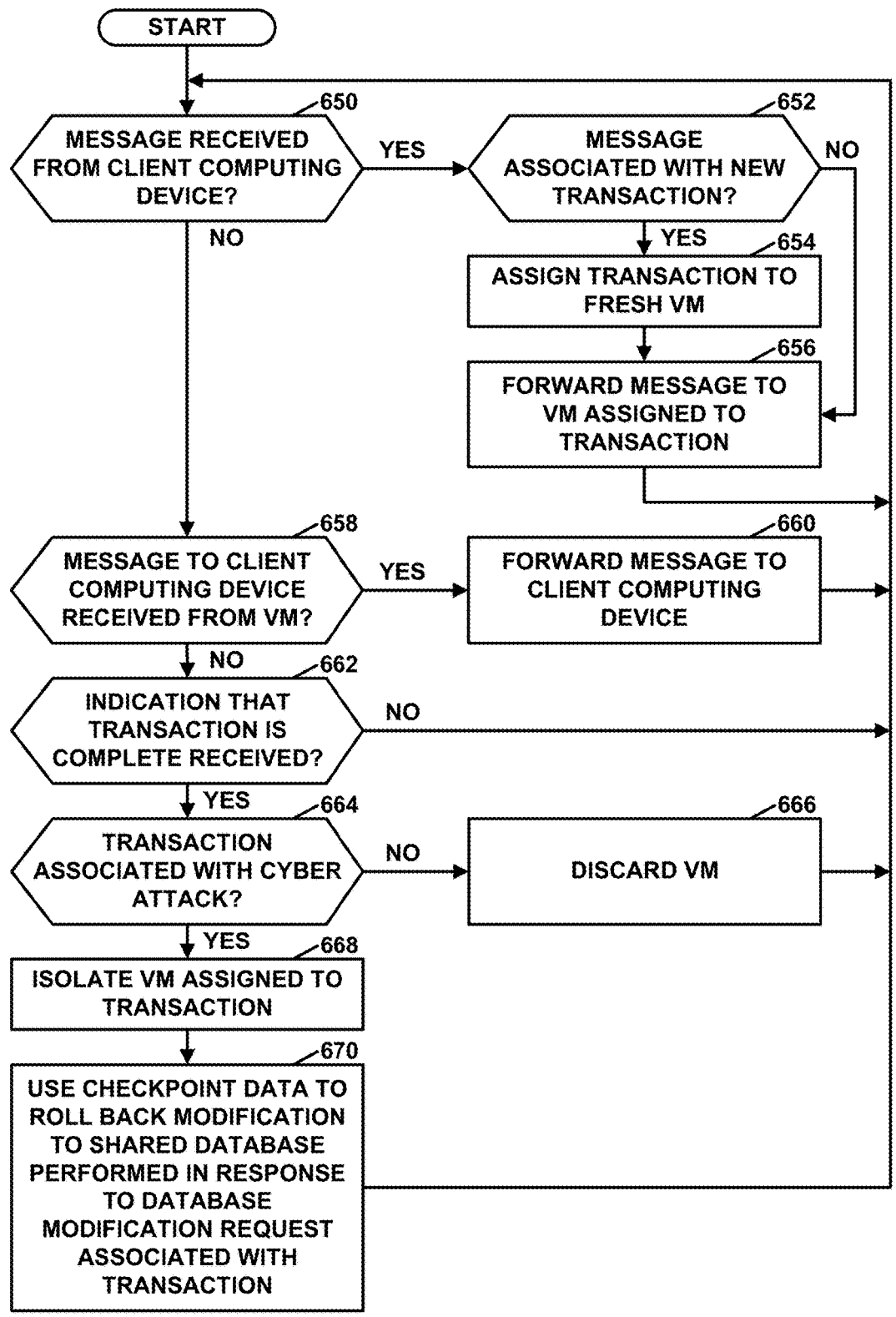
FIG. 26 is a flowchart illustrating an additional example operation of a front-end unit, in accordance with one or more techniques of this disclosure.

FIG. 26 is a flowchart illustrating an additional example operation of front-end unit 218 (FIG. 15), in accordance with one or more techniques of this disclosure. As described in examples relating to FIG. 15 through FIG. 25, VMs 220 may be discarded in response to determining that transactions assigned to the VMs are complete. However, discarding the VMs in this manner may result in loss of information regarding a cyber-attack or attacker.

Thus, in the example of FIG. 26, front-end unit 218 may determine whether a message has been received from a client computing device (e.g., one of client computing devices 216 (FIG. 15)) (650). In response to determining that a message has been received from a client computing device ("YES" branch of 650), front-end unit 218 may determine whether the message is associated with a new transaction (652). In response to determining that the message is associated with a new transaction ("YES" branch of 652), front-end unit 218 may assign the transaction to a fresh VM (654). In some examples, front-end unit 218 may instantiate (e.g., initialize) the VM as part of assigning the transaction to the VM. In other examples, front-end unit 218 may select the VM from a pool of previously initialized fresh VMs as part of assigning the transaction to the VM. After assigning the transaction to the VM or in response to determining that the message is not associated with a new transaction ("NO" branch of 652), front-end unit 218 may forward the message to the VM assigned to the transaction associated with the message (656). Front-end unit 218 may determine again whether a message was received from a client computing device (650).

Otherwise, front-end unit 218 may determine whether a message to a client computing device has been received from a VM (658). In response to determining that a message to a client computing device has been received from a VM ("YES" branch of 658), front-end unit 218 may forward the message to the client computing device (660).

Furthermore, front-end unit 218 may determine whether an indication that a transaction is complete has been received (662). Front-end unit 218 may determine whether an indication that a transaction is complete has been received in accordance with examples provided elsewhere in this disclosure. In response to determining that front-end unit 218 has not received an indication that the transaction is complete ("NO" branch of 662), front-end unit 218 may determine again whether a message was received from a client computing device (650). In response to determining that front-end unit 218 has received an indication that a transaction is complete ("YES" branch of 662), IDS 260 (FIG. 16) may determine whether the transaction is associated with a cyber-attack (664). IDS 260 may determine whether the transaction is associated with a cyber-attack in the manner described in other examples of this disclosure.

For instance, IDS 260 may use virtual machine introspection, response comparison, or other techniques to determine whether the transaction is associated with a cyber-attack. In response to determining the transaction is not associated with a cyber-attack ("NO" branch of 664), front-end unit 218 may discard the VM associated with the transaction (666). Front-end unit 218 may determine again whether a message was received from a client computing device (650).

In response to determining the transaction is associated with a cyber-attack ("YES" branch of 664), front-end unit 218 may isolate the VM associated with the transaction (668). For example, front-end unit 218 may prevent the compromised VM (i.e., the VM associated with the transaction associated with the cyber-attack) from reading data from and/or writing data to shared database 226 (FIG. 16). In some examples, front-end unit 218 may quarantine the compromised VM by running a copy of the compromised VM in a different hypervisor or device that does not have access to shared database 226. Instead of having access to shared database 226, the compromised VM may instead have access to dummy data. The dummy data does not include sensitive data, but rather may be used to allow the compromised VM to continue accessing some data, thereby reducing the chances of alerting an attacker that the cyber-attack has been foiled. In some examples, isolating the compromised VM may remove the compromised VM from a pool of available VMs to which front-end unit 218 assigns new transactions.

Additionally, in response to determining the transaction is associated with a cyber-attack, rollback module 258 may use the checkpoint data associated with the respective transaction to roll back the modification to shared database 226 performed in response to the database modification request associated with the transaction (670). Thus, changes to shared database 226 resulting from the transaction associated with the cyber-attack do not impact other VMs or subsequent transactions. Front-end unit 218 may forward one or more subsequent messages from client devices to the compromised VM. The compromised VM may process the subsequent messages. Thus, from the perspective of the attacker, server computing system 212 may continue to operate as if the cyber-attack was successful.

In this way, a node, such as server computing system 212 (FIG. 16) may apply a quarantining action (i.e., isolation of a compromised VM) when the node rolls back the persistent state stored in shared database 226. To facilitate this, the node introduces a delay and/or scanning mechanism in the VM recycling process in order to detect the attack and cause quarantine. In addition to quarantining by making a copy of the CVM, the node may "hot quarantine" the compromised VM simply by leaving the compromised VM alone, removing the compromised VM from the pool of available disposable VMs, and optionally creating new D-VMs to take the place of the compromised VM in the pool of available disposable VMs.

Similar to the examples provided above with respect to FIG. 10 through FIG. 14, server computing system 212 may assign the same transaction to a plurality of VMs. In such examples, IDS 260 may compare responses to the transaction from the plurality of VMs. Different responses to the same transaction may indicate that one or more VMs of the plurality of VMs is compromised. Furthermore, the techniques described above for increasing detectability of differences in responses to transactions may be applied. For instance, in the examples of FIG. 15 through FIG. 26, the plurality of VMs may have different configurations to further increase detectability of differences in responses to transactions.

Furthermore, in the example of FIG. 26, similar to examples provided elsewhere in this disclosure, server computing system 212, or another computing system, may compare non-compromised VMs to the compromised VM to determine how an attacker is attacking server computing system 212. In some examples, this comparison is done at the time the cyber-attack is detected. In some examples, this comparison is done based on transactions subsequently processed by the compromised VM and non-compromised VM.

Similar to examples provided elsewhere in this disclosure, the compromised VM of FIG. 26 may be configured to send back results to an attacker to install malware on the attacking machine. Thus, server computing system 212 may be a fight-back node.

To summarize, server computing system 212 may initialize, from a common template that has been determined to be free of malware infection, a respective one of a plurality of VMs that execute at one or more computing devices of the computing system. As part of initializing the respective VM, server computing system 212 may initialize an instance of an application on the respective VM in accordance with application state stored within shared database 226 (FIG. 16). Furthermore, responsive to receiving a request to initiate a communication session, front-end unit 218 (FIG. 16) of server computing system may assign a transaction corresponding to the communication session to the respective VM. The respective VM may generate, as part of the respective VM executing the transaction, a database modification request associated with the transaction. Responsive to generating the database modification request associated with the transaction, database management system 224 (FIG. 16) may perform a modification to the shared database. The database modification request may request the modification, within shared database 226, of the application state for the application running on the respective VM. Shared database 226 is persisted independently of the plurality of VMs. Furthermore, checkpointer 256 (FIG. 16) may generate checkpoint data associated with the transaction.

Responsive to detecting a termination of the communication session, and responsive to determining that the transaction is associated with a cyber-attack, front-end unit 218 may isolate the VM to which the transaction is assigned. Additionally, front-end unit 218 may generate a rollback request. Responsive to the rollback request, rollback module 258 may use the checkpoint data associated with the transaction to roll back the modification to the shared database performed in response to the database modification request associated with the transaction. IDS 260, or another unit of server computing system 212 or another device, may analyze the isolated VM. Furthermore, front-end unit 218 may continue to provide subsequent transactions and/or message to the isolated VM to gather further information about the cyber-attack and/or attacker, and/or to fight back against the attacker.

In general, the techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a non-transitory computer-readable medium to store instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The program code may be executed by one or more processors (i.e., processing circuits), such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structure suitable for implementation of the techniques described herein, including one or more hardware-based microprocessors.

Various embodiments of the invention have been described. These and other embodiments are within the scope of the following claims.

The invention claimed is:

1. A method comprising:
running a plurality of virtual machines that includes (n) virtual machines, each respective virtual machine of the plurality of virtual machines associated with a respective position in an ordered sequence of the virtual machines, wherein a first virtual machine of the plurality of virtual machines is associated with a position in the ordered sequence of virtual machines occurring first;
receiving, by a node, a plurality of transaction requests that consists of (n) transaction requests;
for each respective transaction request of the plurality of transaction requests:
  dispatching the respective transaction request and each transaction request, if any, of the plurality of transaction requests previous to the respective transaction request to respective virtual machines of the ordered sequence of virtual machines; and
  executing, by the respective virtual machines of the ordered sequence of virtual machines, the respective transaction request and each transaction request, if any, of the plurality of transaction requests previous to the respective transaction request, wherein a service provided by the node is usable as part of the respective virtual machines of the ordered sequence of virtual machines executing the respective transaction request and each transaction request, if any, of the plurality of transaction requests previous to the respective transaction request;
based on the first virtual machine having executed (n) transaction requests in the plurality of transaction requests, detecting whether any of the virtual machines has been compromised;
in response to detecting the plurality of virtual machines includes a compromised virtual machine, isolating the compromised virtual machine such that the compromised virtual machine is unable to subsequently use the service; and
after isolating the compromised virtual machine:
  receiving a subsequent transaction request;

dispatching the subsequent transaction request to the compromised virtual machine; and
executing, by the compromised virtual machine, the subsequent transaction request.

2. The method of claim 1, further comprising, in response to detecting the plurality of virtual machines includes the compromised virtual machine:
copying a state of a non-compromised virtual machine of the plurality of virtual machines, the non-compromised virtual machine having executed each transaction of the plurality of transactions up to, but not including, a last transaction of the plurality of transactions executed by the compromised virtual machine; and
comparing the state of the non-compromised virtual machine to a state of the compromised virtual machine.

3. The method of claim 2, further comprising:
based on the comparison of the state of the non-compromised virtual machine and the state of the compromised virtual machine, updating a catalog of attack types.

4. The method of claim 1, wherein the compromised virtual machine is associated with the c'th position in the ordered sequence of virtual machines, the method further comprising:
in response to detecting the plurality of virtual machines includes the compromised virtual machine, associating an additional virtual machine with the c'th position in the ordered sequence of virtual machines in place of the compromised virtual machine.

5. The method of claim 1, wherein detecting whether any of the virtual machines has been compromised comprises:
determining, based on a comparison of a plurality of responses, whether any of the virtual machines has been compromised, each response of the plurality of responses being generated by different virtual machines of the ordered sequence of virtual machines in response to the same transaction request of the plurality of transaction requests.

6. The method of claim 1, further comprising:
executing, by a non-compromised virtual machine in the ordered sequence of virtual machines, the subsequent transaction request; and
comparing a response to the subsequent transaction request generated by the compromised virtual machine with a response to the subsequent transaction request generated by the non-compromised virtual machine.

7. The method of claim 1, further comprising:
modifying a response to the subsequent transaction request generated by the compromised virtual machine to include data or code to install or facilitate installation of malware on a device attacking the node; and
sending the modified response to the device attacking the node.

8. A network node comprising:
a network interface configured to receive a plurality of transaction requests that consists of (n) transaction requests; and
a set of one or more processing circuits configured to:
execute a plurality of virtual machines, the plurality of virtual machines including (n) virtual machines, wherein a first virtual machine of the plurality of virtual machines is associated with a position in the ordered sequence of virtual machines occurring first;
for each respective transaction request of the plurality of transaction requests:
dispatch the respective transaction request and each transaction request, if any, of the plurality of transaction requests previous to the respective transaction request to respective virtual machines of the ordered sequence of virtual machines; and
the respective virtual machines of the ordered sequence of virtual machines execute the respective transaction request and each transaction request, if any, of the plurality of transaction requests previous to the respective transaction request, wherein a service provided by the node is usable as part of the respective virtual machines of the ordered sequence of virtual machines executing the respective transaction request and each transaction request, if any, of the plurality of transaction requests previous to the respective transaction request;
based on the first virtual machine having executed (n) transaction requests in the plurality of transaction requests, detect whether any of the virtual machines has been compromised;
in response to detecting the plurality of virtual machines includes a compromised virtual machine, isolate the compromised virtual machine such that the compromised virtual machine is unable to subsequently use the service; and
after isolating the compromised virtual machine:
receive a subsequent transaction request;
dispatch the subsequent transaction request to the compromised virtual machine; and
execute, by the compromised virtual machine, the subsequent transaction request.

9. The network node of claim 8, wherein the one or more processing circuits are further configured such that, in response to detecting the plurality of virtual machines includes the compromised virtual machine, the one or more processing circuits:
copy a state of a non-compromised virtual machine of the plurality of virtual machines, the non-compromised virtual machine having executed each transaction of the plurality of transactions up to, but not including, a last transaction of the plurality of transactions executed by the compromised virtual machine; and
compare the state of the non-compromised virtual machine to a state of the compromised virtual machine.

10. The network node of claim 9, wherein the one or more processing circuits are configured to update, based on the comparison of the state of the non-compromised virtual machine and the state of the compromised virtual machine, a catalog of attack types.

11. The network node of claim 9, wherein the compromised virtual machine is associated with the c'th position in the ordered sequence of virtual machines, the one or more processing circuits are further configured to:
in response to detecting the plurality of virtual machines includes the compromised virtual machine, associate an additional virtual machine with the c'th position in the ordered sequence of virtual machines in place of the compromised virtual machine.

12. The network node of claim 9, wherein the one or more processing circuits are configured such that, as part of detecting whether any of the virtual machines has been compromised, the one or more processing circuits:
determine, based on a comparison of a plurality of responses, whether any of the virtual machines has been compromised, each response of the plurality of responses being generated by different virtual machines of the ordered sequence of virtual machines in response to the same transaction request of the plurality of transaction requests.

13. The network node of claim 9, wherein the one or more processing circuits are configured to:
- execute, by a non-compromised virtual machine in the ordered sequence of virtual machines, the subsequent transaction request; and
- compare a response to the subsequent transaction request generated by the compromised virtual machine with a response to the subsequent transaction request generated by the non-compromised virtual machine.

14. The network node of claim 9, wherein the one or more processing circuits are configured to:
- modify a response to the subsequent transaction request generated by the compromised virtual machine to include data or code to install or facilitate installation of malware on a device attacking the node; and
- send the modified response to the device attacking the node.

15. A non-transitory computer-readable data storage medium having instructions stored thereon that, when executed, configure one or more processing circuits of a network node to:
- run a plurality of virtual machines that includes (n) virtual machines, each respective virtual machine of the plurality of virtual machines associated with a respective position in an ordered sequence of the virtual machines, wherein a first virtual machine of the plurality of virtual machines is associated with a position in the ordered sequence of virtual machines occurring first;
- receive, by the network node, a plurality of transaction requests that consists of (n) transaction requests;
- for each respective transaction request of the plurality of transaction requests:
  - dispatch the respective transaction request and each transaction request, if any, of the plurality of transaction requests previous to the respective transaction request to respective virtual machines of the ordered sequence of virtual machines; and
  - execute, by the respective virtual machines of the ordered sequence of virtual machines, the respective transaction request and each transaction request, if any, of the plurality of transaction requests previous to the respective transaction request, wherein a service provided by the node is usable as part of the respective virtual machines of the ordered sequence of virtual machines executing the respective transaction request and each transaction request, if any, of the plurality of transaction requests previous to the respective transaction request;
- based on the first virtual machine having executed (n) transaction requests in the plurality of transaction requests, detect whether any of the virtual machines has been compromised;
- in response to detecting the plurality of virtual machines includes a compromised virtual machine, isolate the compromised virtual machine such that the compromised virtual machine is unable to subsequently use the service; and
- after isolating the compromised virtual machine:
  - receive a subsequent transaction request;
  - dispatch the subsequent transaction request to the compromised virtual machine; and
  - execute, by the compromised virtual machine, the subsequent transaction request.

\* \* \* \* \*